(12) United States Patent
Fujikura et al.

(10) Patent No.: US 11,334,009 B2
(45) Date of Patent: May 17, 2022

(54) LOAD CONTROLLER AND IMAGE FORMING APPARATUS

(71) Applicant: Oki Data Corporation, Tokyo (JP)

(72) Inventors: Shuichi Fujikura, Tokyo (JP); Mitsuhiko Kitagawa, Tokyo (JP); Akira Nakayama, Tokyo (JP); Kazuya Yamamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 17/150,777

(22) Filed: Jan. 15, 2021

(65) Prior Publication Data
US 2021/0223726 A1   Jul. 22, 2021

(30) Foreign Application Priority Data

Jan. 21, 2020 (JP) .............................. JP2020-007616
Mar. 18, 2020 (JP) .............................. JP2020-047924

(51) Int. Cl.
*G03G 15/20* (2006.01)
*G03G 15/00* (2006.01)
*H02M 1/34* (2007.01)

(52) U.S. Cl.
CPC ......... *G03G 15/2039* (2013.01); *G03G 15/80* (2013.01); *H02M 1/34* (2013.01); *H02M 1/348* (2021.05)

(58) Field of Classification Search
USPC .......................................................... 399/67
See application file for complete search history.

(56) References Cited

U.S. PATENT DOCUMENTS

2016/0091849 A1* 3/2016 Nishida .................... H02M 1/32
                                                                     399/70
2020/0233348 A1* 7/2020 Nakajima .......... G03G 15/2053

FOREIGN PATENT DOCUMENTS

JP           2015-173001 A     10/2015

* cited by examiner

*Primary Examiner* — Quana Grainger
(74) *Attorney, Agent, or Firm* — Rabin & Berdo, P.C.

(57) ABSTRACT

A load controller includes a control device, a switching device, an arc suppression circuit, and a control section. The control device is provided on an electric power supply path between first and second terminals coupled to an alternating-current electric power source, and controls electric power supply to a load provided on the electric power supply path. The switching device is provided on the electric power supply path and is to be in an open state or a closed state. The arc suppression circuit is to suppress discharge at the switching device. The arc suppression circuit is to be set to an enabled state or a limited state. The control section controls operation of the control device, the switching device, and the arc suppression circuit. The control section varies the arc suppression circuit from the limited state to the enabled state after bringing the switching device into the closed state.

13 Claims, 26 Drawing Sheets

LOAD CONTROLLER AND IMAGE FORMING APPARATUS

CROSS REFERENCE TO RELATED APPLICATIONS

The present application claims priority from Japanese Patent Application No. 2020-007616 filed on Jan. 21, 2020 and Japanese Patent Application No. 2020-047924 filed on Mar. 18, 2020, the entire contents of each which are hereby incorporated by reference.

BACKGROUND

The technology relates to: a load controller that controls electric power supply to a load; and an image forming apparatus including the load controller.

For example, in an image forming apparatus, alternating-current electric power received from an external alternating-current electric power source is supplied to a heater of a fixing section, and heat generation of the heater allows a developer image to be fixed to a medium. For example, Japanese Unexamined Patent Application Publication No. 2015-173001 discloses an image forming apparatus that stops electric power supply to a heater in a case where an external alternating-current electric power source malfunctions and therefore outputs direct-current electric power.

SUMMARY

It is desired to stop electric power supply to a heater in a case where a direct-current electric power is received.

It is desirable to provide a load controller and an image forming apparatus that make it possible to effectively stop electric power supply to a heater.

According to one embodiment of the technology, there is provided a load controller that includes a control device, a switching device, an arc suppression circuit, and a control section. The control device is provided on an electric power supply path between a first terminal and a second terminal, and controls electric power supply to a load provided on the electric power supply path. The first terminal and the second terminal are coupled to an alternating-current electric power source. The switching device is provided on the electric power supply path and is to be in an open state or a closed state. The arc suppression circuit is to suppress discharge at the switching device. The arc suppression circuit is to be set to an enabled state or a limited state. The control section controls operation of the control device, operation of the switching device, and operation of the arc suppression circuit. The control section varies the arc suppression circuit from the limited state to the enabled state after bringing the switching device into the closed state.

According to one embodiment of the technology, there is provided a load controller that includes a control device, a direct-current detector, a switching device, an arc suppression circuit, and a control section. The control device is provided on an electric power supply path between a first terminal and a second terminal, and controls electric power supply to a load provided on the electric power supply path. The first terminal and the second terminal are coupled to an alternating-current electric power source. The direct-current detector detects whether an electric power source signal supplied from the alternating-current electric power source is an alternating-current signal or a direct-current signal. The switching device is provided on the electric power supply path and is to be in an open state or a closed state. The arc suppression circuit is to suppress discharge at the switching device. The arc suppression circuit is to be set to an enabled state or a limited state. The control section controls operation of the control device and operation of the switching device. The control section controls the operation of the switching device and operation of the arc suppression circuit on the basis of a result of detection performed by the direct-current detector.

According to one embodiment of the technology, there is provided an image forming apparatus that includes an image forming section, a fixing section, a control device, a switching device, an arc suppression circuit, and a control section. The image forming section generates a developer image. The fixing section includes a heater, and fixes the developer image to a medium. The control device is provided on an electric power supply path between a first terminal and a second terminal, and controls electric power supply to the heater provided on the electric power supply path. The first terminal and the second terminal are coupled to an alternating-current electric power source. The switching device is provided on the electric power supply path and is to be in an open state or a closed state. The arc suppression circuit is to suppress discharge at the switching device. The arc suppression circuit is to be set to an enabled state or a limited state. The control section controls operation of the control device, operation of the switching device, and operation of the arc suppression circuit. The control section varies the arc suppression circuit from the limited state to the enabled state after bringing the switching device into the closed state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
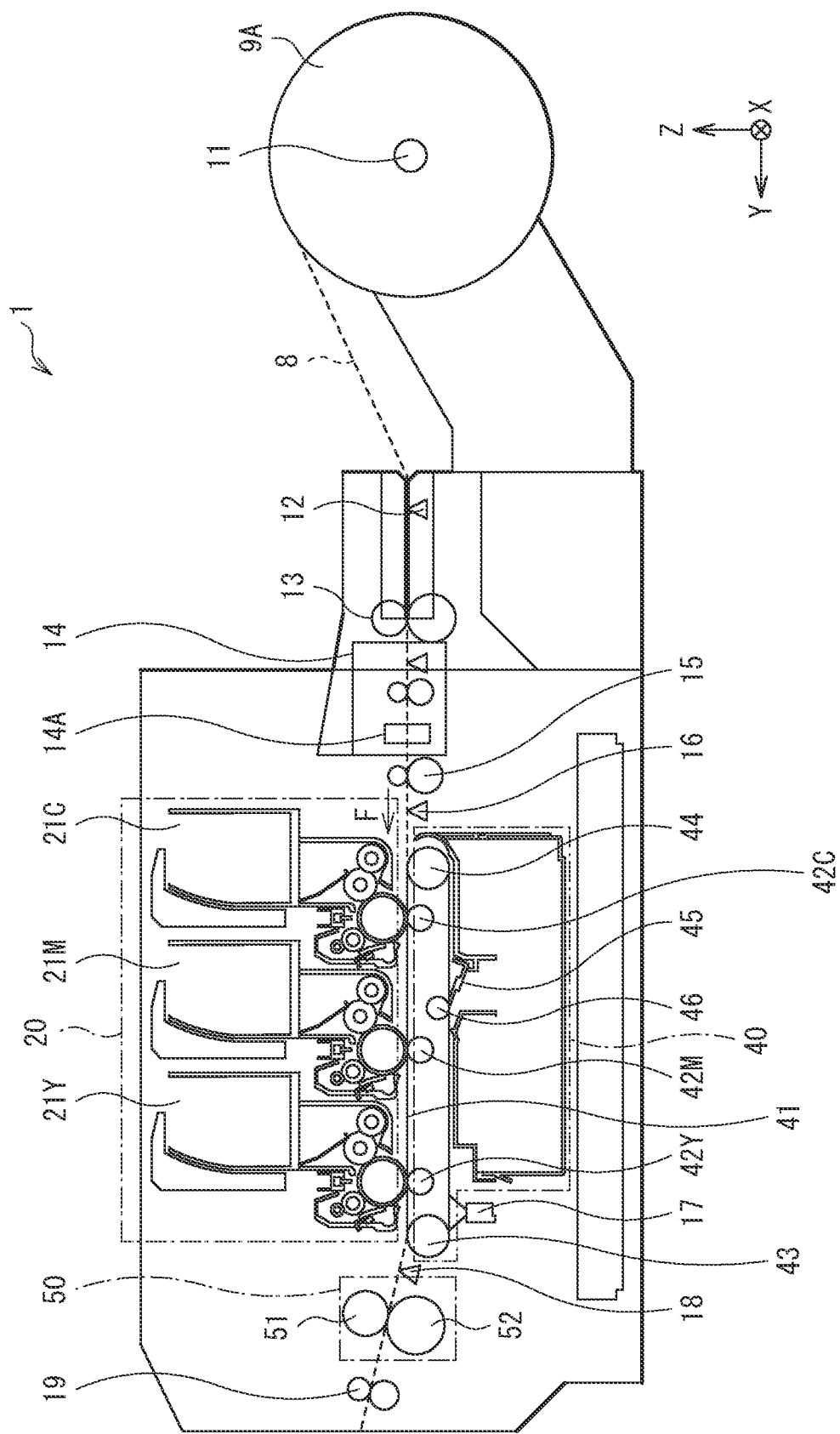
FIG. 1 is a diagram illustrating an example of a configuration of an image forming apparatus according to one example embodiment of the technology.

Hereinafter, some example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description will be given in the following order.

1. First Example Embodiment
2. Second Example Embodiment
3. Third Example Embodiment
4. Fourth Example Embodiment
5. Fifth Example Embodiment 1. First Example Embodiment Configuration Example FIG. 1 illustrates an example of a configuration of an image forming apparatus 1 to which a load controller according to an example embodiment of the technology is applied. The image forming apparatus 1 may serve, for example, as a printer that forms an image on a medium by an electrophotographic method. Non-limiting examples of the medium may include a so-called roll of paper and any other printable medium.

The image forming apparatus 1 may include a medium holder 11, a medium sensor 12, a conveying roller 13, a cutter section 14, a conveying roller 15, a writing sensor 16, a developing section 20, a transfer section 40, a density sensor 17, a fixing section 50, a discharge sensor 18, and a discharging roller 19. The medium sensor 12, the conveying roller 13, the cutter section 14, the conveying roller 15, the writing sensor 16, the developing section 20, the transfer section 40, the discharge sensor 18, the fixing section 50, and the discharging roller 19 may be disposed along a conveyance path 8 of a medium 9.

The medium holder 11 may rotatably hold a roll 9A of the medium 9. Non-limiting examples of the medium 9 may include so-called continuous paper having a long length. The medium 9 taken out from the roll 9A may be conveyed along the conveyance path 8.

The medium sensor 12 may detect the medium 9 taken out from the roll 9A and conveyed.

The conveying roller 13 may include a pair of rollers disposed with the conveyance path 8 interposed therebetween. The conveying roller 13 may convey the medium 9 along the conveyance path 8 on the basis of power transmitted from an unillustrated conveying motor, and thereby feed the medium 9 to the cutter section 14.

The cutter section 14 may cut the medium 9. The cutter section 14 may include a cutter 14A. In this example, the cutter 14A may cut the medium 9 by rotating a cutter blade on the basis of power transmitted from an unillustrated cutter motor. Hereinafter, the medium 9 that has been cut is also referred to as a medium 9B.

The conveying roller 15 may include a pair of rollers disposed with the conveyance path 8 interposed therebetween. The conveying roller 15 may convey the medium 9B along the conveyance path 8 on the basis of power transmitted from an unillustrated conveying motor, and thereby feed the medium 9B to the developing section 20.

The writing sensor 16 may detect a leading end of the medium 9B that has been cut by the cutter section 14 and conveyed by the conveying roller 15. In one example, the writing sensor 16 may be a mechanical sensor. In another example, the writing sensor 16 may be an optical sensor.

The developing section 20 may form toner images of respective three colors. The developing section 20 may include three developing units 21, i.e., developing units 21C, 21M, and 21Y. The developing unit 21C may form a cyan toner image. The developing unit 21M may form a magenta toner image. The developing unit 21Y may form a yellow toner image.

Figure 2:
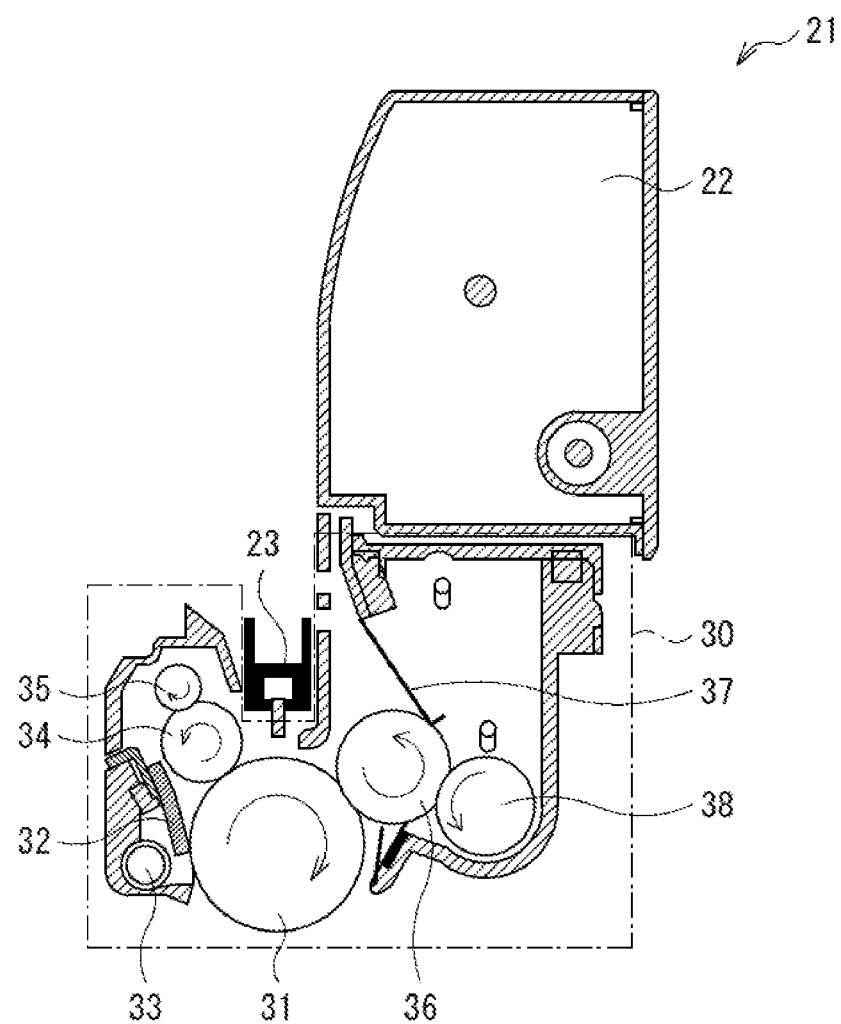
FIG. 2 is a diagram illustrating an example of a configuration of a developing unit illustrated in FIG. 1.

FIG. 2 illustrates an example of a configuration of the developing unit 21. The developing unit 21 may include a toner container 22, a developing part 30, and an exposure head 23.

The toner container 22 may contain a toner to be used in the developing unit 21. For example, the toner container 22 of the developing unit 21C may contain a cyan toner, the toner container 22 of the developing unit 21M may contain a magenta toner, and the toner container 22 of the developing unit 21Y may contain a yellow toner.

The developing part 30 may include a photosensitive drum 31, a cleaning blade 32, a charging roller 34, a cleaning roller 35, a developing roller 36, a developing blade 37, and a feeding roller 38.

The photosensitive drum 31 may carry an electrostatic latent image on its surface (its surficial part). The photosensitive drum 31 may be rotated clockwise in this example by power transmitted from an unillustrated drum motor. The photosensitive drum 31 may be electrically charged by the charging roller 34 and subjected to exposure by the exposure head 23. An electrostatic latent image may be thereby formed on the surface of the photosensitive drum 31. Further, the toner may be fed to the photosensitive drum 31 by the developing roller 36. A toner image based on the electrostatic latent image may be thereby formed on the photosensitive drum 31.

The cleaning blade 32 may scrape off the toner remaining on the surface (the surficial part) of the photosensitive drum 31 and clean the surface of the photosensitive drum 31. The toner scraped off may be conveyed by a conveying spiral 33 and collected as a waste toner in an unillustrated waste toner box. The waste toner box may be provided in the toner container 22.

The charging roller 34 may electrically charge the surface (the surficial part) of the photosensitive drum 31. The charging roller 34 may be disposed in contact with a surface (a circumferential surface) of the photosensitive drum 31. The charging roller 34 may be so disposed as to be pressed against the photosensitive drum 31 by a predetermined pressing amount. The charging roller 34 may rotate counterclockwise in this example in accordance with the rotation of the photosensitive drum 31. The charging roller 34 may receive a charging voltage from a high-voltage electric power source 66 which will be described later.

The cleaning roller 35 may clean the charging roller 34. The cleaning roller 35 may be so disposed as to be in contact with a surface (a circumferential surface) of the charging roller 34. The cleaning roller 35 may be so disposed as to be pressed against the charging roller 34 by a predetermined pressing amount. The cleaning roller 35 may be rotated clockwise in this example by power transmitted from an unillustrated drum motor.

The developing roller 36 may carry the toner on its surface. The developing roller 36 may be so disposed as to be in contact with the surface (the circumferential surface) of the photosensitive drum 31. The developing roller 36 may be so disposed as to be pressed against the photosensitive drum 31 by a predetermined pressing amount. The developing roller 36 may be rotated counterclockwise in this example by power transmitted from an unillustrated drum motor. The developing roller 36 may receive a developing voltage from the high-voltage electric power source 66 which will be described later.

The developing blade 37 may form a layer including the toner, i.e., a toner layer, on the surface of the developing roller 36 and control or adjust the thickness of the toner layer by being brought into contact with the surface of the developing roller 36. The developing blade 37 may have a bent part and may be so disposed that the bent part comes into contact with the surface of the developing roller 36. The developing blade 37 may be also so disposed as to be pressed against the developing roller 36 by a predetermined pressing amount. The developing blade 37 may receive a limiting voltage from the high-voltage electric power source 66 which will be described later.

The feeding roller 38 may feed the toner contained in the toner container 22 to the developing roller 36. The feeding roller 38 may be so disposed as to be in contact with a surface (a circumferential surface) of the developing roller 36. The feeding roller 38 may be also so disposed as to be pressed against the developing roller 36 by a predetermined pressing amount. The feeding roller 38 may be rotated counterclockwise in this example by power transmitted from an unillustrated drum motor. Accordingly, friction may be generated between the surface of the feeding roller 38 and the surface of the developing roller 36 in each of the developing units 21. As a result, the toner may be electrically charged by a so-called triboelectric effect in each of the developing units 21. The feeding roller 38 may receive a feeding voltage from the high-voltage electric power source 66 which will be described later.

The exposure head 23 may apply light to the photosensitive drum 31. The exposure head 23 may include, for example but not limited to, a plurality of light-emitting diodes disposed side by side in a main scanning direction. The main scanning direction may be an X-direction in FIG. 2. The exposure head 23 may apply light to the photosensitive drum 31 on a dot-unit basis with use of the light-emitting diodes. The exposure head 23 may thereby perform exposure on the corresponding photosensitive drum 31, allowing for formation of an electrostatic latent image on the surface of the photosensitive drum 31.

The transfer section 40 may transfer the three toner images formed by the developing section 20 onto a transfer surface of the medium 9B. The transfer section 40 may include a transfer belt 41, three transfer rollers 42, a driving roller 43, a tension roller 44, a belt cleaning blade 45, a roller 46, and a waste toner box 47. The three transfer rollers 42 may include transfer rollers 42C, 42M, and 42Y.

The transfer belt 41 may be or include an endless elastic belt. The transfer belt 41 may convey the medium 9B along the conveyance path 8 in a conveyance direction F. The transfer belt 41 may lie on the driving roller 43 and the tension roller 44 while being stretched. The transfer belt 41 may be conveyed circularly in accordance with the rotation of the driving roller 43.

The transfer roller 42C may oppose the photosensitive drum 31 of the developing unit 21C with the conveyance path 8 and the transfer belt 41 interposed therebetween. The transfer roller 42M may oppose the photosensitive drum 31 of the developing unit 21M with the conveyance path 8 and the transfer belt 41 interposed therebetween. The transfer roller 42Y may oppose the photosensitive drum 31 of the developing unit 21Y with the conveyance path 8 and the transfer belt 41 interposed therebetween. The transfer rollers 42C, 42M, and 42Y may each receive a transfer voltage from the high-voltage electric power source 66 which will be described later. With such a configuration, the image forming apparatus 1 may cause each of the toner images formed by the respective developing units 21 to be transferred onto the transfer surface of the medium 9.

The driving roller 43 may circularly convey the transfer belt 41. In this example, the driving roller 43 may be disposed downstream of the three developing units 21 in the conveyance direction F of the medium 9B. The driving roller 43 may be rotated counterclockwise in this example by power transmitted from an unillustrated belt motor.

The tension roller 44 may allow the transfer belt 41 to be lain while being stretched. The tension roller 44 may be also rotated in accordance with the circular conveyance of the transfer belt 41. In this example, the tension roller 44 may be disposed upstream of the three developing units 21 in the conveyance direction F of the medium 9B.

The belt cleaning blade 45 may scrape off the toner attached to the surface of the transfer belt 41 and thereby clean the surface of the transfer belt 41. The belt cleaning blade 45 may be disposed on a path different from the conveyance path 8 in a circular conveyance path of the transfer belt 41. The path on which the belt cleaning blade 45 is disposed may be a path illustrated in a lower part of FIG. 1. The toner scraped off may be collected in the waste toner box 47 as a waste toner.

The roller 46 may oppose the belt cleaning blade 45 with the transfer belt 41 interposed therebetween. The roller 46 may cause the belt cleaning blade 45 to come into contact with the surface of the transfer belt 41.

The waste toner box 47 may contain the waste toner, i.e., the toner scraped off by the belt cleaning blade 45.

The density sensor 17 may detect a density of the toner on the surface of the transfer belt 41. The density sensor 17 may be disposed upstream of the belt cleaning blade 45 on the circular conveyance path of the transfer belt 41 in this example. The density sensor 17 may detect, upon density correction operation, a density detection pattern formed on the transfer belt 41 by the developing section 20, for example. The image forming apparatus 1 may correct the toner density on the basis of a result of the detection performed by the density sensor 17.

The discharge sensor 18 may detect discharge of the medium 9B from the image forming apparatus 1.

The fixing section 50 may apply heat and pressure to the medium 9B, thereby fixing, to the medium 9B, the toner image transferred on the medium 9B.

Figure 3:
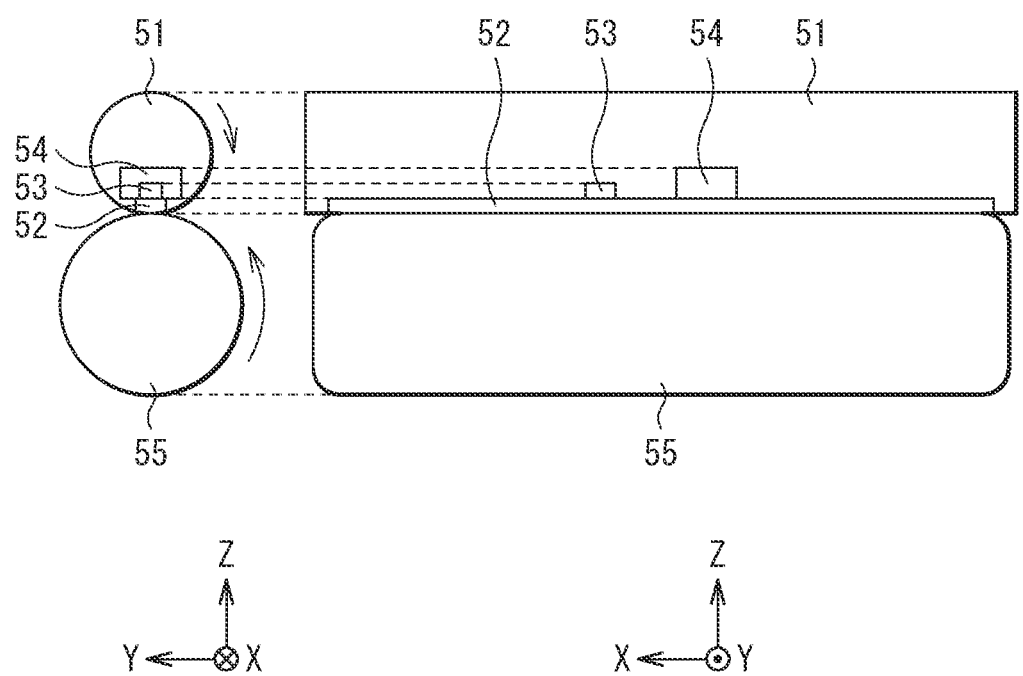
FIG. 3 is a diagram illustrating an example of a configuration of a fixing section illustrated in FIG. 1.

FIG. 3 illustrates an example of a configuration of the fixing section 50. The fixing section 50 may include a fixing belt 51, a heater 52, a thermistor 53, a thermostat 54, and a backup roller 55. The fixing belt 51 may be an endless elastic belt. The fixing belt 51 may lie on members, including an unillustrated guide and an unillustrated roller, while being stretched. The fixing belt 51 may be circularly conveyed clockwise in this example in accordance with rotation of the backup roller 55. The heater 52 may include, for example but not limited to, a halogen heater. The heater 52 may be disposed inside a circular conveyance path of the fixing belt 51 at a position corresponding to a position of the backup roller 55. The thermistor 53 may detect a temperature of the heater 52. The thermistor 53 may be disposed in the vicinity of the heater 52. The thermostat 54 may include a bimetallic strip in this example. The thermostat 54 may stop electric power supply to the heater 52 in order to increase safety in a case where the temperature of the heater 52 is high. The backup roller 55 may be disposed outside the circular conveyance path of the fixing belt 51 at a position corresponding to a position of the heater 52. The backup roller 55 may be rotated counterclockwise in this example by power transmitted from an unillustrated fixing motor.

With this configuration, the fixing section 50 may involve a contact provided between the fixing belt 51 and the backup roller 55. The medium 9B may be conveyed along the conveyance path 8 and pass through the contact between the fixing belt 51 and the backup roller 55. The toner on the medium 9B may be thereby heated, melted, and applied with pressure. As a result, the toner image may be fixed to the medium 9B.

The discharging roller 19 may include a pair of rollers with the conveyance path 8 interposed therebetween. The discharging roller 19 may convey the medium 9B toward outside of the image forming apparatus 1.

Figure 4:
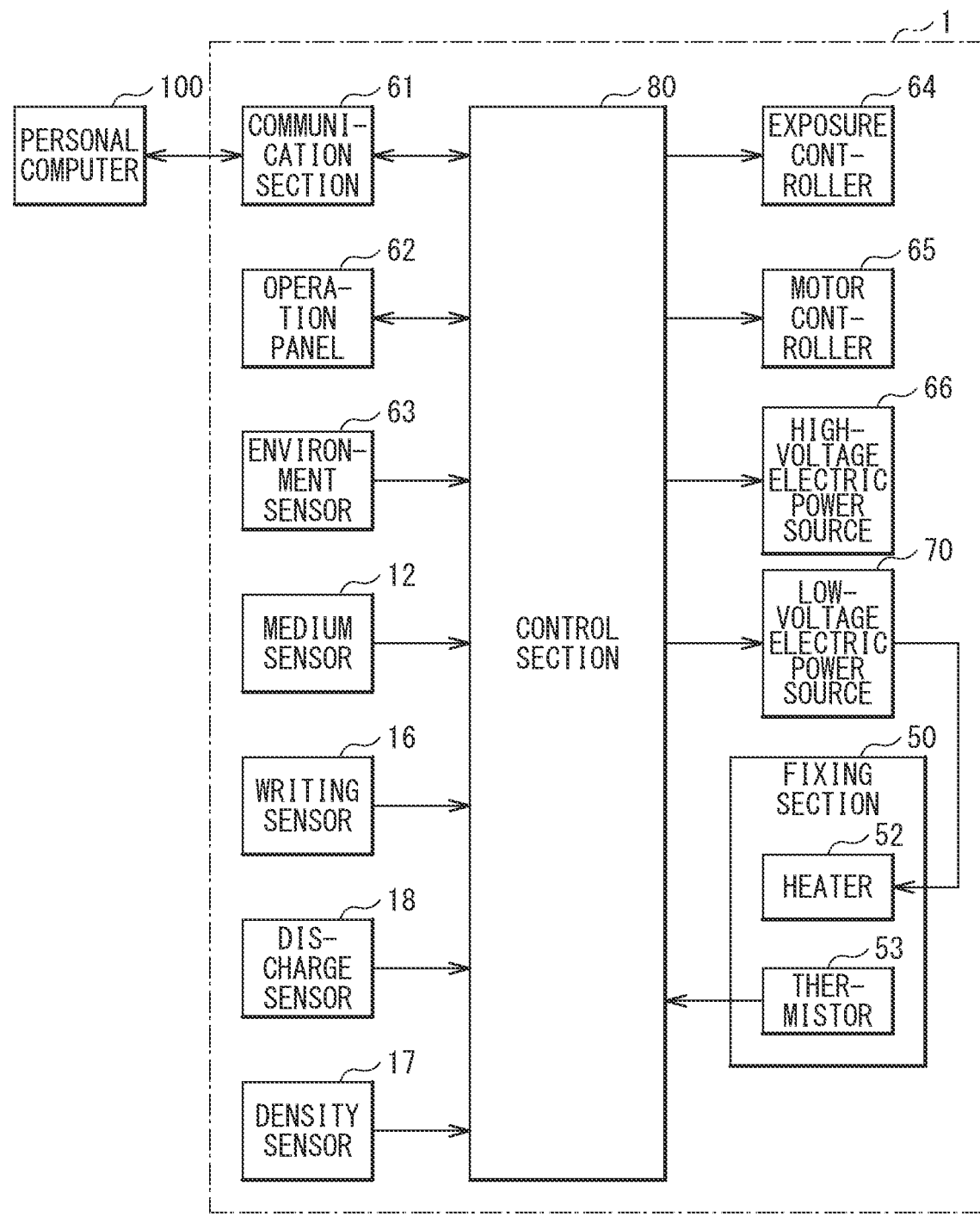
FIG. 4 is a block diagram illustrating an example of a configuration of a control system of the image forming apparatus illustrated in FIG. 1.

FIG. 4 illustrates an example of a configuration of a control system of the image forming apparatus 1. The image forming apparatus 1 may include a communication section 61, an operation panel 62, an environment sensor 63, an exposure controller 64, a motor controller 65, the high-voltage electric power source 66, a low-voltage electric power source 70, and a control section 80.

The communication section 61 may perform communication with use of, for example but not limited to, a universal serial bus (USB) or a local area network (LAN). The communication section 61 may receive, for example, print data supplied from a personal computer 100.

The operation panel 62 may receive operation performed by a user and display information such as an operating state of the image forming apparatus 1. The operation panel 62 may include, for example but not limited to, various buttons, a touch panel, a liquid crystal display, and various indicators.

The environment sensor 63 may detect a temperature and a humidity around the image forming apparatus 1.

The exposure controller 64 may control exposure operation of each of the three exposure heads 23 on the basis of an instruction given from the control section 80.

The motor controller 65 may control operation of various motors of the image forming apparatus 1 on the basis of an instruction given from the control section 80.

The high-voltage electric power source 66 may generate the charging voltage, the developing voltage, the limiting voltage, the feeding voltage, and the transfer voltage used in the developing section 20 or the transfer section 40 on the basis of an instruction given from the control section 80.

The low-voltage electric power source 70 may generate a direct-current electric power source signal on the basis of an alternating-current electric power source signal supplied from an external alternating-current electric power source. The direct-current electric power source signal may be used in the image forming apparatus 1, and may have, for example, a voltage of 5 V or 24 V. The external alternating-current electric power source may be, for example, an alternating-current electric power source 101 which will be described later. The low-voltage electric power source 70 may control electric power supply to the heater 52 of the fixing section 50. The heater 52 of the fixing section 50 may generate heat in accordance with the electric power supply from the low-voltage electric power source 70. The thermistor 53 may detect the temperature of the heater 52, and supply a result of the detection to the control section 80.

The control section 80 may control operation of each block in the image forming apparatus 1, thereby controlling general operation of the image forming apparatus 1. The control section 80 may include, for example but not limited to, a central processing unit (CPU), a random-access memory (RAM) temporarily storing information, and a read-only memory (ROM) holding a program to be executed by the CPU. The control section 80 may give an instruction to any of the exposure controller 64, the motor controller 65, the high-voltage electric power source 66, and the low-voltage electric power source 70 on the basis of any of the print data received by the communication section 61 and results of detection performed by the environment sensor 63, the medium sensor 12, the writing sensor 16, the discharge sensor 18, the density sensor 17, and the thermistor 53, and thereby perform control that causes the image forming apparatus 1 to perform image formation operation.

Described next is an example of a configuration related to electric power supply to the heater 52 of the fixing section 50.

Figure 5:
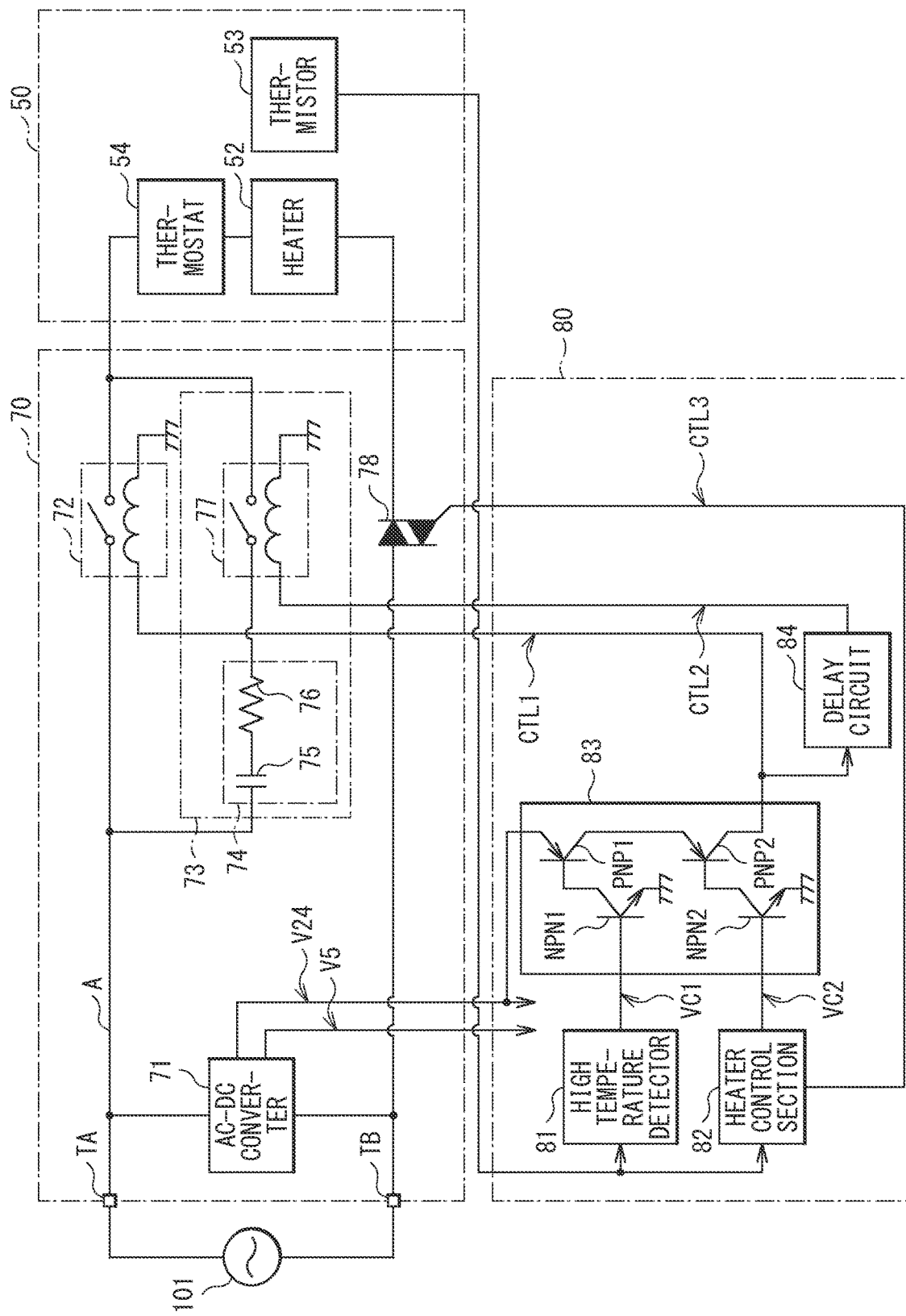
FIG. 5 is a circuit diagram illustrating an example of a configuration of a low-pressure electric power source, the fixing section, and a control section according to one example embodiment of the technology.

FIG. 5 illustrates an example of a configuration of the low-voltage electric power source 70, the fixing section 50, and the control section 80 related to the electric power supply to the heater 52.

The low-voltage electric power source 70 may include an AC-DC converter 71, a main relay 72, an arc suppression circuit 73, and a triac 78. The low-voltage electric power source 70 and the fixing section 50 may be provided with an electric power supply path A between a terminal TA and a terminal TB both coupled to the alternating-current electric power source 101. The AC-DC converter 71, the main relay 72, the arc suppression circuit 73, the thermostat 54, the heater 52, and the triac 78 may be disposed along the electric power supply path A. The alternating-current electric power source 101 may be, for example but not limited to, a system electric power source or an electric power source apparatus that includes a battery and a DC-AC inverter.

The AC-DC converter 71 may generate a direct-current electric power source signal on the basis of an alternating-current electric power source signal received from the alternating-current electric power source 101. In this example, the AC-DC converter 71 may generate a direct-current electric power source voltage V5 of 5 V and a direct-current electric power source voltage V24 of 24 V. The low-voltage electric power source 70 may supply the direct-current electric power source voltage V5 and the direct-current electric power source voltage V24 to any of various circuits of the image forming apparatus 1.

The main relay 72 may be to be in an open state (an OFF state) or a closed state (an ON state) on the basis of a control signal CTL1. The main relay 72 may be a mechanical relay including a coil and a contact. The main relay 72 may be a so-called normally open relay that is in the closed state in a case where a current flows through the coil and is in the open state in a case where no current flows through the coil. A first end of the contact of the main relay 72 may be coupled to the terminal TA, and a second end of the contact of the main relay 72 may be coupled to a first end of the thermostat 54. A first end of the coil of the main relay 72 may receive the control signal CTL1, and a second end of the coil of the main relay 72 may be grounded.

The arc suppression circuit 73 may suppress arc discharge at the contact of the main relay 72. In this example, the arc suppression circuit 73 may be coupled in parallel with the main relay 72. The arc suppression circuit 73 may include a snubber circuit 74 and a sub-relay 77. The snubber circuit 74 and the sub-relay 77 may be coupled in series.

The snubber circuit 74 may include a capacitor 75 and a resistor 76. A first end of the capacitor 75 may be coupled to the terminal TA, and a second end of the capacitor 75 may be coupled to a first end of the resistor 76. The first end of the resistor 76 may be coupled to the second end of the capacitor 75, and a second end of the resistor 76 may be coupled to the sub-relay 77. In one example embodiment, the resistor 76 may have a resistance which is the same as or similar to a resistance of the heater 52. In one example embodiment, the capacitor 75 may have a capacitance set to a value within a range from about 0.5 µF to 1 µF per 1 A on the basis of a current value of a heater current. For example, in a case where the heater 52 is of 1000 W, and is coupled to the alternating-current electric power source 101 of 100 V, for example, the resistance of the resistor 76 may be set to 10Ω, and the capacitance of the capacitor 75 may be set to 10 µF. In a case where the heater 52 is coupled to the alternating-current electric power source 101 of 230 V, for example, the resistance of the resistor 76 may be set to 5Ω, and the capacitance of the capacitor 75 may be set to 5 µF.

The sub-relay 77 may be to be in the open state or the closed state on the basis of a control signal CTL2. The sub-relay 77 may be a mechanical relay including a coil and a contact. The sub-relay 77 may be a so-called normally open relay. A first end of the contact of the sub-relay 77 may be coupled to the second end of the resistor 76, and a second end of the contact of the sub-relay 77 may be coupled to the first end of the thermostat 54. A first end of the coil of the sub-relay 77 may receive the control signal CTL2, and a second end of the coil of the sub-relay 77 may be grounded.

With this configuration, when the sub-relay 77 is brought into the closed state (the ON state), the first and the second ends of the main relay 72 may be thereby coupled to each other via the snubber circuit 74. In this case, for example, it is possible to suppress arc discharge at the contact of the main relay 72 when the main relay 72 is varied from the closed state (the ON state) to the open state (the OFF state), which will be described later. Thus, operation of suppressing the arc discharge at the contact of the main relay 72 may be "enabled" by bringing the sub-relay 77 into the closed state (the ON state), and the operation of suppressing the arc discharge at the contact of the main relay 72 may be limited by bringing the sub-relay 77 into the open state (the OFF state).

In the fixing section 50, the first end of the thermostat 54 may be coupled to both the second end of the contact of the main relay 72 and the second end of the contact of the sub-relay 77. A second end of the thermostat 54 may be coupled to the first end of the heater 52. The first end of the heater 52 may be coupled to the second end of the thermostat 54, and the second end of the heater 52 may be coupled to the triac 78.

The triac 78 may control electric power supply to the heater 52 on the basis of a control signal CTL3. A first end of the triac 78 may be coupled to the second end of the heater 52, a second end of the triac 78 may be coupled to the terminal TB, and a control terminal of the triac 78 may receive the control signal CTL3.

The control section 80 may include a high temperature detector 81, a heater control section 82, a signal generation circuit 83, and a delay circuit 84.

In a case where the temperature of the heater 52 exceeds a predetermined threshold temperature Tth on the basis of a result of detection performed by the thermistor 53, the high temperature detector 81 may bring each of the main relay 72 and the sub-relay 77 into the open state (the OFF state) in order to increase safety. For example, the high temperature detector 81 may set a control voltage VC1 to a low level in the case where the temperature of the heater 52 exceeds the predetermined threshold temperature Tth. This may set each of the control signals CTL1 and CTL2 to the low level, and bring each of the main relay 72 and the sub-relay 77 into the open state. As a result, the electric power supply to the heater 52 may be stopped. In a case where the temperature of the heater 52 is equal to or lower than the predetermined threshold temperature Tth, the high temperature detector 81 may set the control voltage VC1 to a high level. Thus, the high temperature detector 81 may bring the main relay 72 and the sub-relay 77 into the open state in the case where the temperature of the heater 52 exceeds the predetermined temperature Tth.

The heater control section 82 may control the electric power supply to the heater 52 on the basis of the result of the detection performed by the thermistor 53. For example, the heater control section 82 may be set a control voltage VC2 to a high level in a case where the image forming apparatus 1 is to perform image formation operation. In a case where the temperature of the heater 52 is equal to or lower than the predetermined threshold temperature Tth, this may set each of the control signals CTL1 and CTL2 to a high level, and may bring each of the main relay 72 and the sub-relay 77 into the closed state (the ON state). Further, the heater control section 82 may generate the control signal CTL3 on the basis of the result of the detection performed by the thermistor 53, and thereby so control ON-OFF operation of the triac 78 that the temperature of the heater 52 is kept at a temperature suitable for the fixing operation. The temperature suitable for the fixing operation may be, for example, about 180° C. For example, in a case where the image forming apparatus 1 is not to perform the image formation operation, the heater control section 82 may set the control voltage VC2 to a low level. This may set each of the control signals CTL1 and CTL2 to a low level, and bring each of the main relay 72 and the sub-relay 77 into the open state (the OFF state). As a result, the electric power supply to the heater 52 may be stopped. Thus, the heater control section 82 may control the electric power supply to the heater 52.

The signal generation circuit 83 may generate the control signal CTL1 on the basis of the control voltages VC1 and VC2. The signal generation circuit 83 may include transistors NPN1, NPN2, PNP1, and PNP2. The transistors NPN1 and NPN2 may each be an NPN bipolar transistor, and the transistors PNP1 and PNP2 may each be a PNP bipolar transistor. A collector of the transistor NPN1 may be coupled to a base of the transistor PNP1, a base of the transistor NPN1 may receive the control voltage VC1, and an emitter of the transistor NPN1 may be grounded. A collector of the transistor NPN2 may be coupled to a base of the transistor PNP2, a base of the transistor NPN2 may receive the control voltage VC2, and an emitter of the transistor NPN2 may be grounded. An emitter of the transistor PNP1 may receive the direct-current electric power source voltage V24, the base of the transistor PNP1 may be coupled to the collector of the transistor NPN1, and a collector of the transistor PNP1 may be coupled to an emitter of the transistor PNP2. The emitter of the transistor PNP2 may be coupled to the collector of the transistor PNP1, the base of the transistor PNP2 may be coupled to the collector of the transistor NPN2, and a collector of the transistor PNP2 may be coupled to the coil of the main relay 72 and the delay circuit 84. The signal generation circuit 83 may output the control signal CTL1 from the collector of the transistor PNP2.

Note that, although the bipolar transistors are used to provide the signal generation circuit 83 in this example, this is non-limiting. Alternatively, for example, a metal oxide semiconductor field effect transistor (MOSFET) may be used to provide the signal generation circuit 83.

The delay circuit 84 may delay the control signal CTL1 and thereby generate the control signal CTL2. An input terminal of the delay circuit 84 may be coupled to the collector of the transistor PNP2 of the signal generation circuit 83, and an output terminal of the delay circuit 84 may be coupled to the first end of the coil of the sub-relay 77. In the image forming apparatus 1, the provision of the delay circuit 84 may allow, for example, when the main relay 72 is varied from the closed state (the ON state) to the open state (the OFF state), the sub-relay 77 to keep being in the closed state (the ON state) during a time period corresponding to a delay time Td of the delay circuit 84. Accordingly, it is possible to suppress the arc discharge at the contact of the main relay 72. The delay circuit 84 may include, for example but not limited to, one or more resistors and one or more capacitors. In this case, the delay time Td may be set with use of a time constant calculated with use of a resistance or resistances of the one or more resistors and a capacitance or capacitances of the one or more capacitors.

The low-voltage electric power source 70 and the control section 80 may correspond to a "load controller" in one specific but non-limiting embodiment of the technology. The triac 78 may correspond to a "control device" in one specific but non-limiting embodiment of the technology. The heater 52 may correspond to a "load" in one specific but non-limiting embodiment of the technology. The main relay 72 may correspond to a "switching device" in one specific but non-limiting embodiment of the technology. The arc suppression circuit 73 may correspond to an "arc suppression circuit" in one specific but non-limiting embodiment of the technology. The control section 80 may correspond to a "control section" in one specific but non-limiting embodiment of the technology. The delay circuit 84 may correspond to a "delay circuit" in one specific but non-limiting embodiment of the technology. The control signal CTL1 may correspond to a "first control signal" in one specific but non-limiting embodiment of the technology. The control signal CTL2 may correspond to a "second control signal" in one specific but non-limiting embodiment of the technology. The control signal CTL3 may correspond to a "third control signal" in one specific but non-limiting embodiment of the technology. The developing section 20 may correspond to an "image forming section" in one specific but non-limiting embodiment of the technology. The fixing section 50 may correspond to a "fixing section" in one specific but non-limiting embodiment of the technology.

[Example Operation and Example Workings]

A description is given below of example operation and example workings of the image forming apparatus 1 according to the first example embodiment.

[Overview of Overall Operation]

A description is given first of an overview of overall operation of the image forming apparatus 1 with reference to FIGS. 1 and 4. When the communication section 61 receives the print data supplied from the personal computer 100, the control section 80 may determine a target temperature of the fixing operation on the basis of the temperature and the humidity detected by the environment sensor 63, and control operation of the motor controller 65, the high-voltage electric power source 66, the low-voltage electric power source 70, and the exposure controller 64. The motor controller 65 may control operation of various motors including the conveying motor, the cutter motor, the drum motor, the belt motor, and the fixing motor. The high-voltage electric power source 66 may generate the charging voltage, the developing voltage, the limiting voltage, the feeding voltage, and the transfer voltage to be used in the developing section 20 and the transfer section 40. The low-voltage electric power source 70 may so control the electric power supply to the heater 52 that the heater 52 has the target temperature. The exposure controller 64 may control exposure operation of each of the three exposure heads 23.

The cutter 14A of the cutter section 14 may cut the medium 9 fed from the medium holder 11. The three developing units 21 of the developing section 20 may form the respective toner images of the three colors, i.e., the cyan toner image, the magenta toner image, and the yellow toner image. The transfer section 40 may convey the cut medium 9B along the conveyance path 8, and transfer, onto the medium 9B, the toner images on the respective photosensitive drums 31 of the three developing units 21. The fixing section 50 may fix, to the medium 9B, the toner image transferred on the medium 9B. The discharging roller 19 may convey the medium 9B toward outside of the image forming apparatus 1.

[Detailed Operation]

A description is given next of details of the operation of electric power supply to the heater 52 in a case where the image forming apparatus 1 is to perform the image formation operation.

Figure 6:
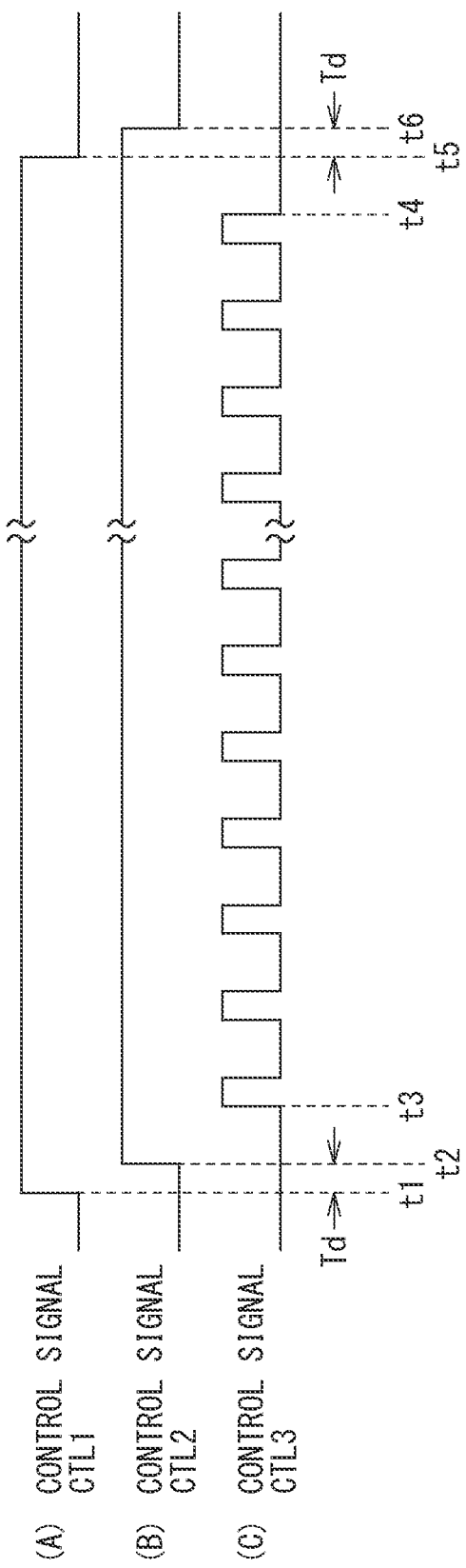
FIG. 6 is a timing waveform chart illustrating an example of operation of the image forming apparatus according to one example embodiment.

FIG. 6 illustrates an example of the operation of the electric power supply to the heater 52. (A) of FIG. 6 illustrates a waveform of the control signal CTL1 supplied to the main relay 72, (B) of FIG. 6 illustrates a waveform of the control signal CTL2 supplied to the sub-relay 77, and (C) of FIG. 6 illustrates a waveform of the control signal CTL3 supplied to the triac 78.

Referring to (A) of FIG. 6, in the case where the image forming apparatus 1 is to perform the image formation operation, at a timing t1, the signal generation circuit 83 may cause the control signal CTL1 to transition from a low level to a high level on the basis of the control voltages VC1 and VC2. For example, the heater control section 82 may cause the control voltage VC2 to transition from the low level to the high level, and the signal generation circuit 83 may cause the control signal CTL1 to transition from the low level to the high level on the basis of such transition of the control voltage VC2. Accordingly, a current may flow through the coil of the main relay 72, varying the main relay 72 from the open state (the OFF state) to the closed state (the ON state).

Referring to (B) of FIG. 6, the delay circuit 84 may cause, on the basis of the transition of the control signal CTL1 at the timing t1, the control signal CTL2 to transition from the low level to the high level at a timing t2. The timing t2 may be a timing after a lapse of the delay time Td from the timing of the transition of the control signal CTL1. Accordingly, a current may flow through the coil of the sub-relay 77, varying the sub-relay 77 from the open state (the OFF state) to the closed state (the ON state). This may "enable" the operation, of the arc suppression circuit 73, of suppressing the arc discharge at the contact of the main relay 72.

Referring to (C) of FIG. 6, at a timing t3 after the timing t2, the heater control section 82 may start causing the control signal CTL3 to transition between the low level and the high level on the basis of a result of detection performed by the thermistor 53. The triac 78 may be brought into the ON state when the control signal CTL3 transitions from the low level to the high level. The triac 78 may be brought into the OFF state at a zero-cross timing of the alternating-current electric power source signal. In a period during which the triac 78 is in the ON state, the heater 52 may receive electric power and thereby generate heat. The heater control section 82 may so control the ON-OFF operation of the triac 78 by generating the control signal CTL3 on the basis of the result of the detection performed by the thermistor 53, that the heater 52 has the target temperature (e.g., about 180° C.) suitable for the fixing operation and keeps having the target temperature. Further, the image forming apparatus 1 may perform the image formation operation, forming an image on the medium 9B.

In a case where the image forming apparatus 1 is to end the image formation operation, at a timing t4, the heater control section 82 may stop the transition of the control signal CTL3 and keep the control signal CTL3 at the low level, as illustrated in (C) of FIG. 6. Accordingly, the triac 78 may be brought into the OFF state and kept in the OFF state at the zero-cross timing of the alternating-current electric power source signal. As a result, the electric power supply to the heater 52 may be stopped.

Thereafter, at a timing t5, the signal generation circuit 83 may cause the control signal CTL1 to transition from the high level to the low level on the basis of the control voltages VC1 and VC2, as illustrated in (A) of FIG. 6. For example, the heater control section 82 may cause the control voltage VC2 to transition from the high level to the low level, and the signal generation circuit 83 may cause the control signal CTL1 to transition from the high level to the low level on the basis of such transition of the control voltage VC2. Accordingly, the current may stop flowing through the coil of the main relay 72, varying the main relay 72 from the closed state (the ON state) to the open state (the OFF state).

The delay circuit 84 may cause the control signal CTL2 to transition from the high level to the low level at a timing t6 on the basis of the transition of the control signal CTL1 at the timing t5, as illustrated in (B) of FIG. 6. The timing t6 may be a timing after a lapse of the delay time Td from the timing of the transition of the control signal CTL1. Accordingly, the current may stop flowing through the coil of the sub-relay 77, varying the sub-relay 77 from the closed state (the ON state) to the open state (the OFF state). This may limit the operation, of the arc suppression circuit 73, of suppressing the arc discharge at the contact of the main relay 72.

Next, a description is given referring to an example case of using an electric power source apparatus that includes a battery and a DC-AC inverter as the alternating-current electric power source 101. Recently, widespread use of solar power generation has led to use of such an electric power source apparatus. In a case where the DC-AC inverter malfunctions in such an electric power source apparatus, the alternating-current electric power source 101 can possibly output a direct-current voltage.

If the arc suppression circuit 73 or the delay circuit 84 is not provided in the image forming apparatus 1, when the alternating-current electric power source 101 supplies the direct-current voltage in a period during which the image formation operation is performed, zero-cross of the electric power source signal supplied from the alternating-current electric power source 101 does not occur. This may cause the triac 78 to keep being in the ON state without being brought into the OFF state. As a result, the temperature of the heater 52 may continue to increase. In a case where the temperature of the heater 52 exceeds the predetermined temperature Tth, the high temperature detector 81 may set the control voltage VC1 to the low level. In accordance therewith, the signal generation circuit 83 may cause the control signal CTL1 to transition from the high level to the low level. Accordingly, the current stops flowing through the coil of the main relay 72, varying the main relay 72 from the closed state (the ON state) to the open state (the OFF state). However, for example, arc discharge can occur at the contact of the main relay 72 because two electrodes of the contact are to be separated from each other when a heater current of about 5

A is flowing. This can lead to welding of the two electrodes. In a case where the two electrodes of the contact are welded, the electric power supply to the heater 52 continues, and the temperature of the heater 52 continues to increase accordingly. Thereafter, the bimetal stripe of the thermostat 54 may warp, and thereby be to separate two electrodes of the thermostat 54 away from each other. However, arc discharge can also occur in the thermostat 54 in a similar manner, which can lead to welding of the two electrodes. In a case where the two electrodes of the thermostat 54 are welded, the electric power supply to the heater 52 continues, and the temperature of the heater 52 continues to increase accordingly until the heater 52 melts and is disconnected. In this case, the image forming apparatus 1 may need to be repaired.

In contrast, in the image forming apparatus 1 according to the first example embodiment, when the signal generation circuit 83 causes the control signal CTL1 to transition from the high level to the low level, the delay circuit 84 may cause the control signal CTL2 to transition from the high level to the low level at a timing after a lapse of the delay time Td from the timing of such transition of the control signal CTL1, as illustrated in FIG. 6. That is, the sub-relay 77 may keep being in the closed state (the ON state) during a period from the timing of the transition of the control signal CTL1 from the high level to the low level to the timing of the lapse of the delay time Td. In other words, the arc suppression circuit 73 may be "enabled" in this period. Accordingly, when the two electrodes of the contact of the main relay 72 are separated from each other as a result of the transition of the control signal CTL1 from the high level to the low level, the arc suppression circuit 73 is able to suppress the arc discharge at the main relay 72. As a result, the main relay 72 is allowed to be varied from the closed state (the ON state) to the open state (the OFF state), making it possible to stop the electric power supply to the heater 52.

As described above, the arc suppression circuit 73 may be in the "enabled" state in the period from the timing of the transition of the control signal CTL1 from the high level to the low level to the timing of the lapse of the delay time Td. The length of this period, i.e., the delay time Td, may be set taking into consideration, for example but not limited to, any of a capacitance of a floating capacity of the contact of the main relay 72, a distance of a gap between the two electrodes of the contact, a current value of a heater current, and a voltage amplitude value of the alternating-current electric power source 101. It is possible to suppress the arc discharge at the main relay 72 by keeping the arc suppression circuit 73 in the "enabled" state in the period having such a time length after the transition of the control signal CTL1 from the high level to the low level.

As described above, it is possible to stop the electric power supply to the heater 52 by bringing the main relay 72 into the open state (the OFF state). Accordingly, for example, in a case of providing a fuse, a situation is avoidable that the image formation apparatus is not usable until the blown-off fuse is exchanged. It is therefore possible to increase user friendliness.

As described above, in the image forming apparatus 1, the arc suppression circuit 73 is to be set to the enabled state or the limited state, and the arc suppression circuit 73 is varied from the limited state to the enabled state after the main relay 72 is brought into the closed state (the ON state). Accordingly, for example, compared with a case where the arc suppression circuit 73 is constantly in the enabled state, it helps to reduce electric power consumption due to the current flowing through the coil of the sub-relay 77 or the snubber circuit 74, making it possible to suppress the arc discharge at the main relay 72 while reducing electric power consumption. As a result, it is possible to effectively stop the electric power supply to the heater 52 in the image forming apparatus 1.

Moreover, in the image forming apparatus 1, the arc suppression circuit 73 may be brought into the limited state after the main relay 72 is brought into the open state (the OFF state). Accordingly, for example, compared with the case where the arc suppression circuit 73 is constantly in the enabled state, it helps to reduce the current flowing through the coil of the sub-relay 77, making it possible to suppress the arc discharge at the main relay 72 while reducing electric power consumption. As a result, it is possible to effectively stop the electric power supply to the heater 52 in the image forming apparatus 1.

Moreover, in the image forming apparatus 1, the arc suppression circuit 73 is to be set to the enabled state or the limited state. For example, the sub-relay 77 may be provided, and the arc suppression circuit 73 may be set to the enabled state or the limited state by bringing the sub-relay 77 into the open state or the closed state. Accordingly, for example, in a case where the triac 78 malfunctions and keeps being in the ON state, it is possible to suppress electric power consumption. That is, if the snubber circuit 74 is provided and the sub-relay 77 is not provided, the both ends of the main relay 72 may be constantly coupled to each other via the snubber circuit 74. This makes it possible to suppress the arc discharge at the main relay 72. However, in a case where: the alternating-current electric power source signal is supplied from the alternating-current electric power source 101; and the triac 78 malfunctions and keeps being in the ON state, electric power can be supplied to the heater 52 via the snubber circuit 74 even if the main relay 72 is in the open state (the OFF state). This can lead to unnecessary electric power consumption. In contrast, the image forming apparatus 1 may be provided with the sub-relay 77. Accordingly, also in the case where the triac 78 malfunctions and keeps being in the ON state, it is possible to stop the electric power supply to the heater 52 by bringing the sub-relay 77 into the open state (the OFF state). It is therefore possible to suppress electric power consumption.

Moreover, the image forming apparatus 1 may be provided with the delay circuit 84. The delay circuit 84 may delay the control signal CTL1 and thereby generate the control signal CTL2. With this configuration, for example, also in a case where: the direct-current voltage, for example, of about 70 V is supplied from the alternating-current electric power source 101; the AC-DC converter 71 is prevented from generating the direct-current electric power source voltage V24; and the control signal CTL1 transitions from the high level to the low level, the control signal CTL2 may be kept at the high level until the timing after the lapse of the delay time Td from the timing of the transition of the control signal CTL1. Accordingly, the arc suppression circuit 73 is allowed to suppress the arc discharge at the main relay 72. As a result, it is possible to stop the electric power supply to the heater 52.

[Example Effects]

As described above, according to the first example embodiment, the arc suppression circuit is to be set to the enabled state or the limited state, and the arc suppression circuit is varied from the limited state to the enabled state after the main relay is brought into the closed state (the ON state). It is therefore possible to effectively stop the electric power supply to the heater.

According to the first example embodiment, the arc suppression circuit may be brought into the limited state after the main relay is brought into the open state (the OFF state). It is therefore possible to effectively stop the electric power supply to the heater.

According to the first example embodiment, the arc suppression circuit is to be set to the enabled state or the limited state. It is therefore possible to suppress electric power consumption.

According to the first example embodiment, the delay circuit may be provided. The delay circuit may delay the control signal CTL1 and thereby generate the control signal CTL2. It is therefore possible to stop the electric power supply to the heater.

[Modification 1-1]

Figure 7:
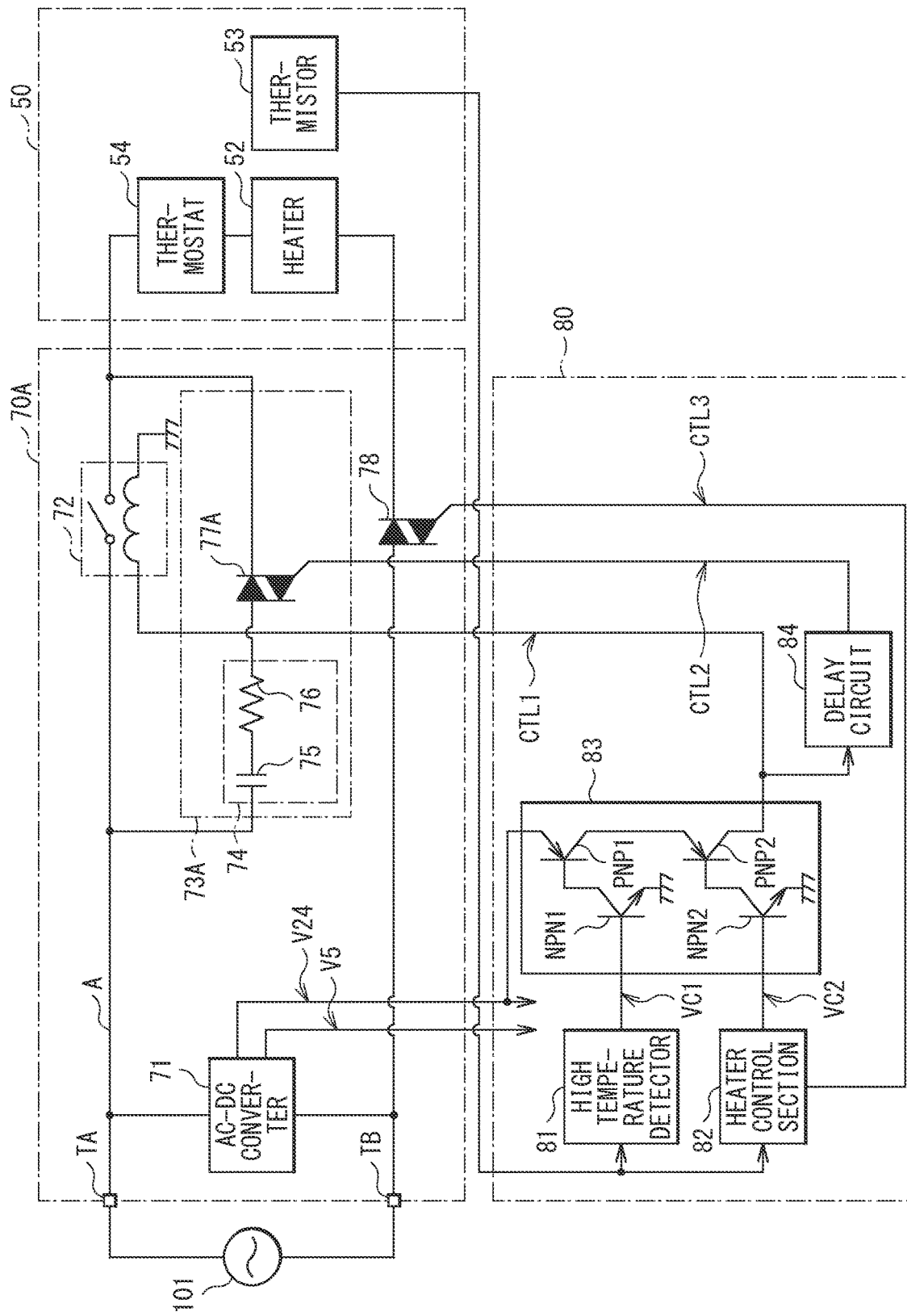
FIG. 7 is a circuit diagram illustrating an example of a configuration of the low-pressure electric power source, the fixing section, and the control section according to a modification of the example embodiment.

According to the first example embodiment described above, the arc suppression circuit 73 may include the sub-relay 77; however, this is non-limiting. Alternatively, any of various ON-OFF devices may be used. Non-limiting examples of the ON-OFF device may include a semiconductor device. Non-limiting examples of the semiconductor device may include a MOSFET and a triac. FIG. 7 illustrates an example of a low-voltage electric power source 70A in a case where the arc suppression circuit includes a triac. The low-voltage electric power source 70A may include an arc suppression circuit 73A. The arc suppression circuit 73A may include a triac 77A. A first end of the triac 77A may be coupled to the second end of the resistor 76, a second end of the triac 77A may be coupled to the first end of the thermostat 54, and a control terminal of the triac 77A may receive the control signal CTL2.

Figure 8:
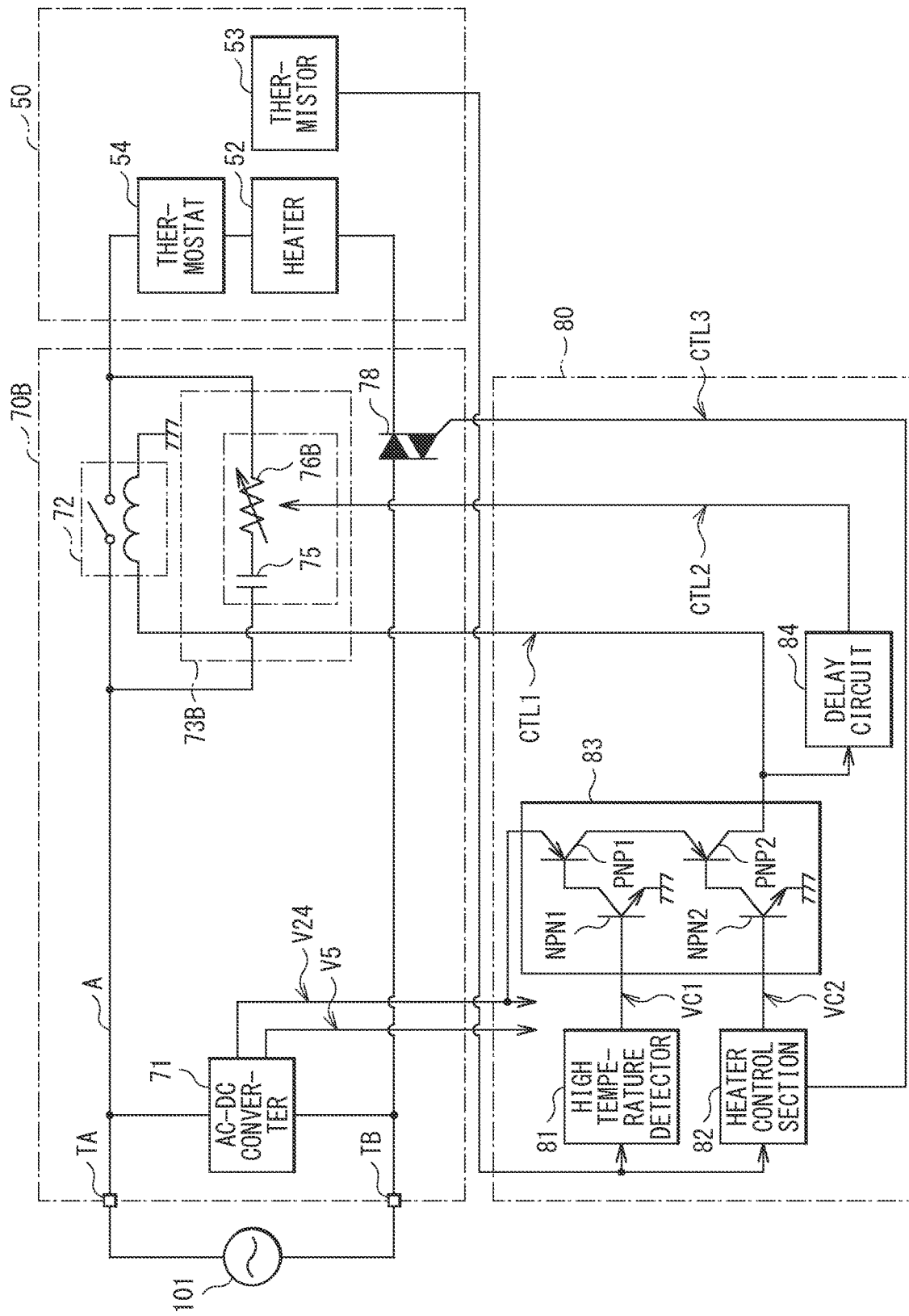
FIG. 8 is a circuit diagram illustrating an example of a configuration of the low-pressure electric power source, the fixing section, and the control section according to another modification of the example embodiment.

In another example, as in a low-voltage electric power source 70B illustrated in FIG. 8, the arc suppression circuit may include a variable resistor. The low-voltage electric power source 70B may include an arc suppression circuit 73B. The arc suppression circuit 73B may include the capacitor 75 and a variable resistor 76B. A first end of the variable resistor 76B may be coupled to the second end of the capacitor 75, a second end of the variable resistor 76B may be coupled to the first end of the thermostat 54, and a control terminal of the variable resistor 76B may receive the control signal CTL2. In a case where the control signal CTL2 is at the high level, the resistance of the variable resistor 76B may be about the same as or similar to the resistance of the resistor 76 according to the first example embodiment. In a case where the control signal CTL2 is at the low level, the resistance of the variable resistor 76B may be sufficiently higher than the resistance of the resistor 76. Thus, operation, of the arc suppression circuit 73B, of suppressing the arc discharge at the contact of the main relay 72 may become "enabled" in the case where the control signal CTL2 is at the high level, and the operation, of the arc suppression circuit 73B, of suppressing the arc discharge at the contact of the main relay 72 may be limited in the case where the control signal CTL2 is at the low level. In this case, the "limited" state refers not only to a state where it is not possible to suppress the arc discharge, but also to a state where the arc discharge is less suppressed than in a case of the "enabled" state.

[Modification 1-2]

Figure 9:
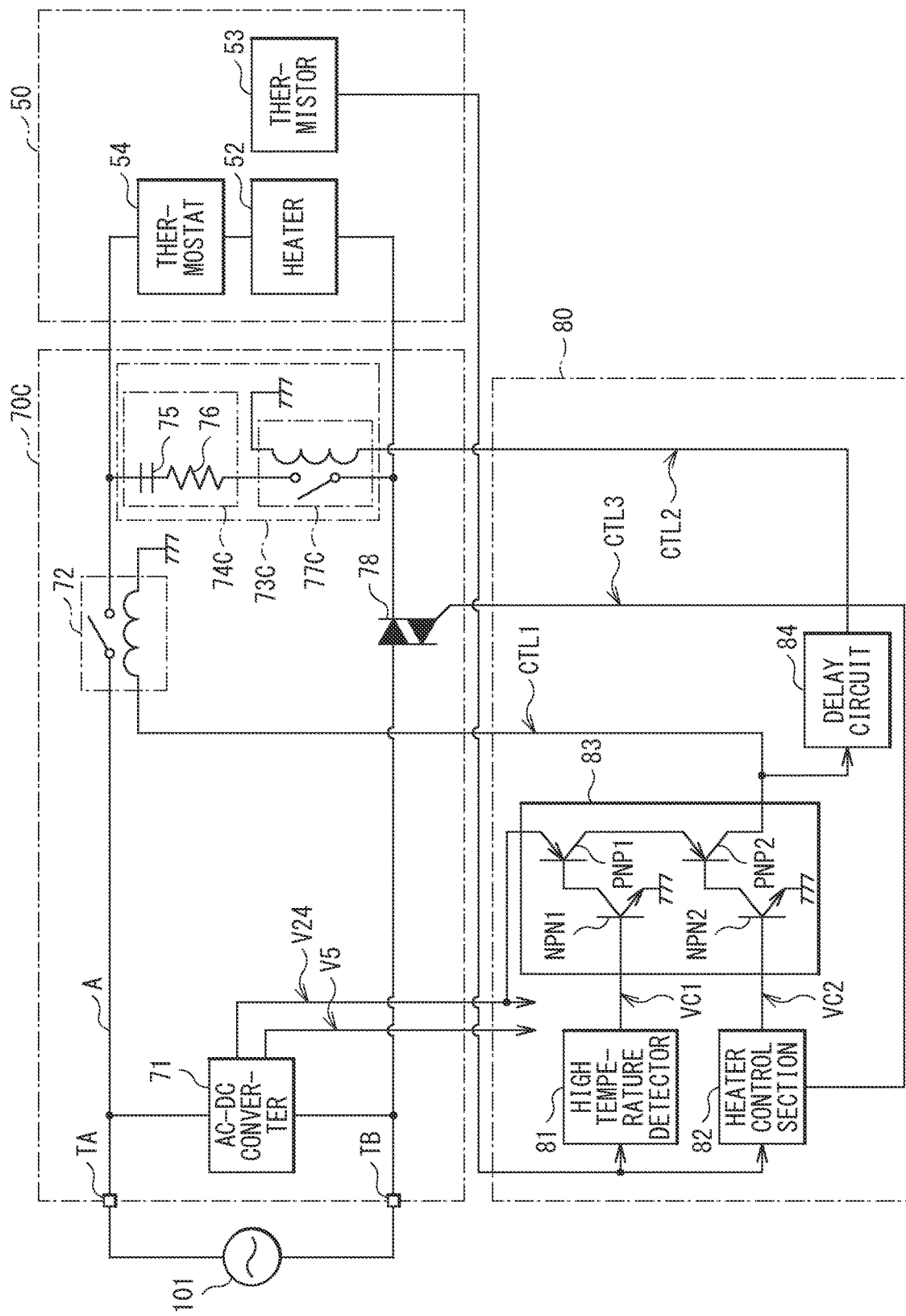
FIG. 9 is a circuit diagram illustrating an example of a configuration of the low-pressure electric power source, the fixing section, and the control section according to still another modification of the example embodiment.

According to the first example embodiment, the arc suppression circuit 73 and the main relay 72 may be coupled in parallel; however, this is non-limiting. Alternatively, in another example, as illustrated in FIG. 9, the arc suppression circuit, the heater 52, and the thermostat 54 may be coupled in parallel. A low-voltage electric power source 70C may include an arc suppression circuit 73C. The arc suppression circuit 73C may include a snubber circuit 74C and a sub-relay 77C. The snubber circuit 74C may include the capacitor 75 and the resistor 76. The first end of the capacitor 75 may be coupled to the second end of the contact of the main relay 72 and the first end of the thermostat 54. The second end of the capacitor 75 may be coupled to the first end of the resistor 76. The first end of the resistor 76 may be coupled to the second end of the capacitor 75, and the second end of the resistor 76 may be coupled to the sub-relay 77C. The sub-relay 77C may be a mechanical relay including a coil and a contact. The sub-relay 77C may be a so-called normally closed relay that is in the open state in a case where a current flows through the coil and is in the closed state in a case where no current flows through the coil. A first end of the contact of the sub-relay 77C may be coupled to the second end of the resistor 76. The second end of the contact of the sub-relay 77C may be coupled to the second end of the heater 52 and the first end of the triac 78. A first end of the coil of the sub-relay 77C may receive the control signal CTL2, and the second end of the coil of the sub-relay 77C may be grounded.

[Other Modifications]

Any two or more of the modifications described above may be combined.

2. Second Example Embodiment

A description is given below of an image forming apparatus 2 according to a second example embodiment of the technology. The second example embodiment may be different from the first example embodiment in a method of generating the control signals CTL1 and CTL2. Note that component parts that are substantially the same as those of the image forming apparatus 1 according to the first example embodiment are denoted with the same numerals and may not be described further where appropriate.

As with the image forming apparatus 1 according to the first example embodiment illustrated in FIG. 4, the image forming apparatus 2 may include the low-voltage electric power source 70, the fixing section 50, and a control section 180.

Figure 10:
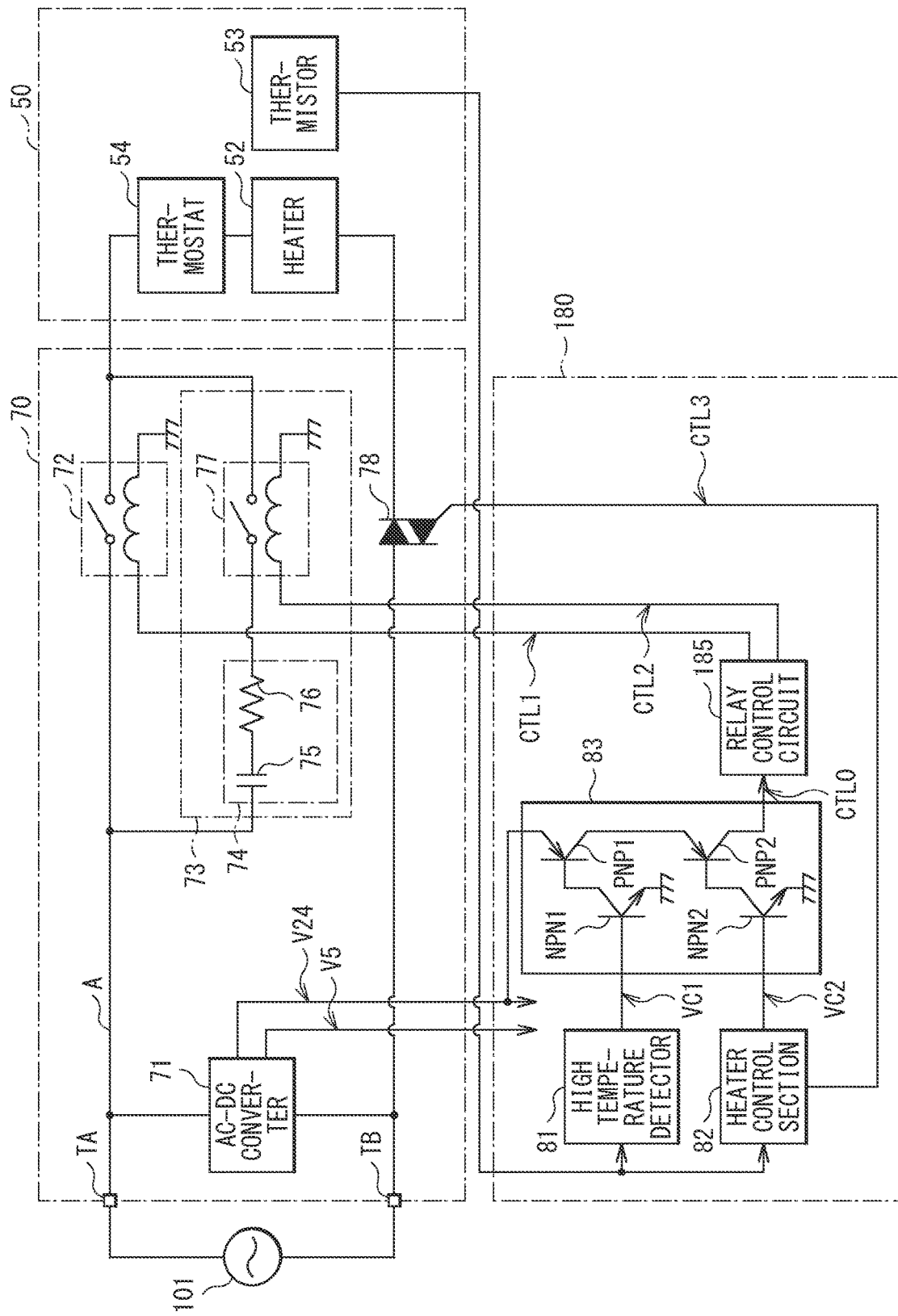
FIG. 10 is a circuit diagram illustrating an example of a configuration of the low-pressure electric power source, the fixing section, and the control section according to one example embodiment.

FIG. 10 illustrates an example of a configuration of the low-voltage electric power source 70, the fixing section 50, and the control section 180 related to the electric power supply to the heater 52. The control section 180 may include the high temperature detector 81, the heater control section 82, the signal generation circuit 83, and a relay control circuit 185. In the control section 180, the signal generation circuit 83 may generate a control signal CTL0 on the basis of the control voltages VC1 and VC2. The relay control circuit 185 may generate the control signals CTL1 and CTL2 on the basis of the control signal CTL0. For example, the relay control circuit 185 may so generate the control signal CTL1 that the control signal CTL1 transitions from the low level to the high level on the basis of a rising edge of the control signal CTL0 and the control signal CTL1 to transitions from the high level to the low level on the basis of a falling edge of the control signal CTL0 at a timing after a lapse of a predetermined time Td1 from the timing of the falling edge of the control signal CTL0. Further, the relay control circuit 185 may so generate the control signal CTL2 that the control signal CTL2 transitions from the low level to the high level on the basis of the falling edge of the control signal CTL0 and the control signal CTL2 transitions from the high level to the low level at a timing after a lapse of a predetermined time Td2 from the timing of the falling edge of the control signal CTL0. The predetermined time Td2 may be set to be longer than the predetermined time Td1. The control signal CTL0 may correspond to a "timing signal" in one specific but non-limiting embodiment of the technology.

Figure 11:
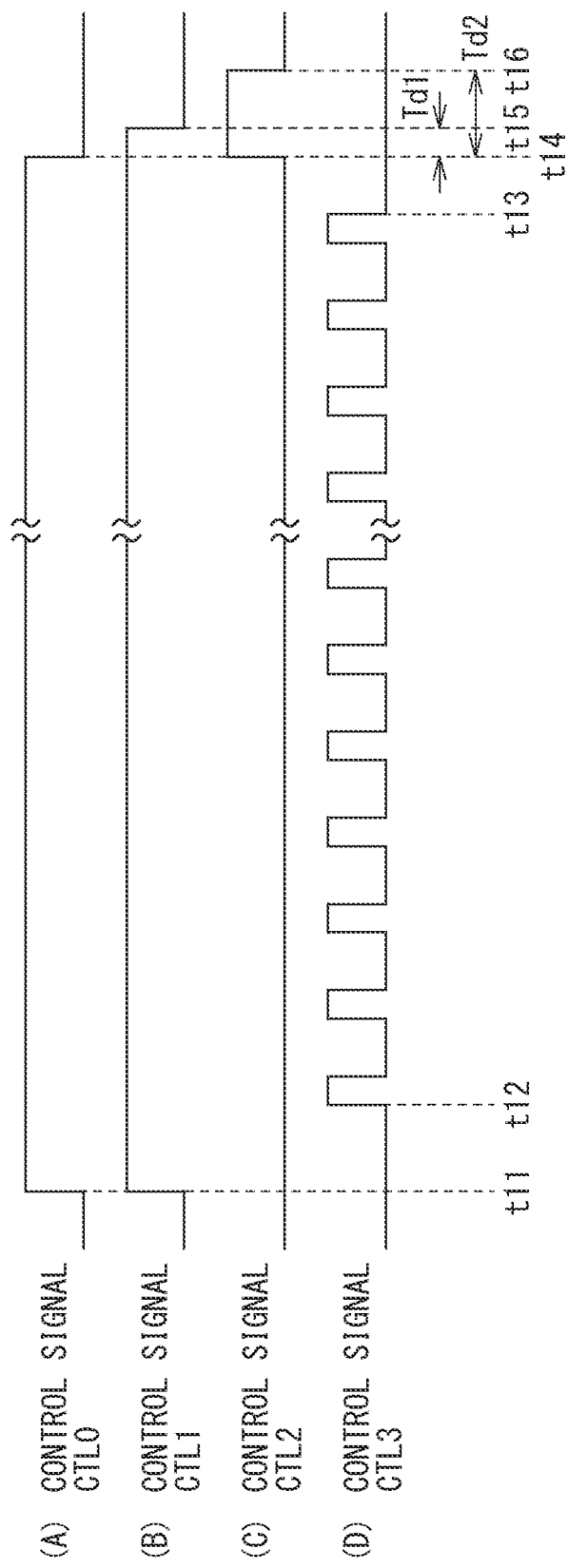
FIG. 11 is a timing waveform chart illustrating an example of operation of the image forming apparatus according to one example embodiment.

FIG. 11 illustrates an example of operation of the electric power supply to the heater 52. (A) of FIG. 11 illustrates a waveform of the control signal CTL0 generated by the signal generation circuit 83, (B) of FIG. 11 illustrates a waveform of the control signal CTL1 supplied to the main relay 72, (C) of FIG. 11 illustrates a waveform of the control signal CTL2 supplied to the sub-relay 77, and (D) of FIG. 11 illustrates a waveform of the control signal CTL3 supplied to the triac 78.

Referring to (A) of FIG. 11, in the case where the image forming apparatus 2 is to perform the image formation operation, at a timing t11, the signal generation circuit 83 may cause the control signal CTL0 to transition from a low level to a high level on the basis of the control voltages VC1 and VC2. For example, the heater control section 82 may cause the control voltage VC2 to transition from the low level to the high level, and the signal generation circuit 83 may cause the control signal CTL0 to transition from the low level to the high level on the basis of such transition of the control voltage VC2. Referring to (B) of FIG. 11, the relay control circuit 185 may cause the control signal CTL1 to transition from the low level to the high level on the basis of the transition of the control signal CTL0. Accordingly, a current may flow through the coil of the main relay 72, varying the main relay 72 from the open state (the OFF state) to the closed state (the ON state).

Referring to (D) of FIG. 11, at a timing t12 after the timing t11, the heater control section 82 may start causing the control signal CTL3 to transition between the low level and the high level on the basis of the result of the detection performed by the thermistor 53. The triac 78 may be brought into the ON state when the control signal CTL3 transitions from the low level to the high level. The triac 78 may be brought into the OFF state at a zero-cross timing of the alternating-current electric power source signal. In a period during which the triac 78 is in the ON state, the heater 52 may receive electric power and thereby generate heat. The heater control section 82 may so control the ON-OFF operation of the triac 78 by generating the control signal CTL3 on the basis of the result of the detection performed by the thermistor 53, that the heater 52 has the target temperature (e.g., about 180° C.) suitable for the fixing operation and keeps having the target temperature. Further, the image forming apparatus 2 may perform the image formation operation, forming an image on the medium 9B.

In a case where the image forming apparatus 2 is to end the image formation operation, at a timing t13, the heater control section 82 may stop the transition of the control signal CTL3 and keep the control signal CTL3 at the low level, as illustrated in (D) of FIG. 11. Accordingly, the triac 78 may be brought into the OFF state at the zero-cross timing of the alternating-current electric power source signal and keep being in the OFF state. As a result, the electric power supply to the heater 52 may be stopped.

Thereafter, at a timing t14, the signal generation circuit 83 may cause the control signal CTL0 to transition from the high level to the low level on the basis of the control voltages VC1 and VC2, as illustrated in (A) of FIG. 11. For example, the heater control section 82 may cause the control voltage VC2 to transition from the high level to the low level, and the signal generation circuit 83 may cause the control signal CTL0 to transition from the high level to the low level on the basis of such transition of the control voltage VC2. The relay control circuit 185 may cause the control signal CTL2 to transition from the low level to the high level on the basis of such transition of the control signal CTL0, as illustrated in (C) of FIG. 11. Accordingly, a current may flow through the coil of the sub-relay 77, varying the sub-relay 77 from the open state (the OFF state) to the closed state (the ON state). This may "enable" the operation, of the arc suppression circuit 73, of suppressing the arc discharge at the contact of the main relay 72.

The relay control circuit 185 may cause the control signal CTL1 to transition from the high level to the low level at a timing t15 on the basis of the transition of the control signal CTL0 at the timing t14, as illustrated in (B) of FIG. 11. The timing t15 may be a timing after a lapse of the predetermined time Td1 from the timing of the transition of the control signal CTL0. Accordingly, the current may stop flowing through the coil of the main relay 72, and the main relay 72 in the closed state (the ON state) may be brought into the open state (the OFF state).

Thereafter, the relay control circuit 185 may cause the control signal CTL2 to transition from the high level to the low level at a timing t16 on the basis of the transition of the control signal CTL0 at the timing t14, as illustrated in (C) of FIG. 11. The timing t16 may be a timing after a lapse of the predetermined time Td2 from the timing of the transition of the control signal CTL0. Accordingly, the current may stop flowing through the coil of the sub-relay 77, varying the sub-relay 77 from the closed state (the ON state) to the open state (the OFF state). This may limit the operation, of the arc suppression circuit 73, of suppressing the arc discharge at the contact of the main relay 72.

Next, a description is given referring to an example case of using an electric power source apparatus that includes a battery and a DC-AC inverter as the alternating-current electric power source 101.

For example, in a case where the DC-AC inverter of the alternating-current electric power source 101 malfunctions, the alternating-current electric power source 101 can possibly output a direct-current voltage. In the image forming apparatus 2, in a case where the direct-current voltage is received from the alternating-current electric power source 101 in a period during which the image formation operation is performed, zero-cross of the electric power source signal supplied from the alternating-current electric power source 101 does not occur. Therefore, the triac 78 may keep being in the ON state without being brought into the OFF state. As a result, the temperature of the heater 52 may continue to increase. In a case where the temperature of the heater 52 exceeds the predetermined temperature Tth, the high temperature detector 81 may set the control voltage VC1 to the low level, and the signal generation circuit 83 may cause the control signal CTL0 to transition from the high level to the low level. In accordance therewith, as with the case illustrated in FIG. 11, the relay control circuit 185 may cause the control signal CTL2 to transition from the low level to the high level, and may cause the control signal CTL2 to transition from the high level to the low level at a timing after a lapse of the predetermined time Td2 from such transition of the control signal CTL0. That is, the sub-relay 77 may keep being in the closed state (the ON state) during a period from the timing of the transition of the control signal CTL0 from the high level to the low level to the timing of the lapse of the predetermined time Td2. In other words, the arc suppression circuit 73 may be in the "enabled" state in this period. The relay control circuit 185 may cause the control signal CTL1 to transition from the high level to the low level at a timing after a lapse of the predetermined time Td1 from such transition of the control signal CTL0. Accordingly, when the two electrodes of the contact of the main relay 72 are to be separated away from each other, the arc suppression circuit 73 may be able to suppress the arc discharge at the main relay 72. As a result, the main relay 72 may be allowed to be varied from the closed state (the ON state) to the open state (the OFF state). It is therefore possible to stop the electric power supply to the heater 52.

As described above, the length of the time (Td2-Td1) from the transition of the control signal CTL1 from the high level to the low level to the transition of the control signal CTL2 from the high level to the low level may be set taking into consideration, for example but not limited to, any of the capacitance of the floating capacity of the contact of the main relay 72, the distance of the gap between the two electrodes of the contact, the current value of the heater current, and the voltage amplitude value of the alternating-current electric power source 101. It is possible to suppress the arc discharge at the main relay 72 by keeping the arc suppression circuit 73 in the "enabled" state in the period having such a length of time after the transition of the control signal CTL1 from the high level to the low level.

As described above, in the image forming apparatus 2, the arc suppression circuit 73 is to be set to the enabled state or the limited state, and the arc suppression circuit 73 is varied from the limited state to the enabled state after the main relay 72 is brought into the closed state (the ON state). In one specific but non-limiting example, in the image forming apparatus 2, the control signal CTL2 may be caused to transition from the low level to the high level at the timing of the transition of the control signal CTL0 from the high level to the low level. This, for example, reduces the length of time during which the arc suppression circuit 73 is in the enabled state, therefore reducing electric power consumption due to the current flowing through the coil of the sub-relay 77 or the snubber circuit 74. This makes it possible to suppress the arc discharge at the main relay 72 while reducing the electric power consumption in the image forming apparatus 2. As a result, it is possible to effectively stop the electric power supply to the heater 52 in the image forming apparatus 2.

As described above, according to the second example embodiment, the control signal CTL2 may be caused to transition from the low level to the high level at the timing of the transition of the control signal CTL0 from the high level to the low level. This makes it possible to suppress the arc discharge at the main relay 72 while reducing the electric power consumption. As a result, it is possible to effectively stop the electric power supply to the heater.

[Modification 2]

Any of the modifications of the first example embodiment described above may be applied to the image forming apparatus 2 according to the second example embodiment.

3. Third Example Embodiment

A description is given below of an image forming apparatus 3 according to a third example embodiment. The third example embodiment may be different from the first and the second example embodiments in the method of generating the control signals CTL1 and CTL2. It is to be noted that component parts that are substantially the same as those of the image forming apparatus 1 according to the first example embodiment described above are denoted with the same numerals and may not be described further where appropriate.

As with the image forming apparatus 1 according to the first example embodiment illustrated in FIG. 4, the image forming apparatus 3 may include the low-voltage electric power source 70, the fixing section 50, and a control section 280.

Figure 12:
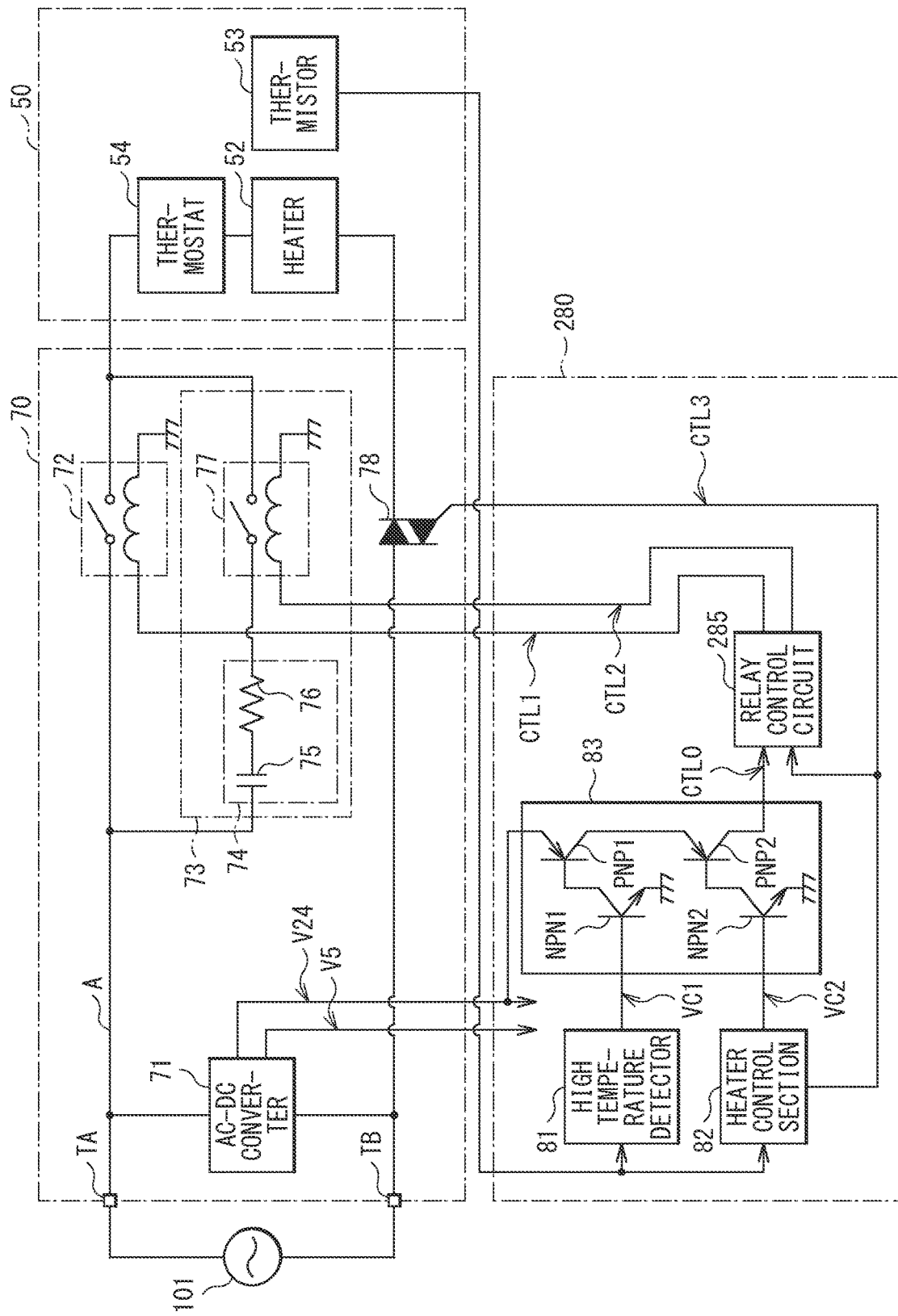
FIG. 12 is a circuit diagram illustrating an example of a configuration of the low-pressure electric power source, the fixing section, and the control section according to one example embodiment.

FIG. 12 illustrates an example of a configuration of the low-voltage electric power source 70, the fixing section 50, and the control section 280 related to the electric power supply to the heater 52. The control section 280 may include the high temperature detector 81, the heater control section 82, the signal generation circuit 83, and a relay control circuit 285. In the control section 280, the signal generation circuit 83 may generate a control signal CTL0 on the basis of the control voltages VC1 and VC2. The relay control circuit 285 may generate the control signals CTL1 and CTL2 on the basis of the control signals CTL0 and CTL3. For example, the relay control circuit 285 may so generate the control signal CTL1 that the control signal CTL1 transitions from the high level to the low level on the basis of a falling edge of the control signal CTL0 at a timing after a lapse of a predetermined time Td3 from the timing of the falling edge of the control signal CTL3. Further, the relay control circuit 285 may so generate the control signal CTL2 that the control signal CTL2 transitions from the low level to the high level on the basis of the falling edge of the control signal CTL3 and the control signal CTL2 transitions from the high level to the low level at a timing after a lapse of a predetermined time Td4 from the timing of the falling edge of the control signal CTL3. The predetermined time Td4 may be set to be longer than the predetermined time Td3.

Figure 13:
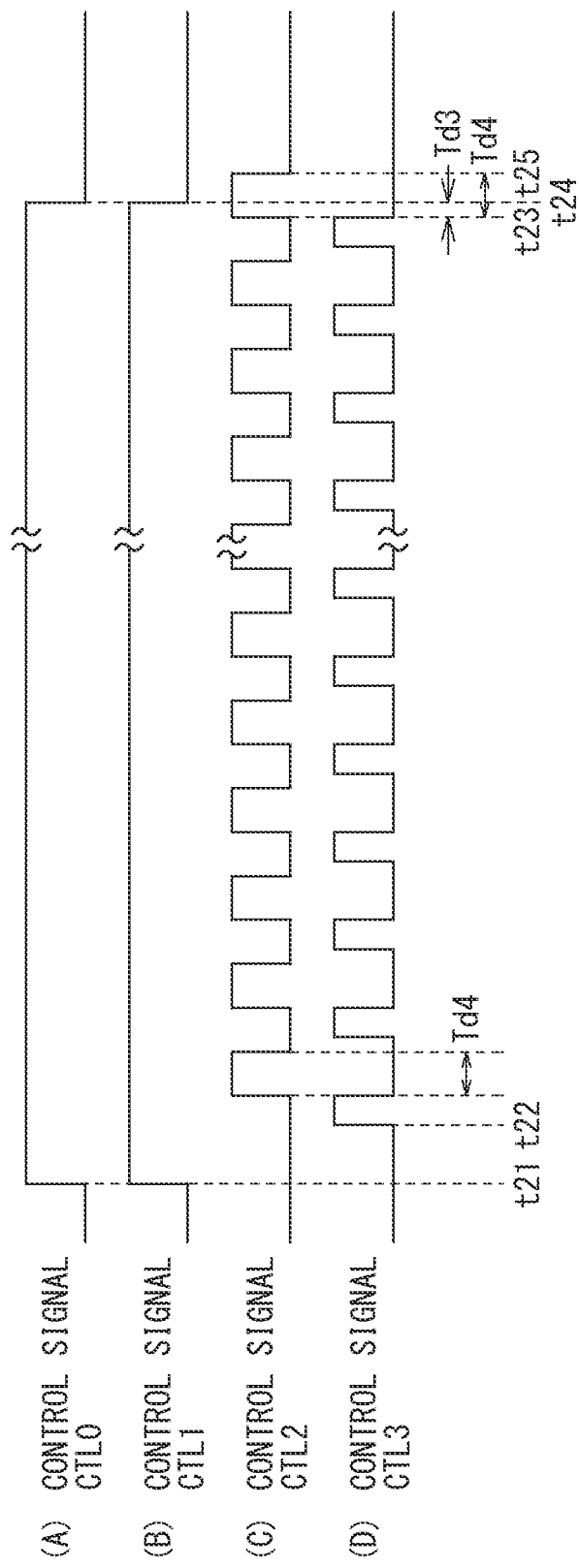
FIG. 13 is a timing waveform chart illustrating an example of operation of the image forming apparatus according to one example embodiment.

FIG. 13 illustrates an example of the operation of the electric power supply to the heater 52. (A) of FIG. 13 illustrates a waveform of the control signal CTL0 generated by the signal generation circuit 83, (B) of FIG. 13 illustrates a waveform of the control signal CTL1 supplied to the main relay 72, (C) of FIG. 13 illustrates a waveform of the control signal CTL2 supplied to the sub-relay 77, and (D) of FIG. 13 illustrates a waveform of the control signal CTL3 supplied to the triac 78.

Referring to (A) of FIG. 13, in the case where the image forming apparatus 3 is to perform the image formation operation, at a timing t21, the signal generation circuit 83 may cause the control signal CTL0 to transition from the low level to the high level on the basis of the control voltages VC1 and VC2. For example, the heater control section 82 may cause the control voltage VC2 to transition from the low level to the high level, and the signal generation circuit 83 may cause the control signal CTL0 to transition from the low level to the high level on the basis of the transition of the control voltage VC2. Referring to (B) of FIG. 13, the relay control circuit 285 may cause the control signal CTL1 to transition from the low level to the high level on the basis of the transition of the control signal CTL0. Accordingly, a current may flow through the coil of the main relay 72, varying the main relay 72 from the open state (the OFF state) to the closed state (the ON state).

Referring to (D) of FIG. 13, at a timing t22 after the timing t21, the heater control section 82 may start causing the control signal CTL3 to transition between the low level and the high level on the basis of the result of the detection performed by the thermistor 53. The triac 78 may be brought into the ON state when the control signal CTL3 transitions from the low level to the high level. The triac 78 may be brought into the OFF state at a zero-cross timing of the alternating-current electric power source signal. In a period during which the triac 78 is in the ON state, the heater 52 may receive electric power and thereby generate heat. The heater control section 82 may so control the ON-OFF operation of the triac 78 by generating the control signal CTL3 on the basis of the result of the detection performed by the thermistor 53, that the heater 52 has the target temperature (e.g., about 180° C.) suitable for the fixing operation and keeps having the target temperature.

The relay control circuit 285 may generate the control signal CTL2 on the basis of the control signal CTL3 described above. For example, as illustrated in (C) of FIG. 13, the relay control circuit 285 may so generate the control signal CTL2 that the control signal CTL2 transitions from the low level to the high level on the basis of a falling edge of the control signal CTL3 and the control signal CTL2 transitions from the high level to the low level at a timing after a lapse of the predetermined time Td4 from the timing of the falling edge of the control signal CTL3. In a period during which the control signal CTL2 is at the high level, a current may flow through the coil of the sub-relay 77, the sub-relay 77 may be brought into the closed state (the ON state), and the operation, of the arc suppression circuit 73, of suppressing the arc discharge at the contact of the main relay 72 may be "enabled".

Further, the image forming apparatus 3 may perform the image formation operation, forming an image on the medium 9B.

In a case where the image forming apparatus 3 is to end the image formation operation, at a timing t23, the heater control section 82 may stop the transition of the control signal CTL3 and keep the control signal CTL3 at the low level, as illustrated in (D) of FIG. 13. Accordingly, the triac 78 may be brought into the OFF state at the zero-cross timing of the alternating-current source signal and keep being in the OFF state. As a result, the electric power supply to the heater 52 may be stopped.

As illustrated in (C) of FIG. 13, at the timing t23, the relay control circuit 285 may cause the control signal CTL2 to transition from the low level to the high level on the basis of the transition of the control signal CTL3. Accordingly, a current may flow through the coil of the sub-relay 77, varying the sub-relay 77 from the open state (the OFF state) to the closed state (the ON state). As a result, the operation, of the arc suppression circuit 73, of suppressing the arc discharge at the contact of the main relay 72 may be "enabled".

Thereafter, at a timing t24, the signal generation circuit 83 may cause the control signal CTL0 to transition from the high level to the low level on the basis of the control voltages VC1 and VC2, as illustrated in (A) of FIG. 13. For example, the heater control section 82 may cause the control voltage VC2 to transition from the high level to the low level, and the signal generation circuit 83 may cause the control signal CTL0 to transition from the high level to the low level on the basis of such transition of the control voltage VC2.

The relay control circuit 285 may cause the control signal CTL1 to transition from the high level to the low level at a timing (in this example, the timing t24) after a lapse of the predetermined time Td3 from the timing of the falling edge of the control signal CTL3 on the basis of the transition of the control signal CTL0, as illustrated in (B) of FIG. 13. Accordingly, the current may stop flowing through the coil of the main relay 72, varying the main relay 72 from the closed state (the ON state) to the open state (the OFF state).

Thereafter, the relay control circuit 285 may cause the control signal CTL2 to transition from the high level to the low level at a timing t25 on the basis of the transition of the control signal CTL0 at the timing t23, as illustrated in (C) of FIG. 13. The timing t25 may be a timing after a lapse of the predetermined time Td4 from the timing of the transition of the control signal CTL0. Accordingly, the current may stop flowing through the coil of the sub-relay 77, varying the sub-relay 77 from the closed state (the ON state) to the open state (the OFF state). This may limit the operation, of the arc suppression circuit 73, of suppressing the arc discharge at the contact of the main relay 72.

Next, a description is given referring to an example case of using an electric power source apparatus that includes a battery and a DC-AC inverter as the alternating-current electric power source 101.

For example, in a case where the DC-AC inverter of the alternating-current electric power source 101 malfunctions, the alternating-current electric power source 101 can possibly output a direct-current voltage. In the image forming apparatus 3, when the alternating-current electric power source 101 supplies the direct-current voltage in a period during which the image formation operation is performed, zero-cross of the electric power source signal supplied from the alternating-current electric power source 101 does not occur, thereby causing the triac 78 keep being in the ON state without being brought into the OFF state. As a result, the temperature of the heater 52 may continue to increase. In a case where the temperature of the heater 52 exceeds the predetermined temperature Tth, the high temperature detector 81 may set the control voltage VC1 to the low level, and the signal generation circuit 83 may cause the control signal CTL0 to transition from the high level to the low level. As with the case illustrated in FIG. 13, the relay control circuit 285 may so generate the control signal CTL2 that the control signal CTL2 transitions from the low level to the high level on the basis of the falling edge of the control signal CTL3, and the control signal CTL2 transitions from the high level to the low level at a timing after a lapse of the predetermined time Td4 from the timing of the falling edge of the control signal CTL3. The arc suppression circuit 73 may be in the "enabled" state in the period during which the control signal CTL2 is at the high level. The relay control circuit 285 may cause the control signal CTL1 to transition from the high level to the low level on the basis of the falling edge of the control signal CTL0 at a timing after a lapse of the predetermined time Td3 from the timing of the falling edge of the control signal CTL3. Accordingly, when the two electrodes of the contact of the main relay 72 are to be separated from each other, the arc suppression circuit 73 may be able to suppress the arc discharge at the main relay 72. As a result, the main relay 72 may be allowed to be varied from the closed state (the ON state) to the open state (the OFF state), making it possible to stop the electric power supply to the heater 52.

As described above, the length of the time (Td4-Td3) from the transition of the control signal CTL1 from the high level to the low level to the transition of the control signal CTL2 from the high level to the low level may be set taking into consideration, for example but not limited to, any of the capacitance of the floating capacity of the contact of the main relay 72, the distance of the gap between the two electrodes of the contact, the current value of the heater current, and the voltage amplitude value of the alternating-current electric power source 101. It is possible to suppress the arc discharge at the main relay 72 by keeping the arc suppression circuit 73 in the "enabled" state in the period having such a length of time after the transition of the control signal CTL1 from the high level to the low level.

As described above, in the image forming apparatus 3, the arc suppression circuit 73 is to be set to the enabled state or the limited state, and the arc suppression circuit 73 is varied from the limited state to the enabled state after the main relay 72 is brought into the closed state (the ON state). In one specific but non-limiting example, in the image forming apparatus 3, the control signal CTL2 may be caused to transition from the low level to the high level at the timing of the transition of the control signal CTL3 from the high level to the low level. This, for example, reduces the length of time during which the arc suppression circuit 73 is in the enabled state, therefore reducing electric power consumption due to the current flowing through the coil of the sub-relay 77 or the snubber circuit 74. Thus, it is possible to suppress the arc discharge at the main relay 72 while reducing the electric power consumption in the image forming apparatus 3. As a result, it is possible to effectively stop the electric power supply to the heater 52 in the image forming apparatus 3.

As described above, according to the third example embodiment, the control signal CTL2 may be caused to transition from the low level to the high level at the timing of the transition of the control signal CTL3 from the high level to the low level. This makes it possible to suppress the arc discharge at the main relay 72 while reducing the electric power consumption. As a result, it is possible to effectively stop the electric power supply to the heater.

[Modification 3]

Any of the modifications of the first example embodiment described above may be applied to the image forming apparatus 3 according to the third example embodiment.

4. Fourth Example Embodiment

Described next is an image forming apparatus 4 according to a fourth example embodiment of the technology. According to the fourth example embodiment, a direct-current detector may be provided that detects whether an electric power source signal SP is an alternating-current signal or a direct-current signal, and the control signals CTL1 to CTL3 may be generated on the basis of a result of the detection. It is to be noted that component parts that are substantially the same as those of the image forming apparatus 1 according to the first example embodiment described above are denoted with the same numerals and may not be described further where appropriate.

As with the image forming apparatus 1 according to the first example embodiment illustrated in FIG. 4, the image forming apparatus 4 may include a low-voltage electric power source 370, the fixing section 50, and a control section 380.

Figure 14:
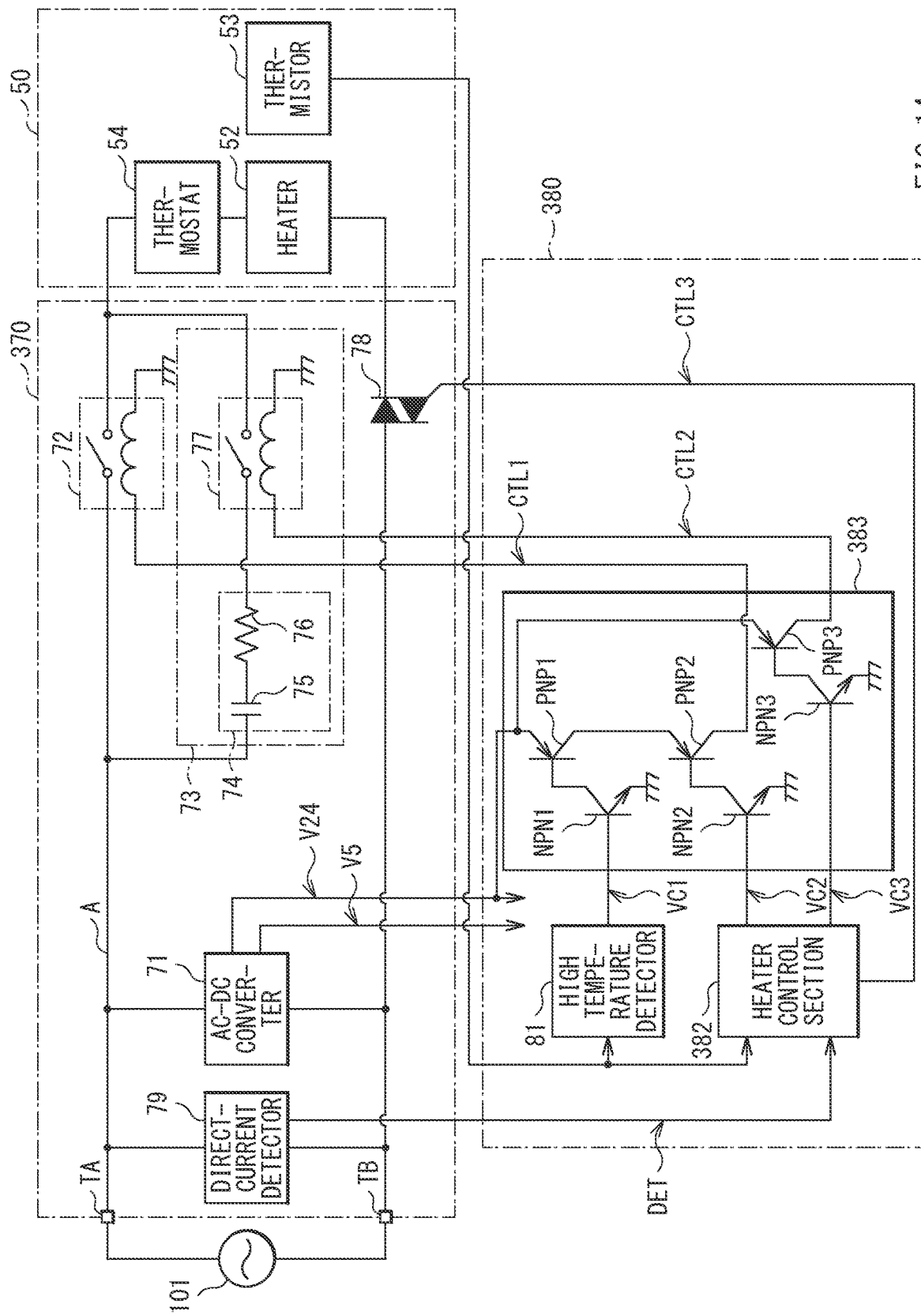
FIG. 14 is a circuit diagram illustrating an example of a configuration of the low-pressure electric power source, the fixing section, and the control section according to one example embodiment.

FIG. 14 illustrates an example of a configuration of the low-voltage electric power source 370, the fixing section 50, and the control section 380 related to the electric power supply to the heater 52.

The low-voltage electric power source 370 may include the direct-current detector 79, the AC-DC converter 71, the main relay 72, the arc suppression circuit 73, and the triac 78. The low-voltage electric power source 370 and the fixing section 50 may be provided with the electric power supply path A between the terminal TA and the terminal TB both coupled to the alternating-current electric power source 101. The direct-current detector 79, the AC-DC converter 71, the main relay 72, the arc suppression circuit 73, the thermostat 54, the heater 52, and the triac 78 may be disposed along the electric power supply path A.

The direct-current detector 79 may detect whether the electric power source signal SP supplied from the alternating-current electric power source 101 is an alternating-current signal or a direct-current signal. The direct-current detector 79 may include, for example, a so-called zero-cross circuit that generates a pulse at a zero-cross timing of the electric power source signal SP. For example, the direct-current detector 79 may determine that the electric power source signal SP is the alternating-current signal in a case where a pulse is generated in a predetermined length of time, and may determine that the electric power source signal SP is the direct-current signal in a case where a pulse is not generated in the predetermined length of time. Further, the direct-current detector 79 may generate a detection signal DET on the basis of whether the electric power source signal SP is the alternating-current signal or the direct-current signal.

The control section 380 may include the high temperature detector 81, a heater control section 382, and a signal generation circuit 383.

The heater control section 382 may control electric power supply to the heater 52 on the basis of the result of the detection performed by the thermistor 53 and the result of the detection performed by the direct-current detector 79. For example, the heater control section 382 may be set a control voltage VC3 to a low level in a case where the electric power source signal SP is the alternating-current signal. As a result, the control signal CTL2 may be brought to the low level, and the sub-relay 77 may be brought into the open state (the OFF state). For example, the heater control section 382 may be set the control voltage VC2 to the high level in a case where the image forming apparatus 4 is to perform the image formation operation. In a case where the temperature of the heater 52 is equal to or lower than the predetermined threshold temperature Tth, this may cause the control signal CTL1 to be at the high level, bringing the main relay 72 into the closed state (the ON state). Further, the heater control section 382 may generate the control signal CTL3 on the basis of the result of the detection performed by the thermistor 53, and thereby so control the ON-OFF operation of the triac 78 that the temperature of the heater 52 is kept at a temperature suitable for the fixing operation. The temperature suitable for the fixing operation may be, for example, about 180° C. For example, in a case where the image forming apparatus 4 is not to perform the image formation operation, the heater control section 382 may be set the control voltage VC2 to the low level. This may cause the control signal CTL1 to be at the low level, bringing the main relay 72 into the open state (the OFF state). As a result, the electric power supply to the heater 52 may be stopped. The heater control section 382 may thus control the electric power supply to the heater 52.

For example, the heater control section 382 may be set the control voltage VC3 to the high level in a case where the electric power source signal SP is the direct-current signal. As a result, the control signal CTL2 may be brought to the high level, and the sub-relay 77 may be brought into the closed state (the ON state). Accordingly, it is possible to suppress the arc discharge at the contact of the main relay 72 in the image forming apparatus 4, as will be described later.

The signal generation circuit 383 may generate the control signal CTL1 on the basis of the control voltages VC1 and VC2, and may generate the control signal CTL3 on the basis of the control voltage VC3. The signal generation circuit 383 may include transistors NPN1, NPN2, PNP1, PNP2, NPN3, and PNP3. The transistors NPN1, NPN2, and NPN3 may each be an NPN bipolar transistor, and the transistors PNP1, PNP2, and PNP3 may each be a PNP bipolar transistor. A collector of the transistor NPN1 may be coupled to a base of the transistor PNP1, a base of the transistor NPN1 may receive the control voltage VC1, and an emitter of the transistor NPN1 may be grounded. A collector of the transistor NPN2 may be coupled to a base of the transistor PNP2, a base of the transistor NPN2 may receive the control voltage VC2, and an emitter of the transistor NPN2 may be grounded. An emitter of the transistor PNP1 may receive the direct-current electric power source voltage V24, the base of the transistor PNP1 may be coupled to the collector of the transistor NPN1, and a collector of the transistor PNP1 may be coupled to an emitter of the transistor PNP2. The emitter of the transistor PNP2 may be coupled to the collector of the transistor PNP1, the base of the transistor PNP2 may be coupled to the collector of the transistor NPN2, and a collector of the transistor PNP2 may be coupled to the coil of the main relay 72. A collector of the transistor NPN3 may be coupled to a base of the transistor PNP3, a base of the transistor NPN3 may receive the control voltage VC3, and an emitter of the transistor NPN3 may be grounded. An emitter of the transistor PNP3 may receive the direct-current electric power source voltage V24, the base of the transistor PNP3 may be coupled to the collector of the transistor NPN3, and a collector of the transistor PNP3 may be coupled to the coil of the sub-relay 77. With this configuration, the signal generation circuit 83 may output the control signal CTL1 from the collector of the transistor PNP2, and output the control signal CTL2 from the collector of the transistor PNP3.

The low-voltage electric power source 370 and the control section 380 may correspond to the "load controller" in one specific but non-limiting embodiment of the technology. The triac 78 may correspond to the "control device" in one specific but non-limiting embodiment of the technology. The heater 52 may correspond to the "load" in one specific but non-limiting embodiment of the technology. The direct-current detector 79 may correspond to a "direct-current detector" in one specific but non-limiting embodiment of the technology. The main relay 72 may correspond to the "switching device" in one specific but non-limiting embodiment of the technology. The arc suppression circuit 73 may correspond to the "arc suppression circuit" in one specific but non-limiting embodiment of the technology. The control section 380 may correspond to the "control section" in one specific but non-limiting embodiment of the technology. The electric power source signal SP may correspond to an "electric power supply signal" in one specific but non-limiting embodiment of the technology. The developing section 20 may correspond to the "image forming section" in one specific but non-limiting embodiment of the technology. The fixing section 50 may correspond to the "fixing section" in one specific but non-limiting embodiment of the technology.

A description is given next of details of the operation of the electric power supply to the heater 52 in a case where the image forming apparatus 4 is to perform the image formation operation. First, a description is given of a case (a case CA1) where the electric power source signal SP keeps being the alternating-current signal, and then a description is given of a case (a case CA2) where the electric power source signal SP varies from the alternating-current signal to the direct-current signal.

[Case CA1]

Figure 15:
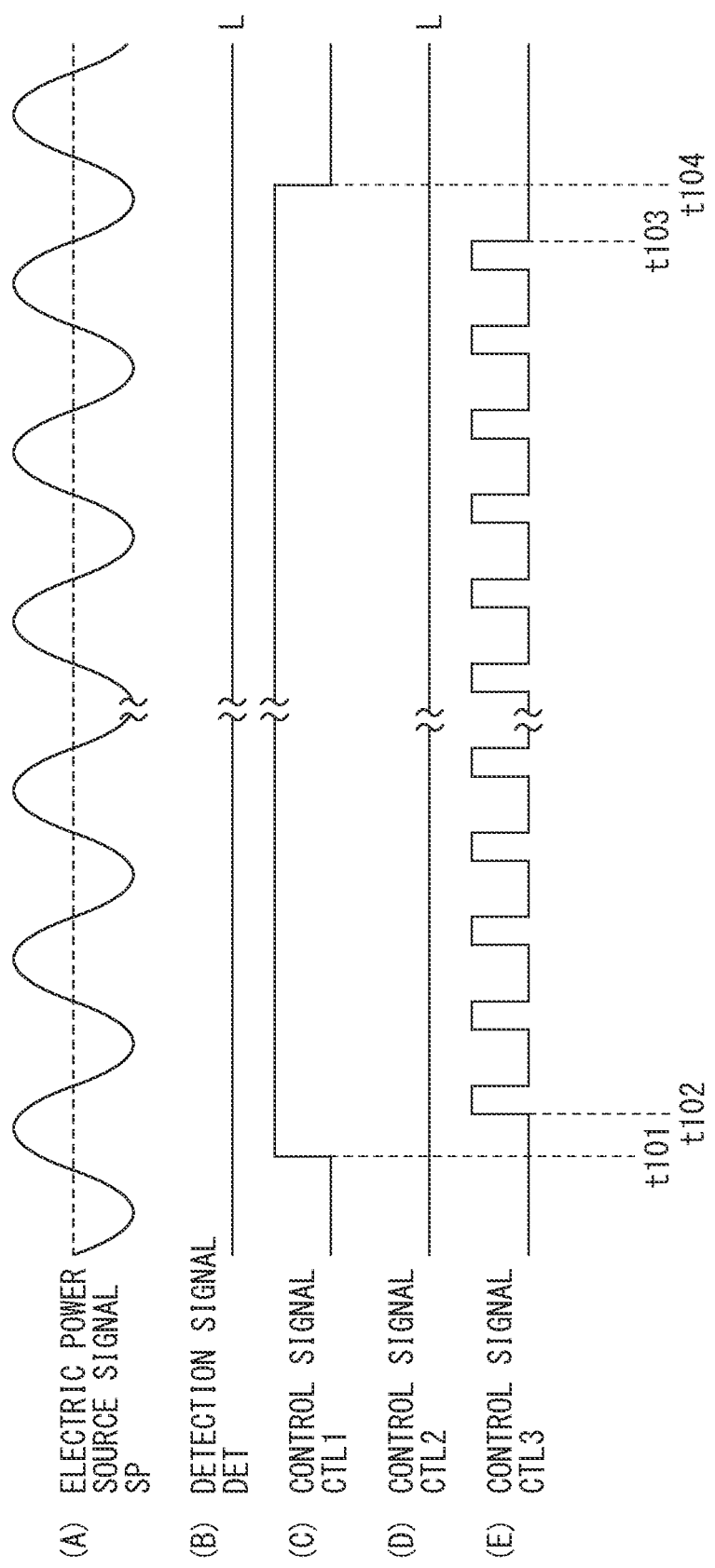
FIG. 15 is a timing waveform chart illustrating an example of operation of the image forming apparatus according to one example embodiment.

FIG. 15 illustrates an example of the operation of the electric power supply to the heater 52, in the case where the electric power source signal SP keeps being the alternating-current signal. (A) of FIG. 15 illustrates a waveform of the electric power source signal SP, (B) of FIG. 15 illustrates a waveform of the detection signal DET, (C) of FIG. 15 illustrates a waveform of the control signal CTL1 supplied to the main relay 72, (D) of FIG. 15 illustrates a waveform of the control signal CTL2 supplied to the sub-relay 77, and (E) of FIG. 15 illustrates a waveform of the control signal CTL3 supplied to the triac 78. Regarding the detection signal DET illustrated in (B) of FIG. 15, the low level indicates that the electric power source signal SP is the alternating-current signal, and the high level indicates that the electric power source signal SP is the direct-current signal. In this example, as illustrated in (A) of FIG. 15, the electric power source signal SP may keep being the alternating-current signal. Therefore, the detection signal DET may keep being at the low level, as illustrated in (B) of FIG. 15. As a result, as illustrated in (D) of FIG. 15, the control signal CTL2 may keep being at the low level, the sub-relay 77 may keep being in the open state, and the arc suppression circuit 73 may keep being in the limited state.

Referring to (C) of FIG. 15, in the case where the image forming apparatus 4 is to perform the image formation operation, at a timing t101, the heater control section 382 and the signal generation circuit 383 may cause the control signal CTL1 to transition from the low level to the high level. For example, the heater control section 382 may cause the control voltage VC2 to transition from the low level to the high level, and the signal generation circuit 383 may cause the control signal CTL1 to transition from the low level to the high level on the basis of the transition of the control voltage VC2. Accordingly, a current may flow through the coil of the main relay 72, varying the main relay 72 from the open state (the OFF state) to the closed state (the ON state).

Referring to (E) of FIG. 15, at a timing t102, the heater control section 382 may start causing the control signal CTL3 to transition between the low level and the high level on the basis of the result of the detection performed by the thermistor 53. The triac 78 may be brought into the ON state when the control signal CTL3 transitions from the low level to the high level. The triac 78 may be brought into the OFF state at a zero-cross timing of the electric power source signal SP. In a period during which the triac 78 is in the ON state, the heater 52 may receive electric power and thereby generate heat. The heater control section 382 may so control the ON-OFF operation of the triac 78 by generating the control signal CTL3 on the basis of the result of the detection performed by the thermistor 53, that the heater 52 has the target temperature (e.g., about 180° C.) suitable for the fixing operation and keeps having the target temperature. Further, the image forming apparatus 4 may perform the image formation operation, forming an image on the medium 9B.

In a case where the image forming apparatus 4 is to end the image formation operation, at a timing t103, the heater control section 382 may stop the transition of the control signal CTL3 and may keep the control signal CTL3 at the low level, as illustrated in (E) of FIG. 15. This may bring the triac 78 into the OFF state at the zero-cross timing of the electric power source signal SP, and keep the triac 78 in the OFF state. As a result, the electric power supply to the heater 52 may be stopped.

Thereafter, at a timing t104, the heater control section 382 and the signal generation circuit 383 may cause the control signal CTL1 to transition from the high level to the low level, as illustrated in (C) of FIG. 15. For example, the heater control section 382 may cause the control voltage VC2 to transition from the high level to the low level, and the signal generation circuit 383 may cause the control signal CTL1 to transition from the high level to the low level on the basis of the transition of the control voltage VC2. Accordingly, the current stops flowing through the coil of the main relay 72, varying the main relay 72 from the closed state (the ON state) to the open state (the OFF state).

[Case CA2]

Figure 16:
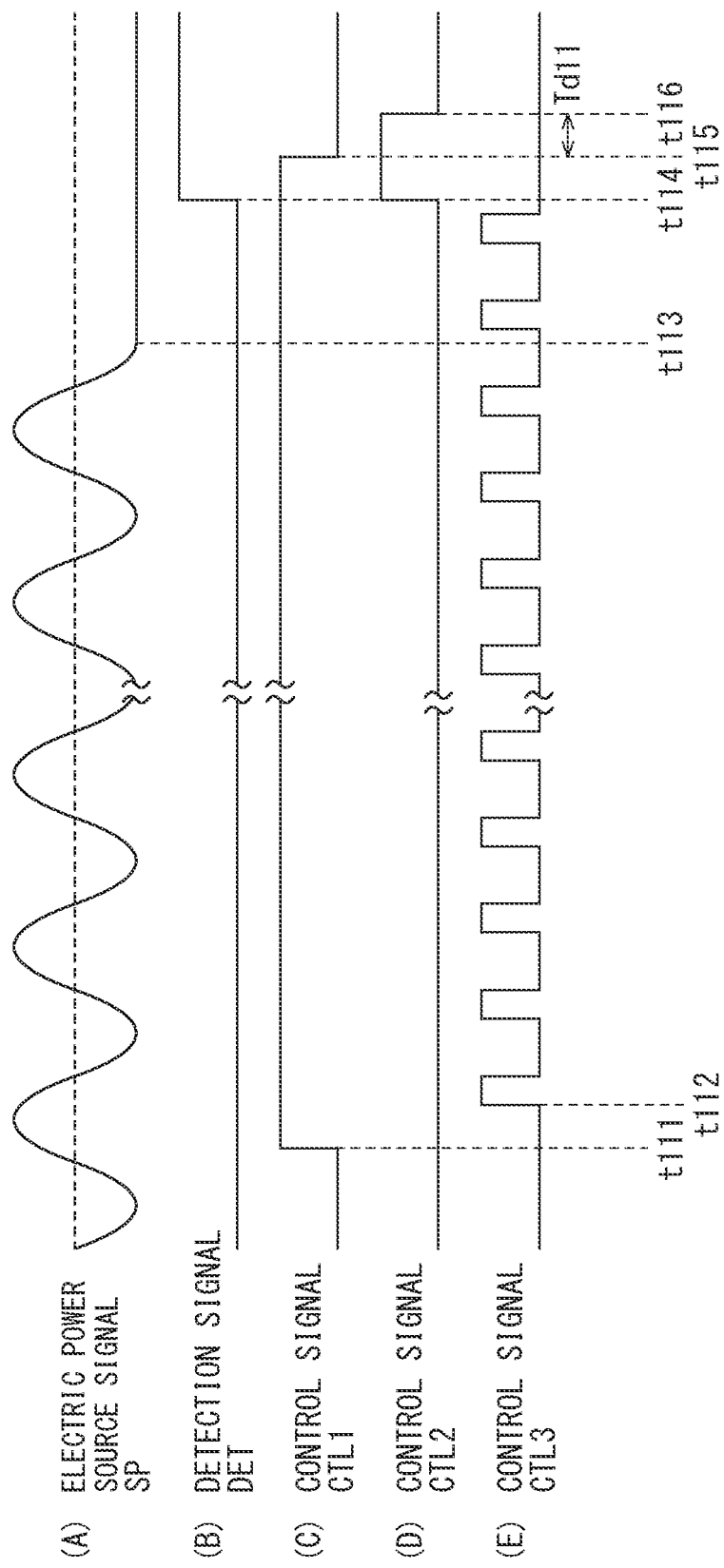
FIG. 16 is a timing waveform chart illustrating another example of the operation of the image forming apparatus according to one example embodiment.

FIG. 16 illustrates an example of the operation of the electric power supply to the heater 52 in a case where the electric power source signal SP varies from the alternating-current signal to the direct-current signal.

Referring to (C) of FIG. 16, in the case where the image forming apparatus 4 is to perform the image formation operation, at a timing t111, the heater control section 382 and the signal generation circuit 383 may cause the control signal CTL1 to transition from the low level to the high level. Accordingly, a current may flow through the coil of the main relay 72, varying the main relay 72 from the open state (the OFF state) to the closed state (the ON state).

Referring to (E) of FIG. 16, at a timing t112, the heater control section 382 may start causing the control signal CTL3 to transition between the low level and the high level on the basis of the result of the detection performed by the thermistor 53. The triac 78 may be brought into the ON state when the control signal CTL3 transitions from the low level to the high level. The triac 78 may be brought into the OFF state at a zero-cross timing of the electric power source signal SP.

Further, referring to (A) of FIG. 16, in this example, at a timing t113, the electric power source signal SP may vary from the alternating-current signal to the direct-current signal. The direct-current detector 79 may detect the variation of the electric power source signal SP to the direct-current signal on the basis of that the zero-cross circuit generates no pulse in a period from the timing t113 to the timing t114. Referring to (B) of FIG. 16, the direct-current detector 79 may cause the detection signal DET to transition from the low level to the high level at the timing t114.

Referring to (D) of FIG. 16, at the timing t114, the heater control section 382 and the signal generation circuit 383 may cause the control signal CTL2 to transition from the low level to the high level on the basis of the transition of the detection signal DET. For example, the heater control section 382 may cause the control voltage VC3 to transition from the low level to the high level, and the signal generation circuit 383 may cause the control signal CTL2 to transition from the low level to the high level on the basis of the transition of the control voltage VC3. Accordingly, a current may flow through the coil of the sub-relay 77, varying the sub-relay 77 from the open state (the OFF state) to the closed state (the ON state). This may "enable" the operation, of the arc suppression circuit 73, of suppressing the arc discharge at the contact of the main relay 72.

Further, at and after the timing t114, the heater control section 382 may keep the control signal CTL3 at the low level, as illustrated in (E) of FIG. 16.

Thereafter, at a timing t115, the heater control section 382 and the signal generation circuit 383 may cause the control signal CTL1 to transition from the high level to the low level, as illustrated in (C) of FIG. 16. Accordingly, the current may stop flowing through the coil of the main relay 72, varying the main relay 72 from the closed state (the ON state) to the open state (the OFF state). Further, the heater control section 382 and the signal generation circuit 383 may cause the control signal CTL2 to transition from the high level to the low level at a timing t116 after a lapse of a time Td11 from the timing t115, as illustrated in (D) of FIG. 16. For example, the heater control section 382 may cause the control voltage VC3 to transition from the high level to the low level, and the signal generation circuit 383 may cause the control signal CTL2 to transition from the high level to the low level on the basis of such transition of the control voltage VC3. Accordingly, the current may stop flowing through the coil of the sub-relay 77, varying the sub-relay 77 from the closed state (the ON state) to the open state (the OFF state). This may limit the operation, of the arc suppression circuit 73, of suppressing the arc discharge at the contact of the main relay 72.

A description is given next in detail of operation of controlling the main relay 72 and the arc suppression circuit 73 in the image forming apparatus 4.

Figure 17:
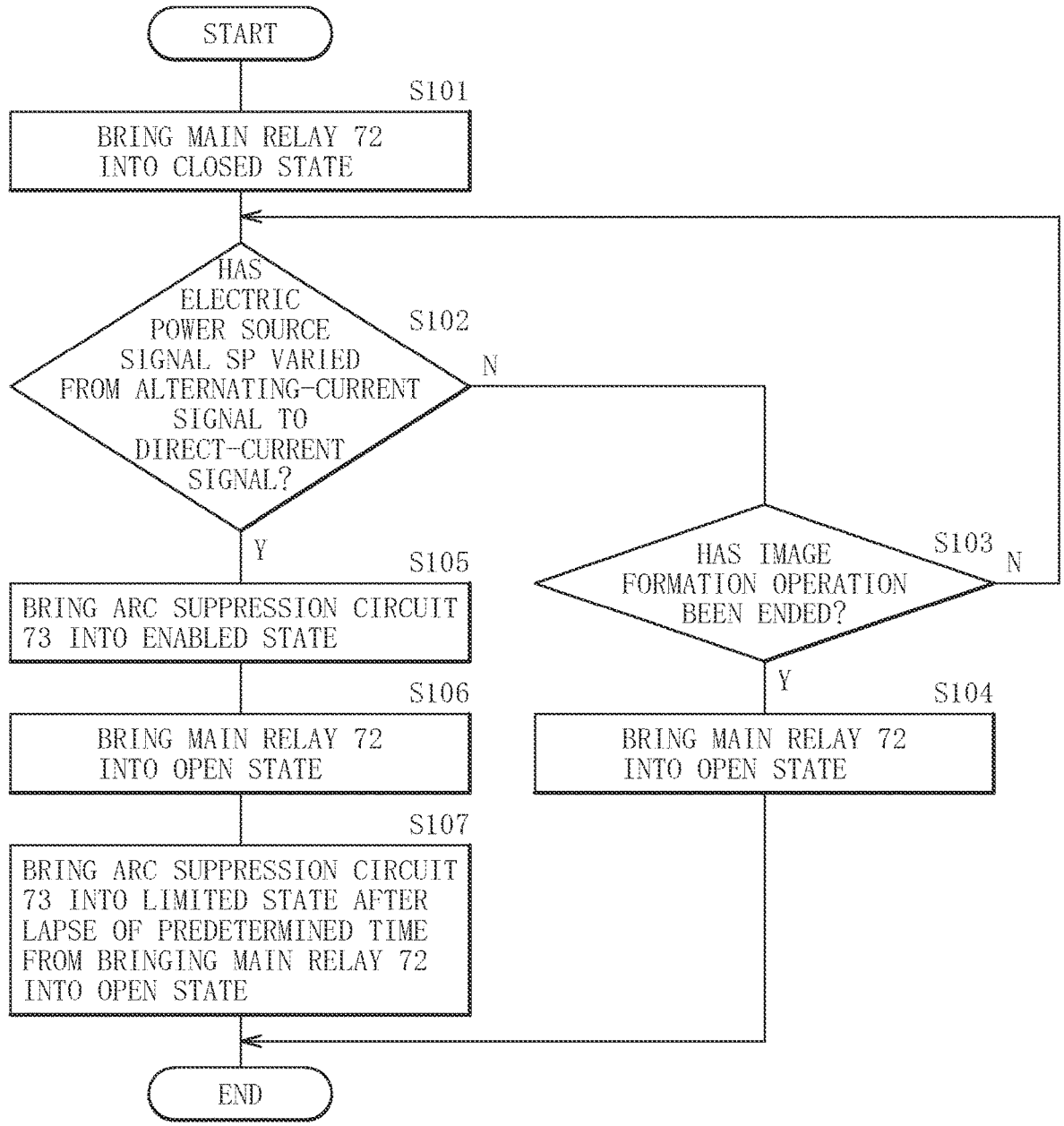
FIG. 17 is a flowchart illustrating an example of operation of the image forming apparatus according to one example embodiment.

FIG. 17 illustrates an example of operation of the image forming apparatus 4 in a case of performing the operation of the electric power supply to the heater 52.

First, the control section 380 may cause the control signal CTL1 to transition from the low level to the high level, and thereby bring the main relay 72 into the closed state (the ON state) (step S101). This may allow, after this, the electric power supply to the heater 52 to be performed when the heater control section 382 brings the triac 78 into the ON state in a period during which the main relay 72 is in the closed state.

Thereafter, the control section 380 may confirm, on the basis of the detection signal DET, whether the electric power source signal SP has varied from the alternating-current signal to the direct-current signal (step S102). In a case where the electric power source signal SP has not varied to the direct-current signal ("N" in step S102), the control section 380 may confirm whether the image formation operation of the image forming apparatus 4 has been ended (step S103). In a case where the image formation operation has not been ended ("N" in step S103), the flow may be caused to return to step S102. Thus, the processes in steps S102 and S103 may be repeated until the electric power source signal SP is varied to the direct-current signal or the image formation operation is ended.

In a case where the image formation operation has been ended in step S103 ("Y" in step S103), the control section 380 may cause the control signal CTL1 to transition from the high level to the low level, thereby bringing the main relay 72 into the open state (the OFF state) (step S104). Accordingly, the operation of the electric power supply to the heater 52 may be ended, and this flow may be brought to an end.

In a case where the electric power source signal SP has varied from the alternating-current signal to the direct-current signal in step S102 ("Y" in step S102), the control section 380 may cause the control signal CTL2 to transition from the low level to the high level, and thereby bring the arc suppression circuit 73 into the enabled state (step S105).

Thereafter, the control section 380 may cause the control signal CTL1 to transition from the high level to the low level, and thereby bring the main relay 72 into the open state (the OFF state) (step S106).

Thereafter, the control section 380 may cause the control signal CTL2 to transition from the high level to the low level after a lapse of a predetermined time (the time Td11) from the timing of bringing the main relay 72 into the open state in step S106, and thereby bring the arc suppression circuit 73 into the limited state (step S107).

This may bring this flow to an end.

For example, the electric power source signal SP may keep being the alternating-current signal in the case CA1 illustrated in FIG. 15. Therefore, the electric power source signal SP may not vary to the direct-current signal ("N" in step S102) after the control section 380 brings the main relay 72 into the closed state (the ON state) (step S101). Accordingly, the control section 380 may repeat the processes in steps S102 and S103 until the image formation operation is ended. Further, when the image formation operation is ended ("Y" in step S103), the control section 380 may bring the main relay 72 into the open state (the OFF state) (step S104). In this operation, the arc suppression circuit 73 may keep being in the limited state.

In the case CA2 illustrated in FIG. 16, the electric power source signal SP may vary from the alternating-current signal to the direct current signal. Therefore, the electric power source signal SP may vary to the direct-current signal ("Y" in step S102) after the control section 380 brings the main relay 72 into the closed state (the ON state) (step S101). The control section 380 may thereby bring the arc suppression circuit 73 into the enabled state (step S105), bring the main relay 72 into the open state (step S106), and bring the arc suppression circuit 73 into the limited state after a lapse of the time Td11 from the timing of bringing the main relay 72 into the open state (step S107).

Next, a description is given referring to an example case of using an electric power source apparatus that includes a battery and a DC-AC inverter as the alternating-current electric power source 101. Recently, widespread use of solar power generation has led to use of such an electric power source apparatus. In a case where the DC-AC inverter malfunctions in such an electric power source apparatus, the alternating-current electric power source 101 can possibly output a direct-current voltage.

If the arc suppression circuit 73 is not provided in the image forming apparatus 4, when the electric power source signal SP varies to the direct-current signal as illustrated in FIG. 16 in a period during which the image formation operation is performed, zero-cross of the electric power source signal SP does not occur, therefore causing the triac 78 to keep being in the ON state without being brought into the OFF state. As a result, the temperature of the heater 52 continues to increase. In a case where the temperature of the heater 52 exceeds the predetermined temperature Tth, the high temperature detector 81 may set the control voltage VC1 to the low level. In accordance therewith, the signal generation circuit 383 may cause the control signal CTL1 to transition from the high level to the low level. Accordingly, the current stops flowing through the coil of the main relay 72, varying the main relay 72 from the closed state (the ON state) to the open state (the OFF state). However, because two electrodes of the contact of the main relay 72 are to be separated from each other for example, while a heater current of about 5 A is flowing, arc discharge can occur at the contact of the main relay 72. This can lead to welding of the two electrodes. In a case where the two electrodes of the contact are welded, the electric power supply to the heater 52 continues, and the temperature of the heater 52 continues to increase accordingly. Thereafter, the bimetal stripe of the thermostat 54 warps. Accordingly, two electrodes of the thermostat 54 are to be separated away from each other. However, arc discharge can also occur in the thermostat 54 in a similar manner, which can lead to welding of the two electrodes. In a case where the two electrodes of the thermostat 54 are welded, the electric power supply to the heater 52 continues, and the temperature of the heater 52 continues to increase accordingly until the heater 52 melts and is disconnected. In this case, the image forming apparatus 4 may need to be repaired.

In contrast, in the image forming apparatus 4 according to the fourth example embodiment, the arc suppression circuit 73 is provided, and the arc suppression circuit 73 may be brought into the enabled state by causing the control signal CTL2 to transition to the high level at the timing t114, as illustrated in FIG. 16. Thereafter, the main relay 72 may be varied from the closed state (the ON state) to the open state (the OFF state) by causing the control signal CTL1 to transition to the low level at the timing t115, and the control signal CTL2 may be caused to transition from the high level to the low level at the timing t116 after a lapse of the time Td11 from the timing t115, thereby bringing the arc suppression circuit 73 into the limited state. That is, the sub-relay 77 may keep being in the closed state (the ON state) during a period from the timing t115 of the transition of the control signal CTL1 from the high level to the low level to the timing of the lapse of the time Td11. In other words, the arc suppression circuit 73 may be in the "enabled" state in this period. Accordingly, when the two electrodes of the contact of the main relay 72 are to be separated from each other as a result of the transition of the control signal CTL1 from the high level to the low level, the arc suppression circuit 73 may suppress the arc discharge at the main relay 72. As a result, the main relay 72 may be allowed to be varied from the closed state (the ON state) to the open state (the OFF state), making it possible to stop the electric power supply to the heater 52.

As described above, the arc suppression circuit 73 may be in the "enabled" state in the period from the timing of the transition of the control signal CTL1 from the high level to the low level to the timing of the lapse of the time Td11. The length of this period, i.e., the time Td11, may be set taking into consideration, for example but not limited to, any of the capacitance of the floating capacity of the contact of the main relay 72, the distance of the gap between the two electrodes of the contact, the current value of the heater current, and the voltage amplitude value of the alternating-current electric power source 101. It is possible to suppress the arc discharge at the main relay 72 by keeping the arc suppression circuit 73 in the "enabled" state in the period having such a length of time after the transition of the control signal CTL1 from the high level to the low level in the image forming apparatus 4.

As described above, the electric power supply to the heater 52 is allowed to be stopped by bringing the main relay 72 into the open state (the OFF state). Accordingly, for example, in a case of providing a fuse, a situation is avoidable that the image formation apparatus is not usable until the blown-off fuse is exchanged. It is therefore possible to increase user friendliness.

As described above, in the image forming apparatus 4, the direct-current detector 79 may be provided that detects whether the electric power source signal SP is the alternating-current signal or the direct-current signal, and the operation of the arc suppression circuit 73 may be controlled on the basis of the result of the detection performed by the direct-current detector 79. Thus, for example, in a case where the direct-current detector 79 detects that the electric power source signal SP is the alternating-current signal, the arc suppression circuit 73 may be brought into the limited state. For example, in a case where the direct-current detector 79 detects that the electric power source signal SP is the direct-current signal, the arc suppression circuit 73 may be brought into the enabled state. Accordingly, in the case where the electric power source signal SP varies from the alternating-current signal to the direct-current signal, the arc suppression circuit 73 may be brought into the enabled state, making it possible to suppress the arc discharge at the main relay 72 as described above. In a case where the electric power source signal SP keeps being the alternating-current signal, the arc suppression circuit 73 may be brought into the limited state. Accordingly, for example, compared with a case where the arc suppression circuit 73 is constantly in the enabled state, it helps to reduce electric power consumption due to the current flowing through the coil of the sub-relay 77 or the snubber circuit 74. Further, in the case where the electric power source signal SP is the alternating-current signal, the voltage may be 0 (zero) V at a certain cycle, as described above. This may prevent the arc discharge to continue even when the arc suppression circuit 73 is in the limited state. As described above, in the image forming apparatus 4, it is possible to suppress the arc discharge at the main relay 72 while reducing the electric power consumption. As a result, it is possible to effectively stop the electric power supply to the heater 52 in the image forming apparatus 4.

Moreover, the image forming apparatus 4 may be provided with the sub-relay 77. In the case where the electric power source signal SP is the alternating-current signal, the sub-relay 77 may be brought into the open state (the OFF state). Accordingly, for example, in a case where the triac 78 malfunctions and keeps being in the ON state, it is possible to suppress electric power consumption. That is, if the snubber circuit 74 is provided and the sub-relay 77 is not provided, the both ends of the main relay 72 may be constantly coupled to each other via the snubber circuit 74. This makes it possible to suppress the arc discharge at the main relay 72. However, in a case where the alternating-current signal is supplied from the alternating-current electric power source 101 and the triac 78 malfunctions and keeps being in the ON state, electric power can be supplied to the heater 52 via the snubber circuit 74 even if the main relay 72 is in the open state (the OFF state). This can lead to unnecessary electric power consumption. In contrast, the image forming apparatus 4 may be provided with the sub-relay 77, and the sub-relay 77 may be brought into the open state in the case where the electric power source signal SP is the alternating-current signal. Accordingly, also in the case where the triac 78 malfunctions and keeps being in the ON state, the electric power supply to the heater 52 is allowed to be prevented. It is therefore possible to suppress electric power consumption.

[Example Effects]

As described above, according to the fourth example embodiment, the direct-current detector may be provided that detects whether the electric power source signal is the alternating-current signal or the direct-current signal, and the operation of the arc suppression circuit may be controlled on the basis of a result of the detection performed by the direct-current detector. It is therefore possible to effectively stop the electric power supply to the heater.

According to the fourth example embodiment, the sub-relay may be provided, and the sub-relay may be brought into the open state (the OFF state) in a case where the electric power supply signal is the alternating-current signal. It is therefore possible to suppress electric power consumption.

[Modification 4-1]

Figure 18:
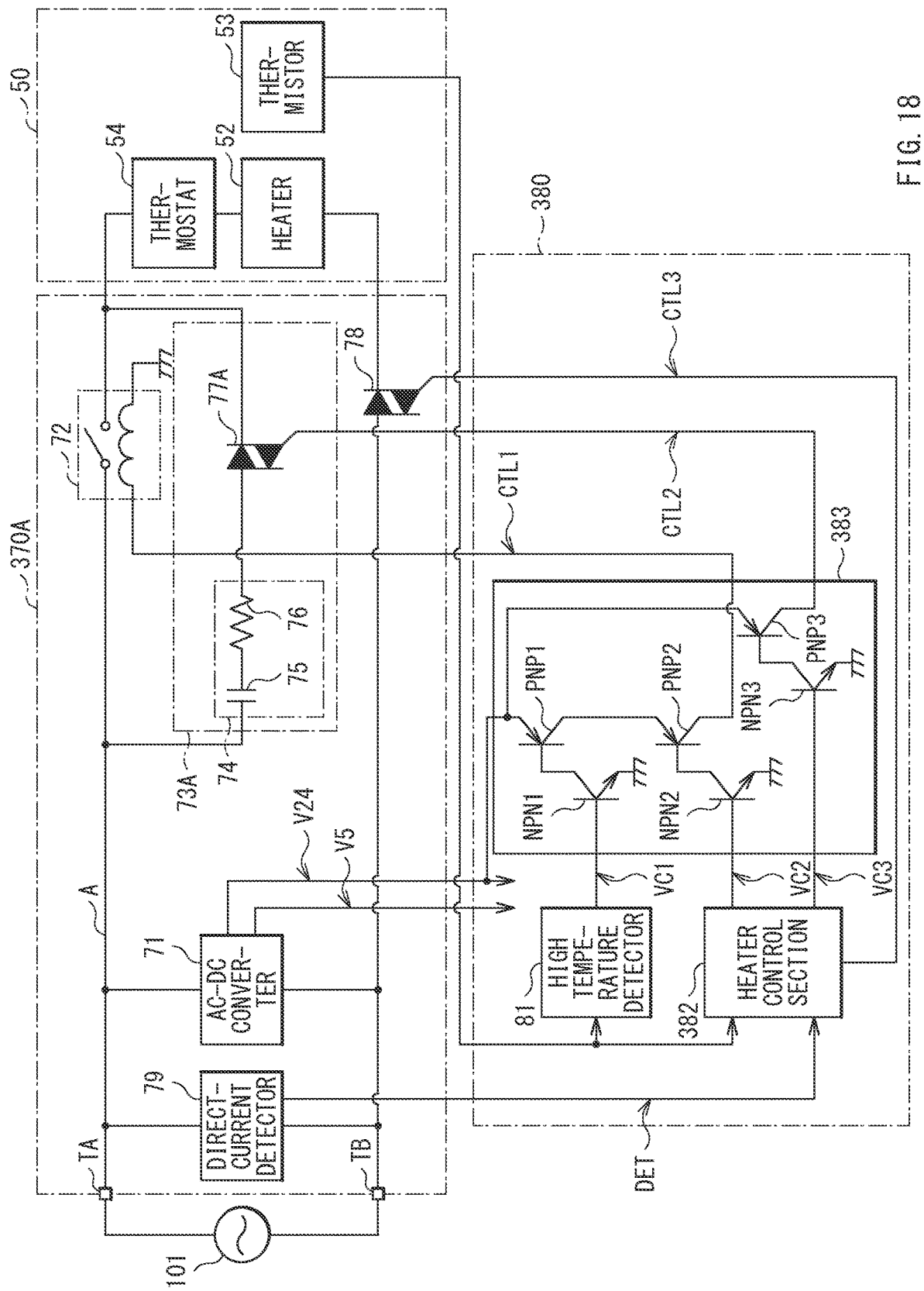
FIG. 18 is a circuit diagram illustrating an example of a configuration of the low-pressure electric power source, the fixing section, and the control section according to a modification of the example embodiment.

According to the fourth example embodiment described above, the arc suppression circuit 73 may include the sub-relay 77; however, this is non-limiting. Alternatively, any of various ON-OFF devices may be used. Non-limiting examples of the ON-OFF devices may include a semiconductor device. Non-limiting examples of the semiconductor device may include a MOSFET and a triac. FIG. 18 illustrates an example of a low-voltage electric power source 370A in a case where the arc suppression circuit includes a triac. The low-voltage electric power source 370A may include an arc suppression circuit 73A. The arc suppression circuit 73A may include a triac 77A. A first end of the triac 77A may be coupled to the second end of the resistor 76, a second end of the triac 77A may be coupled to the first end of the thermostat 54, and a control terminal of the triac 77A may receive the control signal CTL2.

Figure 19:
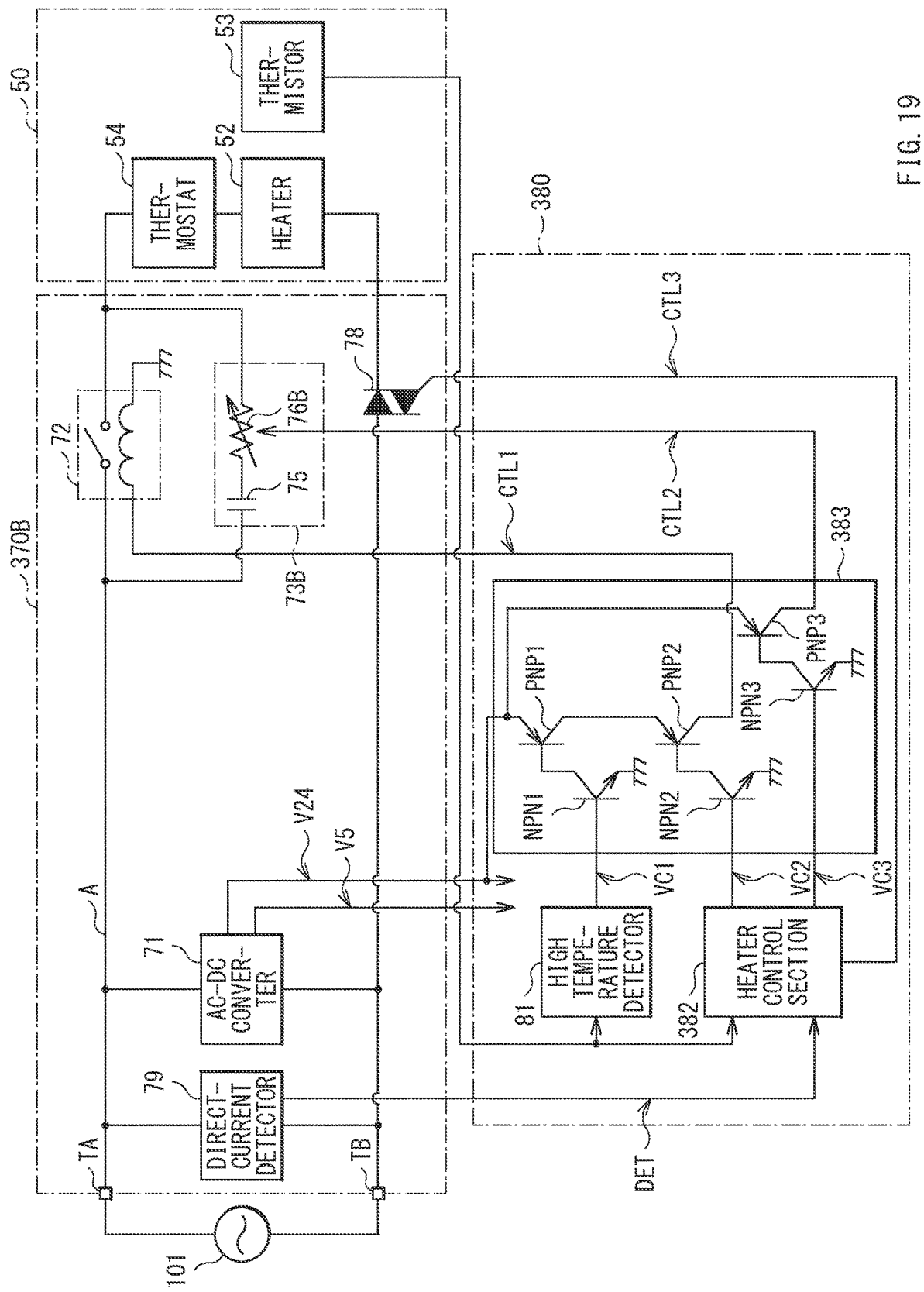
FIG. 19 is a circuit diagram illustrating an example of a configuration of the low-pressure electric power source, the fixing section, and the control section according to another modification of the example embodiment.

In another example, as in a low-voltage electric power source 370B illustrated in FIG. 19, the arc suppression circuit may include a variable resistor. The low-voltage electric power source 370B may include an arc suppression circuit 73B. The arc suppression circuit 73B may include the capacitor 75 and a variable resistor 76B. A first end of the variable resistor 76B may be coupled to the second end of the capacitor 75, a second end of the variable resistor 76B may be coupled to the first end of the thermostat 54, and a control terminal of the variable resistor 76B may receive the control signal CTL2. In a case where the control signal CTL2 is at the high level, the resistance of the variable resistor 76B may be about the same as or similar to the resistance of the resistor 76 according to the fourth example embodiment described above. In a case where the control signal CTL2 is at the low level, the resistance of the variable resistor 76B may be sufficiently higher than the resistance of the resistor 76. Thus, operation, of the arc suppression circuit 73B, of suppressing the arc discharge at the contact of the main relay 72 may become "enabled" in the case where the control signal CTL2 is at the high level, and the operation, of the arc suppression circuit 73B, of suppressing the arc discharge at the contact of the main relay 72 may be limited in the case where the control signal CTL2 is at the low level. In this case, the "limited" state refers not only to a state where it is not possible to suppress the arc discharge, but also to a state where the arc discharge is less suppressed than in a case of the "enabled" state.

[Modification 4-2]

Figure 20:
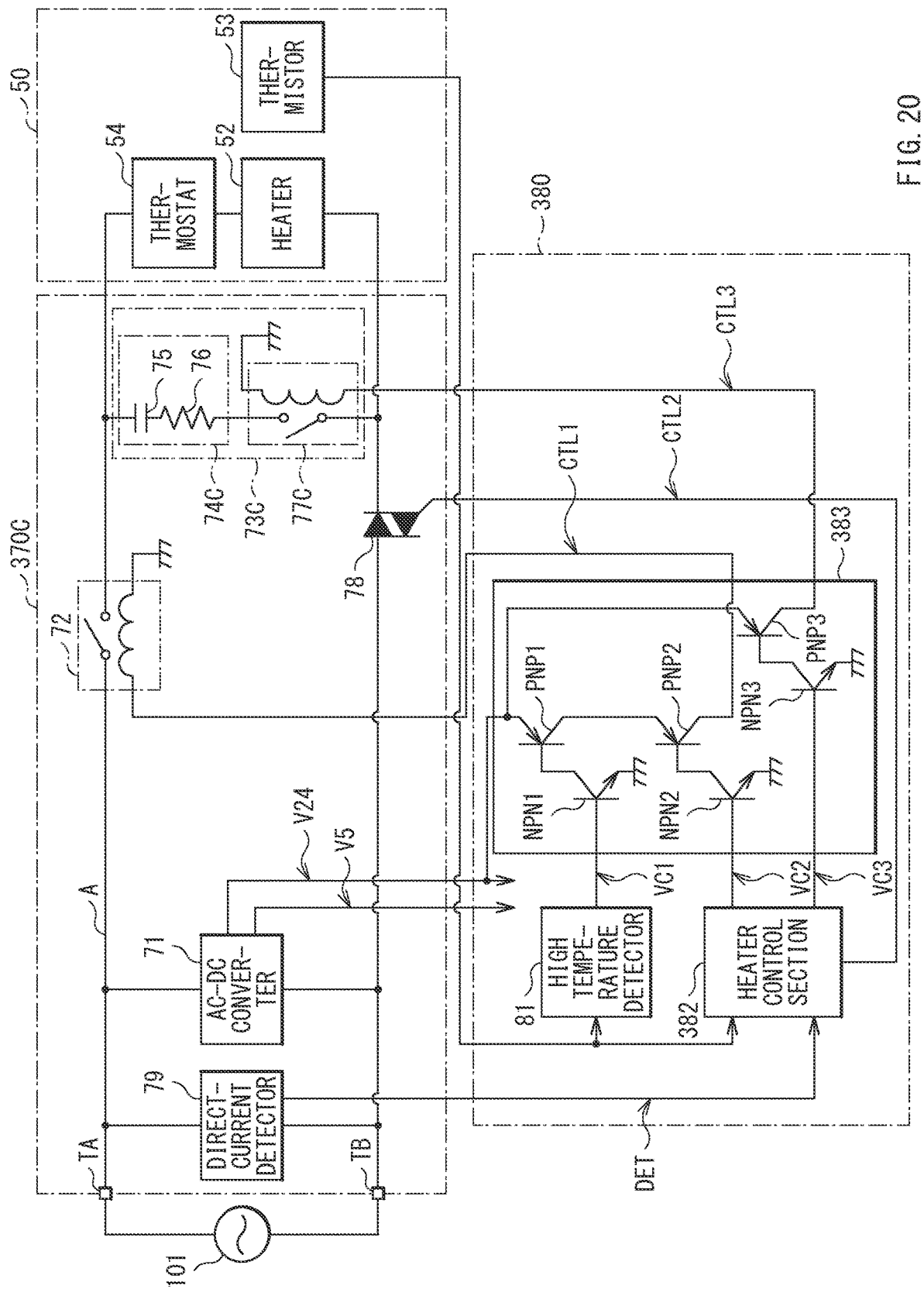
FIG. 20 is a circuit diagram illustrating an example of a configuration of the low-pressure electric power source, the fixing section, and the control section according to still another modification of the example embodiment.

According to the fourth example embodiment described above, the arc suppression circuit 73 and the main relay 72 may be coupled in parallel; however, this is non-limiting. Alternatively, in another example, as illustrated in FIG. 20, the arc suppression circuit, the heater 52, and the thermostat 54 may be coupled in parallel. A low-voltage electric power source 370C may include an arc suppression circuit 73C. The arc suppression circuit 73C may include a snubber circuit 74C and a sub-relay 77C. The snubber circuit 74C may include the capacitor 75 and the resistor 76. The first end of the capacitor 75 may be coupled to the second end of the contact of the main relay 72 and the first end of the thermostat 54. The second end of the capacitor 75 may be coupled to the first end of the resistor 76. The first end of the resistor 76 may be coupled to the second end of the capacitor 75, and the second end of the resistor 76 may be coupled to the sub-relay 77C. The sub-relay 77C may be a mechanical relay including a coil and a contact. The sub-relay 77C may be a so-called normally closed relay that is in the open state in a case where a current flows through the coil and is in the closed state in a case where no current flows through the coil. A first end of the contact of the sub-relay 77C may be coupled to the second end of the resistor 76. A second end of the contact of the sub-relay 77C may be coupled to the second end of the heater 52 and the first end of the triac 78. A first end of the coil of the sub-relay 77C may receive the control signal CTL2, and a second end of the coil of the sub-relay 77C may be grounded.

[Other Modifications]

Any two or more of the modifications described above may be combined.

5. Fifth Example Embodiment

Described next is an image forming apparatus 5 according to a fifth example embodiment of the technology. The fifth example embodiment is different from the fourth example embodiment in the method of generating the control signal CTL2. It is to be noted that component parts that are substantially the same as those of the image forming apparatus 4 according to the fourth example embodiment described above are denoted with the same numerals and may not be described further where appropriate.

As with the image forming apparatus 4 according to the fourth example embodiment, the image forming apparatus 5 may include the low-voltage electric power source 370, the fixing section 50, and a control section 480.

Figure 21:
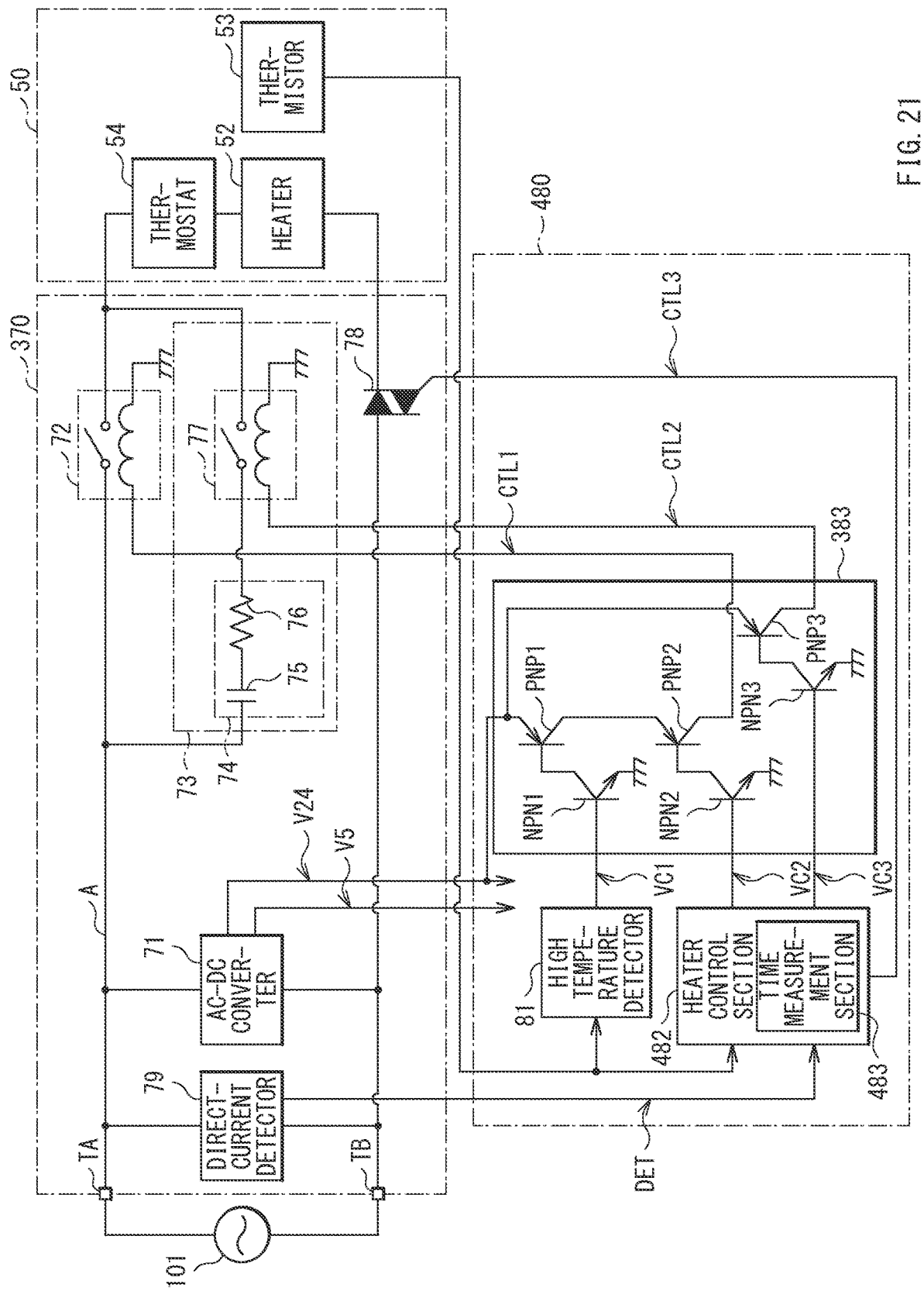
FIG. 21 is a circuit diagram illustrating an example of a configuration of the low-pressure electric power source, the fixing section, and the control section according to one example embodiment.

FIG. 21 illustrates an example of a configuration of the low-voltage electric power source 370, the fixing section 50, and the control section 480 related to the electric power supply to the heater 52. The control section 480 may include a heater control section 482. The heater control section 482 may include a time measurement section 483. The time measurement section 483 may start measuring a time, on the basis of the detection signal DET, at a timing of the variation of the electric power source signal SP from the alternating-current signal to the direct-current signal. The control section 480 may control operation of the main relay 72, operation of the arc suppression circuit 73, and operation of the triac 78 on the basis of a time measured by the time measurement section 483.

The low-voltage electric power source 370 and the control section 480 may correspond to the "load controller" in one specific but non-limiting embodiment of the technology. The control section 480 may correspond to the "control section" in one specific but non-limiting embodiment of the technology.

A description is given next of details of the operation of performing the electric power supply to the heater 52 in a case where the image forming apparatus 5 is to perform the image formation operation. First, a description is given of a case (a case CB1) where the electric power source signal SP keeps being the alternating-current signal, and then a description is given of cases (cases CB2 to CB4) where the electric power source signal SP varies from the alternating-current signal to the direct-current signal.

[Case CB1]

Figure 22:
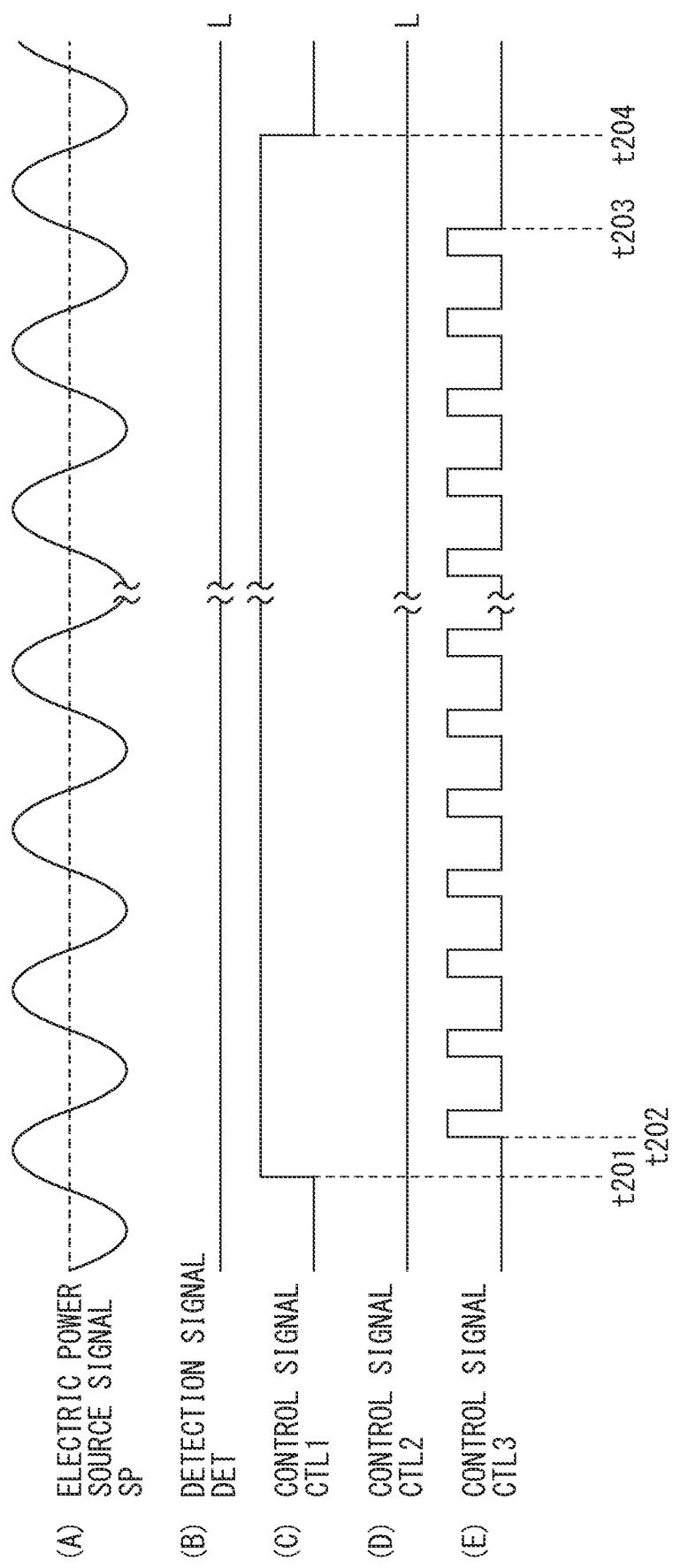
FIG. 22 is a timing waveform chart illustrating an example of operation of the image forming apparatus according to one example embodiment.

FIG. 22 illustrates an example of the operation of performing the electric power supply to the heater 52, in the case where the electric power source signal SP keeps being the alternating-current signal. In this example, as illustrated in (A) of FIG. 22, the electric power source signal SP may keep being the alternating-current signal. Therefore, the detection signal DET may keep being at the low level, as illustrated in (B) of FIG. 22. As a result, as illustrated in (D) of FIG. 22, the control signal CTL2 may keep being at the low level, the sub-relay 77 may keep being in the open state, and the arc suppression circuit 73 may keep being in the limited state.

Referring to (C) of FIG. 22, in the case where the image forming apparatus 5 is to perform the image formation operation, at a timing t201, the heater control section 482 and the signal generation circuit 383 may cause the control signal CTL1 to transition from the low level to the high level. Accordingly, a current may flow through the coil of the main relay 72, varying the main relay 72 from the open state (the OFF state) to the closed state (the ON state).

Referring to (E) of FIG. 22, at a timing t202, the heater control section 482 may start causing the control signal CTL3 to transition between the low level and the high level on the basis of the result of the detection performed by the thermistor 53. The triac 78 may be brought into the ON state when the control signal CTL3 transitions from the low level to the high level. The triac 78 may be brought into the OFF state at a zero-cross timing of the electric power source signal SP.

In a case where the image forming apparatus 5 is to end the image formation operation, at a timing t203, the heater control section 482 may stop the transition of the control signal CTL3 and keep the control signal CTL3 at the low level, as illustrated in (E) of FIG. 22. Accordingly, the triac 78 may be brought into the OFF state at the zero-cross timing of the electric power source signal SP, and keep being in the OFF state.

Thereafter, at a timing t204, the heater control section 482 and the signal generation circuit 383 may cause the control signal CTL1 to transition from the high level to the low level, as illustrated in (C) of FIG. 22. Accordingly, the current may stop flowing through the coil, varying the main relay 72 from the closed state (the ON state) to the open state (the OFF state).

[Case CB2]

Figure 23:
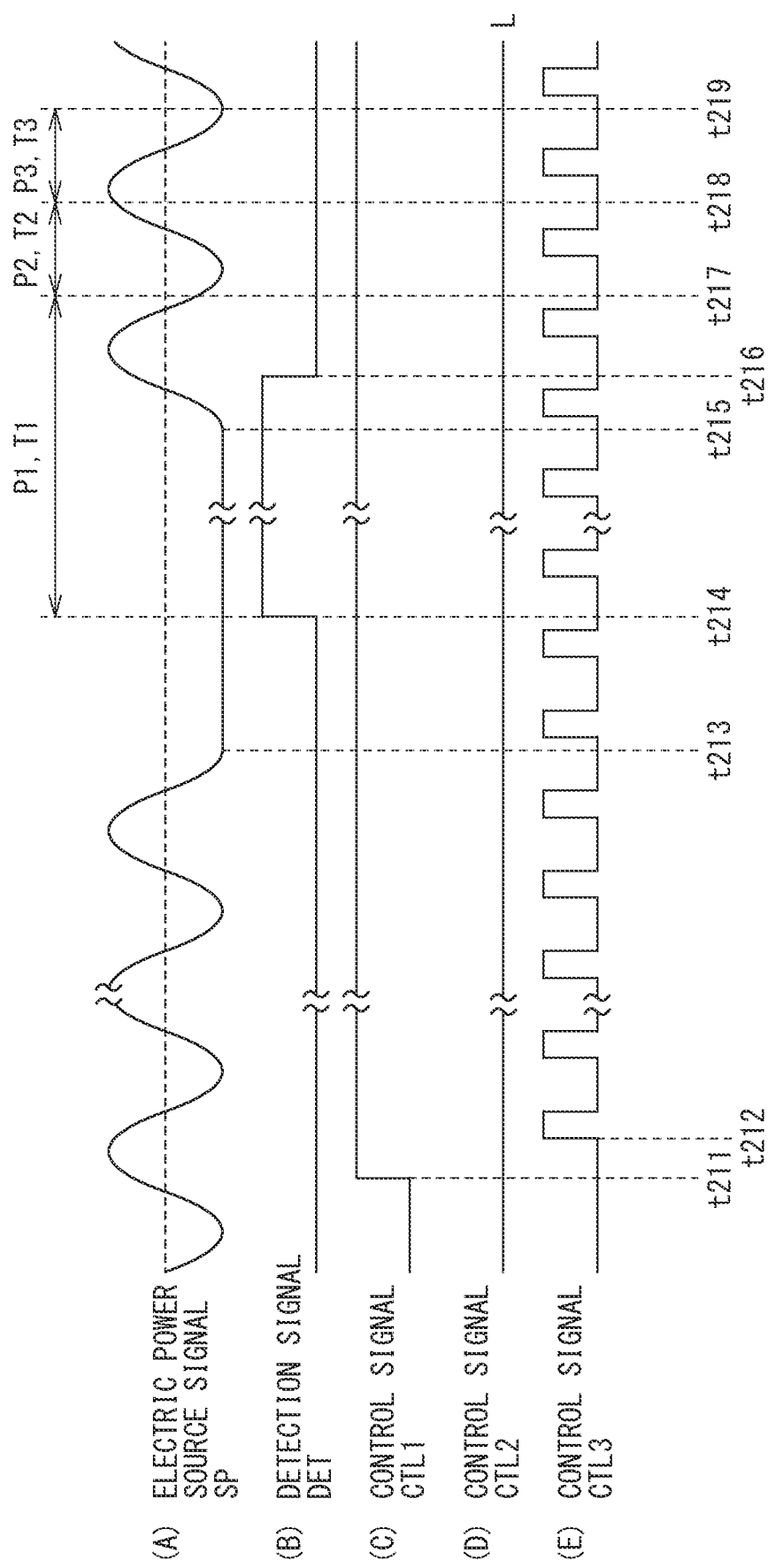
FIG. 23 is a timing waveform chart illustrating another example of the operation of the image forming apparatus according to one example embodiment.

FIG. 23 illustrates an example of the operation of the electric power supply to the heater 52 in a case where the electric power source signal SP varies from the alternating-current signal to the direct-current signal. In this example, the electric power source signal SP may vary from the alternating-current signal to the direct-current signal, and after a lapse of a relatively short time from such variation of the electric power source signal SP, the electric power source signal SP may return from the direct-current signal to the alternating-current signal.

Referring to (C) of FIG. 23, in the case where the image forming apparatus 5 is to perform the image formation operation, at a timing t211, the heater control section 482 and the signal generation circuit 383 may cause the control signal CTL1 to transition from the low level to the high level. Accordingly, a current may flow through the coil of the main relay 72, varying the main relay 72 from the open state (the OFF state) to the closed state (the ON state).

Referring to (E) of FIG. 23, at a timing t212, the heater control section 482 may start causing the control signal CTL3 to transition between the low level and the high level on the basis of the result of the detection performed by the thermistor 53. The triac 78 may be brought into the ON state when the control signal CTL3 transitions from the low level to the high level. The triac 78 may be brought into the OFF state at the zero-cross timing of the electric power source signal SP.

Further, in this example, at a timing t213, the electric power source signal SP may vary from the alternating-current signal to the direct-current signal, as illustrated in (A) of FIG. 23. The direct-current detector 79 may detect the variation of the electric power source signal SP to the direct-current signal on the basis of that the zero-cross circuit generates no pulse in a period from the timing t213 to the timing t214. The direct-current detector 79 may cause the detection signal DET to transition from the low level to the high level at the timing t214, as illustrated in (B) of FIG. 23. The time measurement section 483 of the heater control section 482 may start measuring a time at the timing t214 on the basis of such transition of the detection signal DET.

Further, in this example, at a timing t215, the electric power source signal SP may vary from the direct-current signal to the alternating-current signal, as illustrated in (A) of FIG. 23. The direct-current detector 79 may detect the variation of the electric power source signal SP to the alternating-current signal on the basis of that the zero-cross circuit generates a pulse in a period from the timing t215 to a timing t216. Further, at the timing t216, the direct-current detector 79 may cause the detection signal DET to transition from the high level to the low level, as illustrated in (B) of FIG. 23.

In this example, the timing t216 of the transition of the detection signal DET from the high level to the low level may be before a timing t217 which is after a lapse of a predetermined time T1 from the timing t214. Accordingly, the heater control section 482 and the signal generation circuit 383 may keep the control signal CTL1 at the high level, and keep the control signal CTL2 at the low level, as illustrated in (C) and (D) of FIG. 23.

Further, in a case where the image forming apparatus 5 is to end the image formation operation, although it is not illustrated, the heater control section 482 and the signal generation circuit 383 may stop the transition of the control signal CTL3, keep the control signal CTL3 at the low level, and thereafter cause the control signal CTL1 to transition from the high level to the low level, as with the case CB1 illustrated in FIG. 22.

[Case CB3]

Figure 24:
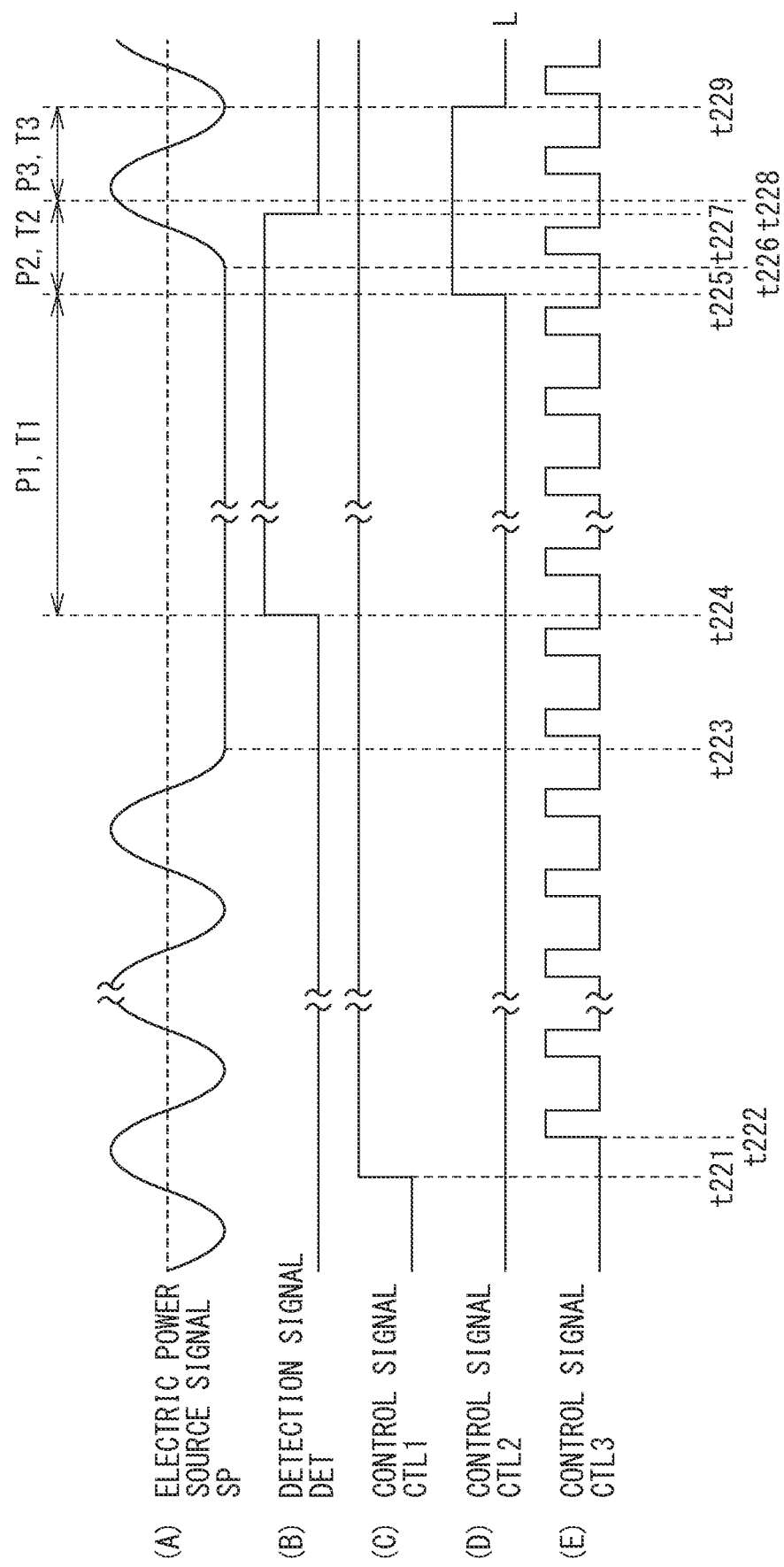
FIG. 24 is a timing waveform chart illustrating still another example of the operation of the image forming apparatus according to one example embodiment.

FIG. 24 illustrates an example of the operation of the electric power supply to the heater 52 in a case where the electric power source signal SP varies from the alternating-current signal to the direct-current signal. In this example, the electric power source signal SP may vary from the alternating-current signal to the direct-current signal, and may return from the direct-current signal to the alternating-current signal after a lapse of a time slightly longer than that in the case CB2.

In a case where the image forming apparatus 5 is to perform the image formation operation, at a timing t221, the heater control section 482 and the signal generation circuit 383 may cause the control signal CTL1 to transition from the low level to the high level, as illustrated in (C) of FIG. 24. Accordingly, a current may flow through the coil of the main relay 72, and the main relay 72 may be varied from the open state (the OFF state) to the closed state (the ON state).

Thereafter, at a timing t222, the heater control section 482 may start causing the control signal CTL3 to transition between the low level and the high level on the basis of the result of the detection performed by the thermistor 53, as illustrated in (E) of FIG. 24. The triac 78 may be brought into the ON state when the control signal CTL3 transitions from the low level to the high level. The triac 78 may be brought into the OFF state at the zero-cross timing of the electric power source signal SP.

Further, in this example, at a timing t223, the electric power source signal SP may vary from the alternating-current signal to the direct-current signal, as illustrated in (A) of FIG. 24. The direct-current detector 79 may detect the variation of the electric power source signal SP to the direct-current signal on the basis of that the zero-cross circuit generates no pulse in a period from the timing t223 to the timing t224. The direct-current detector 79 may cause the detection signal DET to transition from the low level to the high level at the timing t224, as illustrated in (B) of FIG. 24. The time measurement section 483 of the heater control section 482 may start measuring a time at the timing t224 on the basis of such transition of the detection signal DET.

In this example, the detection signal DET may be at the high level at a timing t225 after a lapse of the predetermined time T1 from the timing t224. Therefore, the heater control section 482 and the signal generation circuit 383 may cause the control signal CTL2 to transition from the low level to the high level at the timing t225, as illustrated in (D) of FIG. 24.

Further, in this example, the electric power source signal SP may vary from the direct-current signal to the alternating-current signal at a timing t226, as illustrated in (A) of FIG. 24. The direct-current detector 79 may detect the variation of the electric power source signal SP to the alternating-current signal on the basis of that the zero-cross circuit generates a pulse in a period from the timing t226 to a timing t227. The direct-current detector 79 may cause the detection signal DET to transition from the high level to the low level at the timing t227, as illustrated in (B) of FIG. 24.

In this example, the timing t227 of the transition of the detection signal DET from the high level to the low level may be after the timing t225 after a lapse of the predetermined time T1 from the timing t224, and may be before the timing t228 after a lapse of a predetermined time T2 from the timing t225. Therefore, the heater control section 482 and the signal generation circuit 383 may keep the control signal CTL1 at the high level, as illustrated in (C) of FIG. 24.

Further, at a timing t229 after a lapse of a predetermined time T3 from the timing t228, the heater control section 482 and the signal generation circuit 383 may cause the control signal CTL2 to transition from the high level to the low level, as illustrated in (D) of FIG. 24.

Further, in a case where the image forming apparatus 5 is to end the image formation operation, although it is not illustrated, the heater control section 482 and the signal generation circuit 383 may stop the transition of the control signal CTL3, keep the control signal CTL3 at the low level, and thereafter cause the control signal CTL1 to transition from the high level to the low level, as with the case CB1 illustrated in FIG. 22.

[Case CB4]

Figure 25:
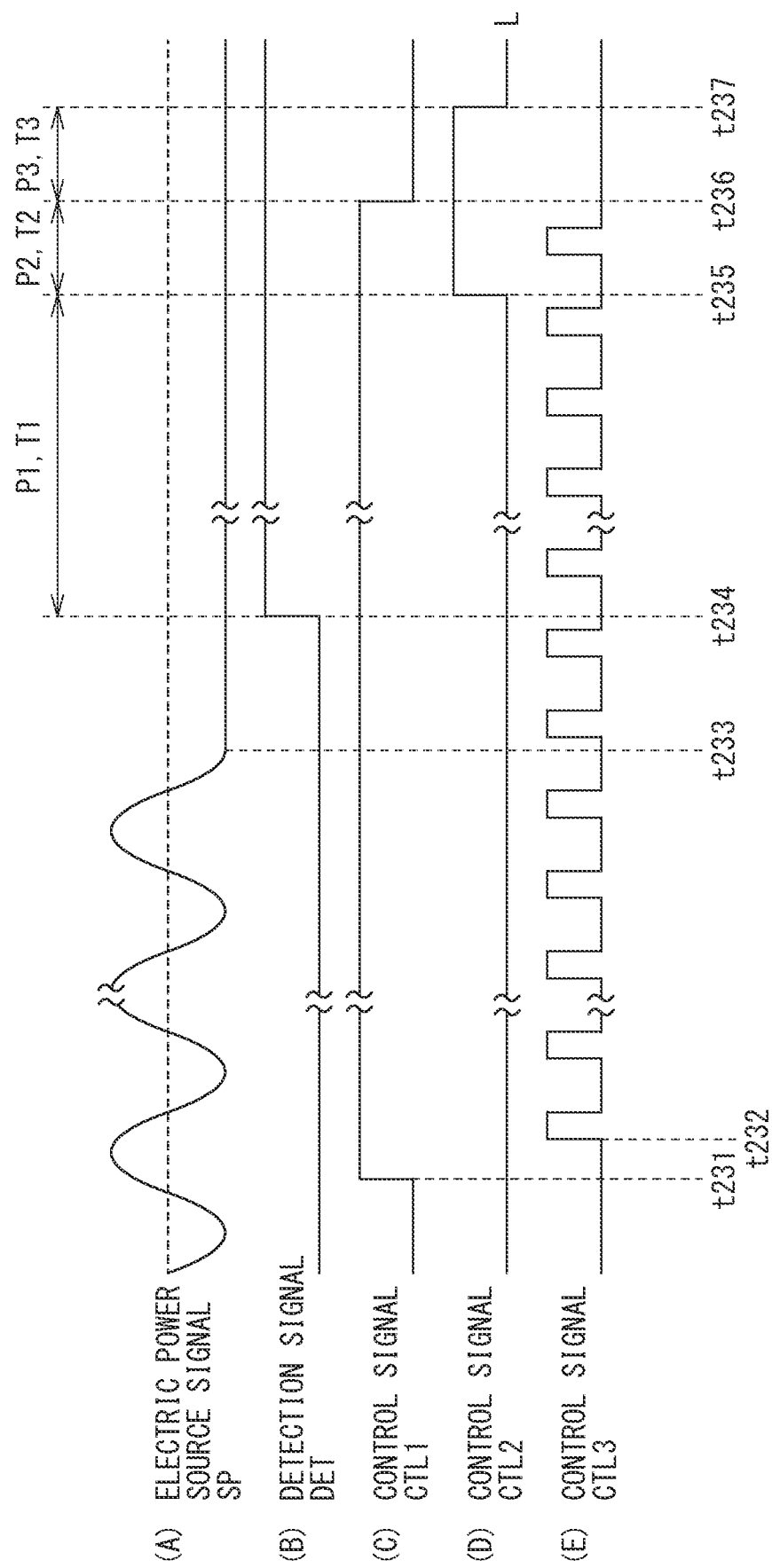
FIG. 25 is a timing waveform chart illustrating still another example of the operation of the image forming apparatus according to one example embodiment.

FIG. 25 illustrates an example of the operation of the electric power supply to the heater 52 in a case where the electric power source signal SP varies from the alternating-current signal to the direct-current signal. In this example, the electric power source signal SP may vary from the alternating-current signal to the direct-current signal, and may keep being the direct-current signal thereafter.

In a case where the image forming apparatus 5 is to perform the image formation operation, at a timing t231, the heater control section 482 and the signal generation circuit 383 may cause the control signal CTL1 to transition from the low level to the high level, as illustrated in (C) of FIG. 25. Accordingly, a current may flow through the coil of the main relay 72, varying the main relay 72 from the open state (the OFF state) to the closed state (the ON state).

Thereafter, at a timing t232, the heater control section 482 may start causing the control signal CTL3 to transition between the low level and the high level on the basis of the result of the detection performed by the thermistor 53, as illustrated in (E) of FIG. 25. The triac 78 may be brought into the ON state when the control signal CTL3 transitions from the low level to the high level. The triac 78 may be brought into the OFF state at the zero-cross timing of the electric power source signal SP.

Further, in this example, at a timing t233, the electric power source signal SP may vary from the alternating-current signal to the direct-current signal, as illustrated in (A) of FIG. 25. The direct-current detector 79 may detect the variation of the electric power source signal SP to the direct-current signal on the basis of that the zero-cross circuit generates no pulse in a period from the timing t233 to a timing t234. The direct-current detector 79 may cause the detection signal DET to transition from the low level to the high level at the timing t234, as illustrated in (B) of FIG. 25. The time measurement section 483 of the heater control section 482 may start measuring a time at the timing t234 on the basis of such transition of the detection signal DET.

In this example, the detection signal DET may be at the high level at a timing t235 after a lapse of the predetermined time T1 from the timing t234. Therefore, the heater control section 482 and the signal generation circuit 383 may cause the control signal CTL2 to transition from the low level to the high level at the timing t235, as illustrated in (D) of FIG. 25.

Moreover, in this example, the detection signal DET may be at the high level at a timing t236 after a lapse of the predetermined time T2 from the timing t235. Therefore, the heater control section 482 and the signal generation circuit 383 may cause the control signal CTL1 to transition from the high level to the low level at a timing t236, as illustrated in (C) of FIG. 25. Further, the heater control section 482 may keep the control signal CTL3 at the low level at and after the timing t236, as illustrated in (E) of FIG. 25.

Further, at a timing t237 after a lapse of the predetermined time T3 from the timing t236, the heater control section 482 and the signal generation circuit 383 may cause the control signal CTL2 to transition from the high level to the low level, as illustrated in (D) of FIG. 25. The predetermined time T3 may correspond to the time Td11 according to the fourth example embodiment.

A description is given next in detail of operation of controlling the main relay 72 and the arc suppression circuit 73 in the image forming apparatus 5.

Figure 26:
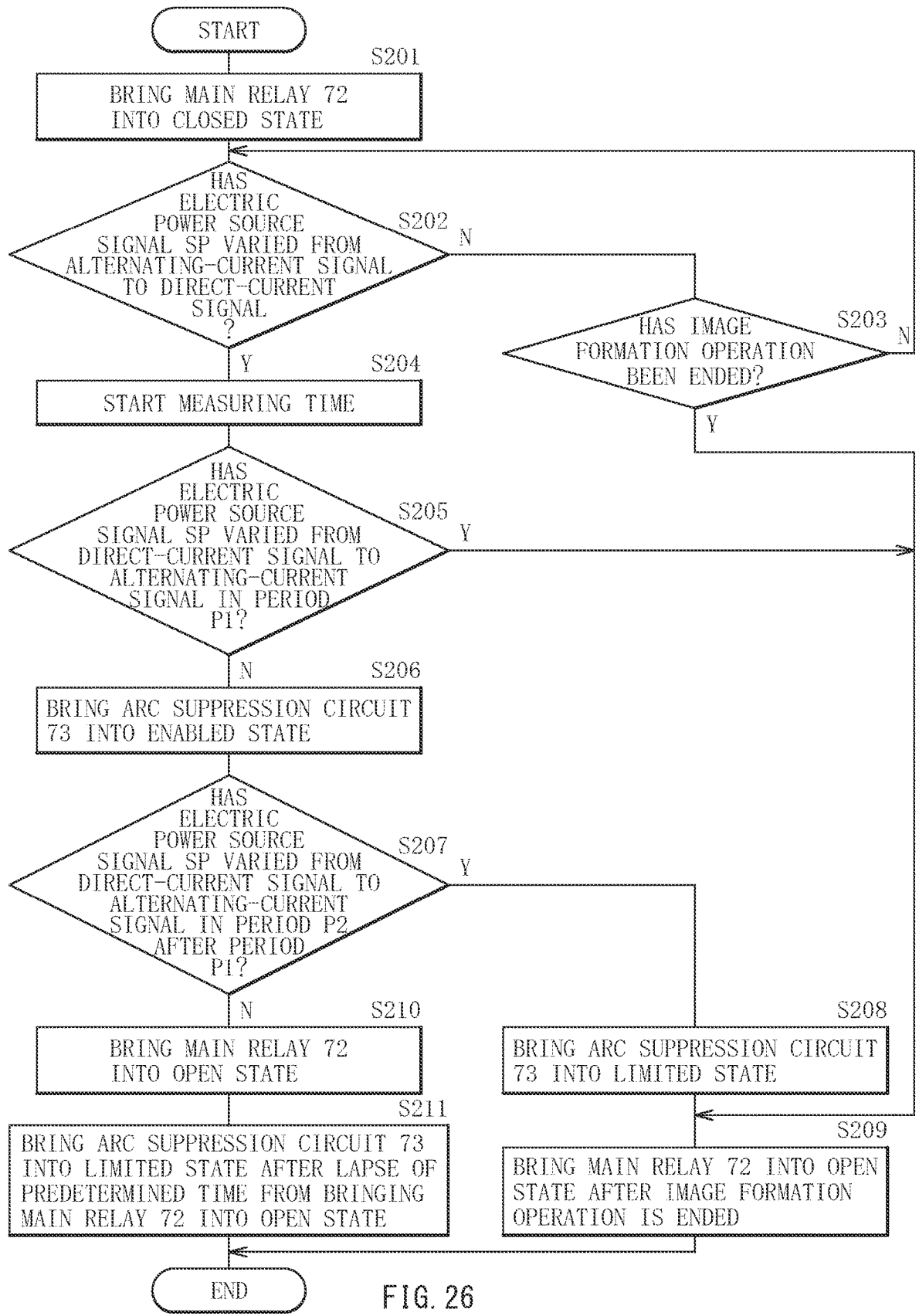
FIG. 26 is a flowchart illustrating still another example of operation of the image forming apparatus according to one example embodiment.

FIG. 26 illustrates an example of operation of the image forming apparatus 5 in a case of performing the operation of the electric power supply to the heater 52.

First, the control section 480 may cause the control signal CTL1 to transition from the low level to the high level, and thereby bring the main relay 72 into the closed state (the ON state) (step S201). This may allow, after this, the electric power supply to the heater 52 to be performed when the heater control section 482 brings the triac 78 into the ON state in a period during which the main relay 72 is in the closed state.

Thereafter, the control section 480 may confirm, on the basis of the detection signal DET, whether the electric power source signal SP has varied from the alternating-current signal to the direct-current signal (step S202). In a case where the electric power source signal SP has not varied to the direct-current signal ("N" in step S202), the control section 480 may confirm whether the image formation operation of the image forming apparatus 5 has been ended (step S203). In a case where the image formation operation has not been ended yet ("N" in step S203), the flow may be caused to return to step S202. Thus, the processes in steps S202 and S203 may be repeated until the electric power source signal SP varies to the direct-current signal or the image formation operation is ended.

In a case where the image formation operation has been ended in step S203 ("Y" in step S203), the flow may be caused to proceed to step S209.

In a case where the electric power source signal SP has varied from the alternating-current signal to the direct-current signal in step S202 ("Y" in step S202), the control section 480 may start measuring a time (step S204).

Thereafter, the control section 480 may confirm, on the basis of the result of the detection performed by the direct-current detector 79, whether the electric power source signal SP has varied from the direct-current signal to the alternating-current signal in a period P1 (step S205). The period P1 may start from the timing of the start of the measuring of the time and have a time length corresponding to the predetermined time T1. In a case where the electric power source signal SP has varied from the direct-current signal to the alternating-current signal in the period P1 ("Y" in step S205), the flow may be caused to proceed to step S209.

In a case where the electric power source signal SP has not varied from the direct-current signal to the alternating-current signal in the period P1 in step S205 ("N" in step S205), the control section 480 may cause the control signal CTL2 to transition from the low level to the high level, thereby bringing the arc suppression circuit 73 into the enabled state (step S206).

Thereafter, the control section 480 may confirm, on the basis of the result of the detection performed by the direct-current detector 79, whether the electric power source signal SP has varied from the direct-current signal to the alternating-current signal in a period P2 (step S207). The period P2 may start after the period P1 and have a time length corresponding to the predetermined time T2.

In a case where the electric power source signal SP has varied from the direct-current signal to the alternating-current signal in the period P2 in step S207 ("Y" in step S207), the control section 480 may cause the control signal CTL2 to transition from the high level to the low level, thereby bringing the arc suppression circuit 73 into the limited state (step S208). Further, after the image formation operation is ended, the control section 480 may cause the control signal CTL1 to transition from the high level to the low level, thereby bringing the main relay 72 into the open state (the OFF state) (step S209). This may bring this flow to an end.

In a case where the electric power source signal SP has not varied from the direct-current signal to the alternating-current signal in the period P2 in step S207 ("N" in step S207), the control section 480 may cause the control signal CTL1 to transition from the high level to the low level, thereby bringing the main relay 72 into the open state (the OFF state) (step S210). Further, the control section 480 may cause the control signal CTL2 to transition from the high level to the low level after a lapse of the predetermined time T3 from the timing of bringing the main relay 72 into the open state in step S210, thereby bringing the arc suppression circuit 73 into the limited state (step S211). This may bring this flow to an end.

For example, the electric power source signal SP may keep being the alternating-current signal in the case CB1 illustrated in FIG. 22. Therefore, the electric power source signal SP may not vary to the direct-current signal ("N" in step S202) after the control section 480 brings the main relay 72 into the closed state (the ON state) (step S201). Accordingly, the control section 480 may repeat the processes in steps S202 and S203 until the image formation operation is ended. Further, when the image formation operation is ended ("Y" in step S203), the control section 480 may bring the main relay 72 into the open state (the OFF state) (step S209). In this operation, the arc suppression circuit 73 may keep being in the limited state.

In the case CB2 illustrated in FIG. 23, the electric power source signal SP may return from the direct-current signal to the alternating-current signal after a lapse of a relatively short time from the variation of the electric power source signal SP from the alternating-current signal to the direct current signal. Therefore, the electric power source signal SP varies to the direct-current signal ("Y" in step S202) after the control section 480 brings the main relay 72 into the closed state (the ON state) (step S201). The control section 480 may thereby start measuring a time (step S204). Further, the electric power source signal SP may vary from the direct-current signal to the alternating-current signal in the period P1 starting from the timing of the measuring of the time and having a time length corresponding to the predetermined time T1 ("Y" in step S205). The control section 480 may thereby bring the main relay 72 into the open state (the OFF state) (step S209). In this operation, the arc suppression circuit 73 may keep being in the limited state.

In the case CB3 illustrated in FIG. 24, the electric power source signal SP may return from the direct-current signal to the alternating-current signal after a lapse of a time relatively longer than that in the case CB2 after the variation of the electric power source signal SP from the alternating-current signal to the direct-current signal. Therefore, the electric power source signal SP may vary to the direct-current signal ("Y" in step S202) after the control section 480 brings the main relay 72 into the closed state (the ON state) (step S201). This may cause the control section 480 to start measuring a time (step S204). Further, the electric power source signal SP may not vary from the direct-current signal to the alternating-current signal in the period P1 starting from the timing of the measuring of the time and having a time length corresponding to the predetermined time T1 ("N" in step S205), the control section 480 may bring the arc suppression circuit 73 into the enabled state (step S206). Further, the electric power source signal SP may vary from the direct-current signal to the alternating-current signal in the period P2 starting after the period P1 and having a time length corresponding to the predetermined time T2 ("Y" in step S207). Therefore, the control section 480 may bring the arc suppression circuit 73 into the limited state (step S208), and may bring the main relay 72 into the open state (the OFF state) (step S209).

In the case CB4 illustrated in FIG. 25, the electric power source signal SP may vary from the alternating-current signal to the direct-current signal, and thereafter keep being the direct-current signal. Therefore, the electric power source signal SP may vary to the direct-current signal ("Y" in step S202) after the control section 480 brings the main relay 72 into the closed state (the ON state) (step S201). This may cause the control section 480 to start measuring a time (step S204). Further, the electric power source signal SP may not vary from the direct-current signal to the alternating-current signal in the period P1 starting from the timing of the measuring of the time and having a time length corresponding to the predetermined time T1 ("N" in step S205), the control section 480 may bring the arc suppression circuit 73 into the enabled state (step S206). Further, the electric power source signal SP may not vary from the direct-current signal to the alternating-current signal in the period P2 starting after the period P1 and having a time length corresponding to the predetermined time T2 ("N" in step S207), the control section 480 may bring the main relay 72 into the open state (the OFF state) (step S210), and may bring the arc suppression circuit 73 into the limited state after a lapse of the predetermined time T3 from the timing of bringing the main relay 72 into the open state (step S211).

The period P1 may correspond to a "first period" in one specific but non-limiting embodiment of the technology. The period P2 may correspond to a "second period" in one specific but non-limiting embodiment of the technology.

As described above, in the image forming apparatus 5, after the main relay 72 is brought into the closed state (the ON state), the operation of the main relay 72 and the arc suppression circuit 73 may be controlled on the basis of a lapse of time from the timing at which the direct-current detector 79 detects the variation of the electric power source signal SP from the alternating-current signal to the direct-current signal. Accordingly, for example, as illustrated in FIGS. 23 and 24, it is possible to keep the electric power supply to the heater 52 in a case where the electric power source signal SP returns from the direct-current signal to the alternating-current signal in the period P1 or the period P2. Further, for example, as illustrated in FIG. 25, it is possible to stop the electric power supply to the heater 52 in a case where the electric power source signal SP does not return from the direct-current signal to the alternating-current signal in the period P1 or the period P2. In this case, it is possible to suppress the arc discharge at the main relay 72 in the image forming apparatus 5, as with the case of the image forming apparatus 4 according to the fourth example embodiment. As a result, it is possible to effectively stop the electric power supply to the heater 52 in the image forming apparatus 5.

As described above, according to the fifth example embodiment, after the main relay is brought into the closed state (the ON state), the operation of the main relay and the arc suppression circuit may be controlled on the basis of a lapse of time from the timing at which the direct-current detector detects the variation of the electric power source signal from the alternating-current signal to the direct-current signal. As a result, it is possible to effectively stop the electric power supply to the heater.

[Modification 5]

Any of the modifications of the fourth example embodiment described above may be applied to the image forming apparatus 5 according to the fifth example embodiment.

The technology has been described above referring to some example embodiments and the modifications thereof. However, the technology is not limited to the example embodiments and the modifications described above, and is modifiable in various ways.

For example, the example embodiments of the technology and the modifications thereof may be applied to a printer that forms an image on a medium which is a roll of paper; however, this is non-limiting. One embodiment of the technology may be applied to a printer that forms an image on any other medium such as plain paper. Moreover, according to the example embodiments of the technology and the modifications thereof, a color image may be formed on the medium; however, this is non-limiting. In one example embodiment, a monochrome image may be formed on the medium.

For example, the example embodiments of the technology and the modifications thereof may be applied to a printer; however, this is non-limiting. One embodiment of the technology may be applied to various uses that supply an alternating-current electric power source signal to a load.

Furthermore, the technology encompasses any possible combination of some or all of the various embodiments and the modifications described herein and incorporated herein. It is possible to achieve at least the following configurations from the above-described example embodiments of the technology.

(1)

A load controller including:

a control device that is provided on an electric power supply path between a first terminal and a second terminal, and controls electric power supply to a load provided on the electric power supply path, the first terminal and the second terminal being coupled to an alternating-current electric power source;

a switching device that is provided on the electric power supply path and is to be in an open state or a closed state;

an arc suppression circuit that is to suppress discharge at the switching device, the arc suppression circuit being to be set to an enabled state or a limited state; and a control section that controls operation of the control device, operation of the switching device, and operation of the arc suppression circuit, the control section varying the arc suppression circuit from the limited state to the enabled state after bringing the switching device into the closed state.

(2)

The load controller according to (1), in which the control section further brings the arc suppression circuit into the limited state after bringing the switching device into the open state.

(3)

The load controller according to (1), in which the switching device is in the open state in a case where a first control signal has a first signal value, and is in the closed state in a case where the first control signal has a second signal value, the arc suppression circuit is in the limited state in a case where a second control signal has a third signal value, and is in the enabled state in a case where the second control signal has a fourth signal value, the control section generates the first control signal, and the control section generates the second control signal, the control section causing the second control signal to transition from the third signal value to the fourth signal value at a timing after a lapse of a predetermined time from a timing of transition of the first control signal from the first signal value to the second signal value, the control section causing the second control signal to transition from the fourth signal value to the third signal value at a timing after a lapse of the predetermined time from a timing of transition of the first control signal from the second signal value to the first signal value.

(4)

The load controller according to (1), in which the switching device is brought into the open state or the closed state on the basis of a first control signal, the arc suppression circuit is brought into the enabled state or the limited state on the basis of a second control signal, and the control section includes a delay circuit, the control section generating the first control signal, the control section delaying the first control signal with use of the delay circuit and thereby generating the second control signal.

(5)

The load controller according to (1), in which the control section brings the switching device into the closed state in a first period, the control section causes the control device to intermittently cause the electric power supply to the load to be performed in a second period within the first period, and the control section brings the arc suppression circuit into the enabled state at a timing at or after an end timing of the second period within the first period.

(6)

The load controller according to (1), in which the switching device is in the open state in a case where a first control signal has a first signal value, and is in the closed state in a case where the first control signal has a second signal value, the arc suppression circuit is in the limited state in a case where a second control signal has a third signal value, and is in the enabled state in a case where the second control signal has a fourth signal value, the control section generates a timing signal involving first transition and second transition, the first transition and the second transition being in directions opposite to each other, the control section generates the first control signal, the control section causing the first control signal to transition from the first signal value to the second signal value on the basis of the first transition of the timing signal, the control section causing the first control signal to transition from the second signal value to the first signal value at a timing after a lapse of a predetermined time from a transition timing of the second transition of the timing signal, and the control section generates the second control signal, the control section causing the second control signal to transition from the third signal value to the fourth signal value at the transition timing of the second transition of the timing signal.

(7)

The load controller according to (1), in which the control section brings the switching device into the closed state at a first timing, the control section causes the control device to stop the electric power supply to the load at a second timing after the first timing, and brings the arc suppression circuit into the enabled state at the second timing, and the control section brings the switching device into the open state at a third timing after the second timing.

(8)

The load controller according to (1), in which the switching device is in the open state in a case where a first control signal has a first signal value, and is in the closed state in a case where the first control signal has a second signal value, the arc suppression circuit is in the limited state in a case where a second control signal has a third signal value, and is in the enabled state in a case where the second control signal has a fourth signal value, the control device stops the electric power supply to the load in a case where a third control signal has a fifth signal value, and causes the electric power supply to the load to be performed in a case where the third control signal has a sixth signal value, the control section generates the third control signal, the control section generates a timing signal involving first transition and second transition, the first transition and the second transition being in directions opposite to each other, the control section generates the first control signal, the control section causing the first control signal to transition from the first signal value to the second signal value on the basis of the first transition of the timing signal, the control section causing the first control signal to transition from the second signal value to the first signal value at a timing after a lapse of a predetermined time from a timing of transition of the third control signal from the sixth signal value to the fifth signal value on the basis of the second transition of the timing signal, and the control section generates the second control signal, the control section causing the second control signal to transition from the third signal value to the fourth signal value at a timing of transition of the third control signal from the sixth signal value to the fifth signal value.

(9)

The load controller according to (1), further including a direct-current detector that detects whether an electric power source signal supplied from the alternating-current electric power source is an alternating-current signal or a direct-current signal, in which the control section controls the operation of the switching device and the operation of the arc suppression circuit on the basis of a result of detection performed by the direct-current detector.

(10)

The load controller according to (9), in which the control section varies the arc suppression circuit from the limited state to the enabled state in a case where the direct-current detector detects that the electric power source signal is the direct-current signal after the control section brings the switching device into the closed state.

(11)

The load controller according to (10), in which the control section brings the arc suppression circuit into the limited state after bringing the switching device into the open state.

(12)

The load controller according to (9), in which the control section controls, after bringing the switching device into the closed state, the operation of the arc suppression circuit on the basis of a time elapsed from a detection timing, the detection timing being a timing at which the direct-current detector detects variation of the electric power source signal from the alternating-current signal to the direct-current signal.

(13)

The load controller according to (12), in which the control section varies the arc suppression circuit from the limited state to the enabled state in a case where the direct-current detector continues to detect that the electric power source signal is the direct-current signal in a first period, the first period starting from the detection timing and having a predetermined time length.

(14)

The load controller according to (13), in which the control section keeps the arc suppression circuit in the limited state in a case where the direct-current detector detects variation of the electric power source signal from the direct-current signal to the alternating-current signal in the first period.

(15)

The load controller according to (13), in which the control section varies the switching device from the closed state to the open state, and varies the arc suppression circuit from the enabled state to the limited state after varying the switching device from the closed state to the open state, in a case where the direct-current detector continues to detect that the electric power source signal is the direct-current signal in the first period and a second period, the second period being a period after the first period and having a predetermined time length.

(16)

The load controller according to (15), in which the control section keeps the switching device in the closed state and varies the arc suppression circuit from the enabled state to the limited state, in a case where the direct-current detector detects variation of the electric power source signal from the direct-current signal to the alternating-current signal in the second period.

(17)

A load controller including:

a control device that is provided on an electric power supply path between a first terminal and a second terminal, and controls electric power supply to a load provided on the electric power supply path, the first terminal and the second terminal being coupled to an alternating-current electric power source;

a direct-current detector that detects whether an electric power source signal supplied from the alternating-current electric power source is an alternating-current signal or a direct-current signal;

a switching device that is provided on the electric power supply path and is to be in an open state or a closed state;

an arc suppression circuit that is to suppress discharge at the switching device, the arc suppression circuit being to be set to an enabled state or a limited state; and a control section that controls operation of the control device and operation of the switching device, the control section controlling the operation of the switching device and operation of the arc suppression circuit on the basis of a result of detection performed by the direct-current detector.

(18)

An image forming apparatus including:

an image forming section that generates a developer image;

a fixing section that includes a heater, and fixes the developer image to a medium;

a control device that is provided on an electric power supply path between a first terminal and a second terminal, and controls electric power supply to the heater provided on the electric power supply path, the first terminal and the second terminal being coupled to an alternating-current electric power source;

a switching device that is provided on the electric power supply path and is to be in an open state or a closed state;

an arc suppression circuit that is to suppress discharge at the switching device, the arc suppression circuit being to be set to an enabled state or a limited state; and a control section that controls operation of the control device, operation of the switching device, and operation of the arc suppression circuit, the control section varying the arc suppression circuit from the limited state to the enabled state after bringing the switching device into the closed state.

According to any of the load controller and the image forming apparatus of one embodiment of the technology, the arc suppression circuit is provided. The arc suppression circuit is to suppress the discharge at the switching device, and is to be set to the enabled state or the limited state. The arc suppression circuit is varied from the limited state to the enabled state after the switching device is brought into the closed state. It is therefore possible to effectively stop the electric power supply to the heater.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A load controller, comprising:
a control device that is provided on an electric power supply path between a first terminal and a second terminal, and controls electric power supply to a load provided on the electric power supply path, the first terminal and the second terminal being coupled to an alternating-current electric power source;
a switching device that is provided on the electric power supply path and is to be in an open state or a closed state;
an arc suppression circuit that is to suppress discharge at the switching device, the arc suppression circuit being configured to be set to either an enabled state or a limited state; and
a control section that controls operation of the control device, operation of the switching device, and operation of the arc suppression circuit, the control section varying the arc suppression circuit from the limited state to the enabled state after bringing the switching device into the closed state, wherein
the switching device is in the open state in a case where a first control signal has a first signal value, and is in the closed state in a case where the first control signal has a second signal value,
the arc suppression circuit is in the limited state in a case where a second control signal has a third signal value, and is in the enabled state in a case where the second control signal has a fourth signal value,
the control section generates the first control signal, and
the control section generates the second control signal, the control section causing the second control signal to transition from the third signal value to the fourth signal value at a timing after a lapse of a predetermined time from a timing of transition of the first control signal from the first signal value to the second signal value, the control section causing the second control signal to transition from the fourth signal value to the third signal value at a timing after a lapse of the predetermined time from a timing of transition of the first control signal from the second signal value to the first signal value.

2. The load controller according to claim 1, wherein
the control section includes a delay circuit, the control section generating the first control signal, the control section delaying the first control signal with use of the delay circuit and thereby generating the second control signal.

3. A load controller, comprising:
a control device that is provided on an electric power supply path between a first terminal and a second terminal, and controls electric power supply to a load provided on the electric power supply path, the first terminal and the second terminal being coupled to an alternating-current electric power source;
a switching device that is provided on the electric power supply path and is to be in an open state or a closed state;
an arc suppression circuit that is to suppress discharge at the switching device, the arc suppression circuit being configured to be set to either an enabled state or a limited state; and
a control section that controls operation of the control device, operation of the switching device, and operation of the arc suppression circuit, the control section varying the arc suppression circuit from the limited state to the enabled state after bringing the switching device into the closed state, wherein
the control section brings the switching device into the closed state in a first period,
the control section causes the control device to intermittently cause the electric power supply to the load to be performed in a second period within the first period, and
the control section brings the arc suppression circuit into the enabled state at a timing at or after an end timing of the second period within the first period.

4. The load controller according to claim 3, wherein
the switching device is in the open state in a case where a first control signal has a first signal value, and is in the closed state in a case where the first control signal has a second signal value,
the arc suppression circuit is in the limited state in a case where a second control signal has a third signal value, and is in the enabled state in a case where the second control signal has a fourth signal value,
the control section generates a timing signal involving first transition and second transition, the first transition and the second transition being in directions opposite to each other,
the control section generates the first control signal, the control section causing the first control signal to transition from the first signal value to the second signal value on a basis of the first transition of the timing signal, the control section causing the first control signal to transition from the second signal value to the first signal value at a timing after a lapse of a predetermined time from a transition timing of the second transition of the timing signal, and
the control section generates the second control signal, the control section causing the second control signal to transition from the third signal value to the fourth signal value at the transition timing of the second transition of the timing signal.

5. A load controller comprising:
a control device that is provided on an electric power supply path between a first terminal and a second terminal, and controls electric power supply to a load provided on the electric power supply path, the first terminal and the second terminal being coupled to an alternating-current electric power source;
a direct-current detector that detects whether an electric power source signal supplied from the alternating-current electric power source is an alternating-current signal or a direct-current signal; a switching device that is provided on the electric power supply path and is to be in an open state or a closed state;
an arc suppression circuit that is to suppress discharge at the switching device, the arc suppression circuit being configured to be set to either an enabled state or a limited state; and
a control section that controls operation of the control device and operation of the switching device, the control section controlling the operation of the switching device and operation of the arc suppression circuit on a basis of a result of detection performed by the direct-current detector.

6. The load controller according to claim 5, further comprising a direct-current detector that detects whether an electric power source signal supplied from the alternating-current electric power source is an alternating-current signal or a direct-current signal, wherein
the control section controls the operation of the switching device and the operation of the arc suppression circuit on a basis of a result of detection performed by the direct-current detector.

7. The load controller according to claim 6, wherein the control section varies the arc suppression circuit from the limited state to the enabled state in a case where the direct-current detector detects that the electric power source signal is the direct-current signal after the control section brings the switching device into the closed state.

8. The load controller according to claim 7, wherein the control section brings the arc suppression circuit into the limited state after bringing the switching device into the open state.

9. The load controller according to claim 6, wherein the control section controls, after bringing the switching device into the closed state, the operation of the arc suppression circuit on a basis of a time elapsed from a detection timing, the detection timing being a timing at which the direct-current detector detects variation of the electric power source signal from the alternating-current signal to the direct-current signal.

10. The load controller according to claim 9, wherein the control section varies the arc suppression circuit from the limited state to the enabled state in a case where the direct-current detector continues to detect that the electric power source signal is the direct-current signal in a first period, the first period starting from the detection timing and having a predetermined time length.

11. The load controller according to claim 10, wherein the control section keeps the arc suppression circuit in the limited state in a case where the direct-current detector detects variation of the electric power source signal from the direct-current signal to the alternating-current signal in the first period.

12. The load controller according to claim 10, wherein the control section varies the switching device from the closed state to the open state, and varies the arc suppression circuit from the enabled state to the limited state after varying the switching device from the closed state to the open state, in a case where the direct-current detector continues to detect that the electric power source signal is the direct-current signal in the first period and a second period, the second period being a period after the first period and having a predetermined time length.

13. The load controller according to claim 12, wherein the control section keeps the switching device in the closed state and varies the arc suppression circuit from the enabled state to the limited state, in a case where the direct-current detector detects variation of the electric power source signal from the direct-current signal to the alternating-current signal in the second period.

* * * * *